US012650628B2

(12) United States Patent　　(10) Patent No.:　US 12,650,628 B2
Sugimoto　　(45) Date of Patent:　Jun. 9, 2026

(54) ELECTRO-OPTIC APPARATUS AND ELECTRONIC EQUIPMENT

(71) Applicant: SEIKO EPSON CORPORATION, Tokyo (JP)

(72) Inventor: Yohei Sugimoto, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 288 days.

(21) Appl. No.: 18/645,387

(22) Filed: Apr. 25, 2024

(65) Prior Publication Data

US 2024/0361656 A1　　Oct. 31, 2024

(30) Foreign Application Priority Data

Apr. 28, 2023　(JP) ................................. 2023-074267

(51) Int. Cl.
G02F 1/1362　　(2006.01)

(52) U.S. Cl.
CPC .... G02F 1/13629 (2021.01); *G02F 2201/123* (2013.01)

(58) Field of Classification Search
CPC ..................... G02F 1/134309; G02F 2201/123
See application file for complete search history.

(56) References Cited

U.S. PATENT DOCUMENTS

| | | | |
|---|---|---|---|
| 6,252,247 B1 | 6/2001 | Sakata et al. | |
| 2008/0122999 A1 | 5/2008 | Tsuchiya et al. | |
| 2014/0125932 A1 | 5/2014 | Kawakami | |
| 2014/0368481 A1 * | 12/2014 | Tomikawa ............ G02F 1/1339 345/96 |
| 2017/0176820 A1 * | 6/2017 | Nomura ............ G02F 1/134309 |
| 2022/0113598 A1 | 4/2022 | Ito | |

FOREIGN PATENT DOCUMENTS

| | | |
|---|---|---|
| JP | 4345797 | 10/2009 |
| JP | 4472745 | 6/2010 |
| JP | 2012123141 | 6/2012 |
| JP | 2013068695 | 4/2013 |
| JP | 2014092726 | 5/2014 |
| JP | 2022062752 | 4/2022 |

* cited by examiner

*Primary Examiner* — Alexander P Gross
(74) *Attorney, Agent, or Firm* — JCIPRNET

(57) ABSTRACT

An electro-optic apparatus includes a substrate; a first conductive member disposed on one side of the substrate; a pixel electrode; a second conductive member disposed outside of a display region; a dummy pixel electrode; and an insulating layer disposed between the pixel electrode and the dummy pixel electrode, and the substrate. The pixel electrode includes a first pixel electrode layer overlapping the first conductive member, and a second pixel electrode layer, overlapping an opening region of a pixel, thinner than the first pixel electrode layer. The dummy pixel electrode includes a first dummy pixel electrode layer overlapping the second conductive member, and a second dummy pixel electrode layer, overlapping the first dummy pixel electrode layer, thinner than the first dummy pixel electrode layer. The insulating layer and the first dummy pixel electrode layer in a portion not overlapping the second conductive member face each other with a gap therebetween.

8 Claims, 52 Drawing Sheets

72P (72)

C2

201

C1                                    C1

121
(62)

C3    C3

122
(61)

C2

133 (33)

71, 72

122 (61)

63

111

124 (82)

124 (85)

124 (32)

CNT1

C1

C2

CNT2

C1

CNT1

124 (82)

C3

C2

CNT3

C3

123 (13)

ELECTRO-OPTIC APPARATUS AND ELECTRONIC EQUIPMENT

The present application is based on, and claims priority from JP Application Serial Number 2023-074267, filed Apr. 28, 2023, the disclosure of which is hereby incorporated by reference herein in its entirety.

BACKGROUND

1. Technical Field

The present disclosure relates to an electro-optic apparatus and electronic equipment.

2. Related Art

In recent years, in an electro-optic apparatus such as a liquid crystal apparatus and an organic EL (Electro Luminescence) apparatus, an electro-optic layer containing liquid crystals and organic compounds is disposed between a first substrate and a second substrate. An optically transparent pixel electrode is formed at the surface of the first substrate facing the electro-optic layer. The pixel electrode is electrically coupled to a transistor formed between the element substrate and the pixel electrode at the first substrate. The transistor of the first substrate functions as a switching element for modulating and converting color light incident on the pixel into image light.

For electro-optic apparatuses, it has been proposed to form the pixel electrode in a two-layer structure of a metal layer and a metal oxide layer in order to appropriately reduce the contact resistance of the pixel electrode and the transistor and the sheet resistance of the pixel electrode. For example, JP-A-2012-123141 discloses an electro-optic apparatus including a metal layer provided on one surface side of an element substrate, and a pixel electrode in contact with the metal layer on the side opposite to the element substrate. The pixel electrode disclosed in JP-A-2012-123141 includes an optically transparent first metal oxide layer in contact with the metal layer, and an optically transparent second metal oxide layer stacked on the first metal oxide layer on the side opposite to the metal layer. The oxygen content of the second metal oxide layer is greater than that of the first metal oxide layer.

In the electro-optic apparatus disclosed in JP-A-2012-123141, the pixel electrode is composed of two layers of the first metal oxide layer and the second metal oxide layer, and therefore it is difficult to increase the transmittance of the pixel electrode for the purpose of increasing the transmittance of incident light. In addition, even in the case where the pixel electrode is composed of a single layer, the contact resistance may excessively increase if the pixel electrode is thinned to increase the transmittance of the incident light. If the contact resistance excessively increases, bright spots are generated. In addition, due to the smaller step of the pixel electrode, display defects such as corner staining, display unevenness, and burn-in may occur due to ionic impurities diffused during the manufacturing of the electro-optic apparatus. As such, it is desired to take measures to increase the transmittance of color light in the pixel region where the incident color light is modulated in accordance with the image signal, and prevent the occurrence of bright spots and display defects.

SUMMARY

An electro-optic apparatus according to an aspect of the present disclosure includes a substrate, a first conductive member provided on one side of the substrate, a pixel electrode electrically coupled to the first conductive member, a second conductive member provided on one side of the substrate, and disposed on further outside than a display region where the pixel electrode is provided, a dummy pixel electrode electrically coupled to the second conductive member, and an insulating layer disposed between the pixel electrode and the substrate, and between the dummy pixel electrode and the substrate. The pixel electrode includes a first pixel electrode layer overlapping the first conductive member in plan view and electrically coupled to the first conductive member, and a second pixel electrode layer overlapping the first pixel electrode layer in plan view and overlapping an opening region of a pixel in plan view, the second pixel electrode layer having a width in a thickness direction of the substrate smaller than a width of the first pixel electrode layer in the thickness direction of the substrate. The dummy pixel electrode includes a first dummy pixel electrode layer overlapping the second conductive member in plan view, and electrically coupled to the second conductive member, and a second dummy pixel electrode layer overlapping the first dummy pixel electrode layer in plan view, the second dummy pixel electrode layer having a width in the thickness direction of the substrate smaller than a width of the first dummy pixel electrode layer in the thickness direction of the substrate. In plan view, the insulating layer, and the first dummy pixel electrode layer and the second dummy pixel electrode layer in a portion not overlapping the second conductive member face each other with a gap between the insulating layer, and the first dummy pixel electrode layer and the second dummy pixel electrode layer.

DESCRIPTION OF EMBODIMENTS

Figure 1:
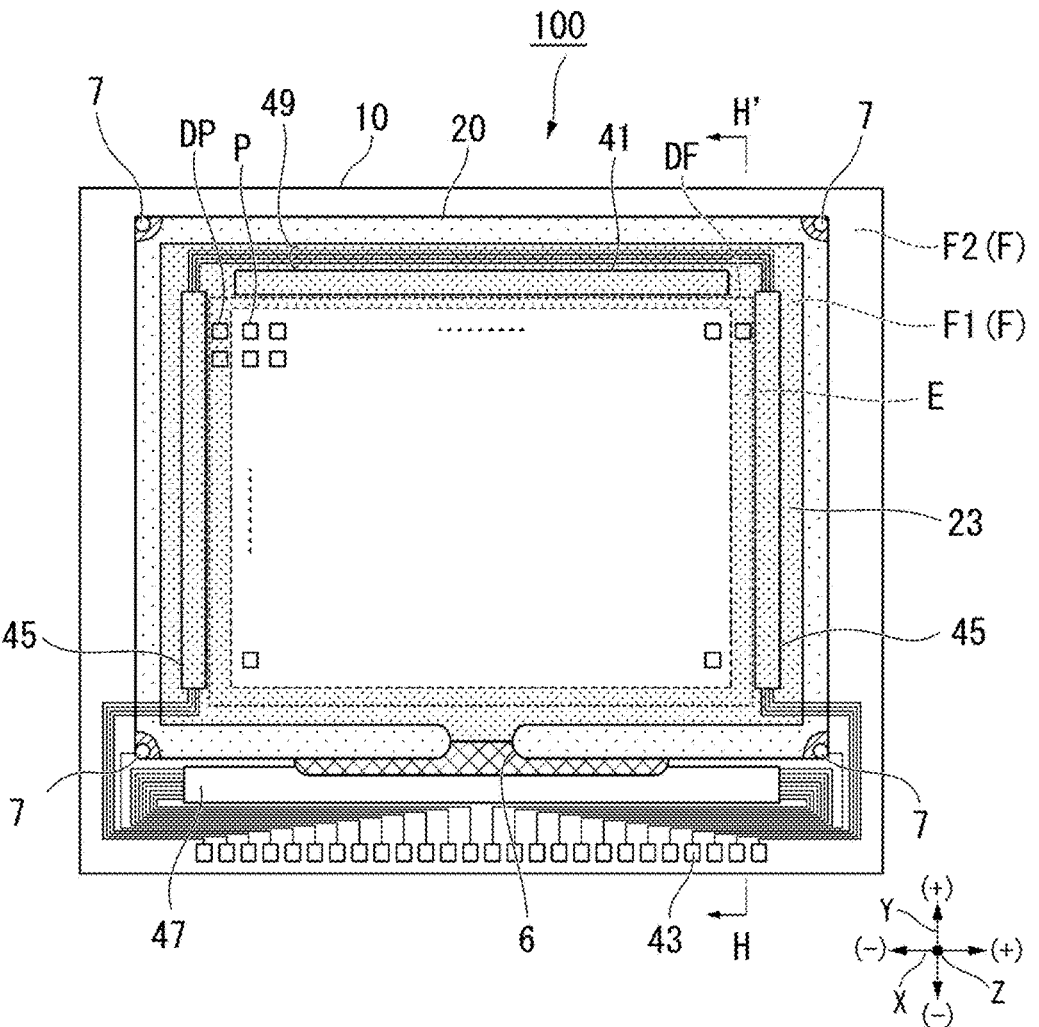
FIG. 1 is a plan view of a liquid crystal apparatus of an embodiment of the present disclosure.

Embodiments of the present disclosure are described below with reference to the accompanying drawings. In the drawings, components may not be drawn to scale for the sake of clarity of components.

In the drawings, the X axis, the Y axis, and the Z axis are illustrated as necessary as three axes orthogonal to each other. In addition, one direction along the X axis is referred to as the +X direction, and the direction opposite to the +X direction is referred to as the −X direction. Likewise, one direction along the Y axis is referred to as the +Y direction, and the direction opposite to the +Y direction is referred to as the −Y direction. One direction along the Z axis is referred to as the +Z direction, and the direction opposite to the +Z direction is referred to as the −Z direction. In addition, the plane including the X axis and the Y axis may be referred to as "the XY plane", and a view of the XY plane along the Z axis may be referred to as "plan view".

In the following description, regarding the substrate, a phrase "on the substrate" means a case where something is disposed in contact with the top surface of the substrate, a case where something is disposed on the top surface of the substrate with a component such as a structure other than the substrate interposed therebetween, and a case where a part of something is disposed in contact with the top surface of the substrate while another part is disposed with a component other than the substrate interposed therebetween, for example. In addition, the material and film thickness of each component of the electro-optic apparatus are not limited to the exemplified materials and film thicknesses unless the reasons for their suitability are explained.

In an embodiment of the present disclosure, as an electro-optic apparatus, a liquid crystal apparatus of active drive type that includes a thin film transistor (TFT) as a switching element for each pixel is described as an example. In the following description, a thin film transistor may be abbreviated as TFT. The liquid crystal apparatus is favorably used as a light modulating apparatus in a projector serving as electronic equipment described later.

Overview of Physical Structure of Liquid Crystal Apparatus

Figure 2:
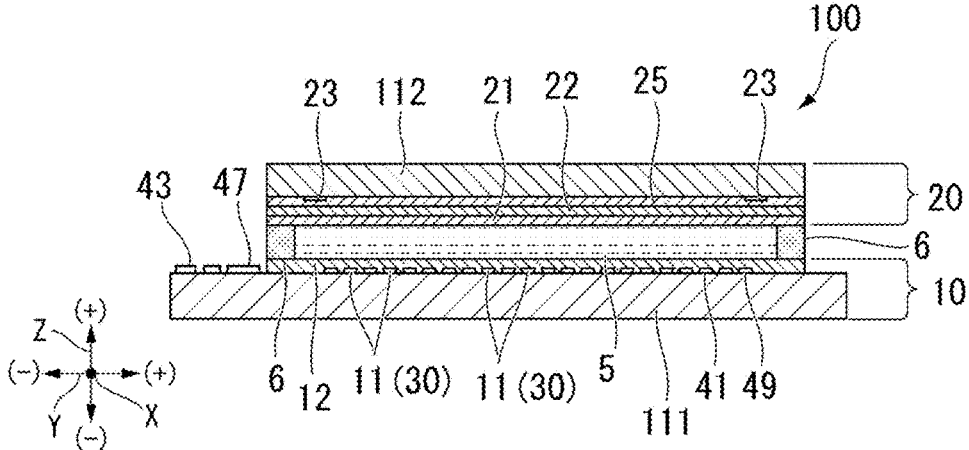
FIG. 2 is a sectional view of the liquid crystal apparatus of FIG. 1.

FIG. 1 is a plan view of a liquid crystal apparatus 100 of this embodiment. FIG. 2 is a sectional view of the liquid crystal apparatus 100, and a sectional view taken along the line H-H' of FIG. 1. As illustrated in FIGS. 1 and 2, the liquid crystal apparatus 100 includes a first substrate 10, a second substrate 20, and a liquid crystal layer 5. The second substrate 20 is disposed to face the first substrate 10. The liquid crystal layer 5 is sandwiched between the first substrate 10 and the second substrate 20 in the Z axis, and functions as an electro-optic layer of the liquid crystal apparatus 100. The liquid crystal layer 5 includes a plurality of liquid crystals not illustrated in the drawing.

A substrate formed of a material that can transmit color light that enters the liquid crystal apparatus 100, e.g., a glass substrate, or a quartz substrate, is used for an element substrate 111 of the first substrate 10 and an opposed substrate 112 of the second substrate 20.

In plan view, the width on the X axis and the width on the Y axis of the first substrate 10 are greater than those of the second substrate 20. The first substrate 10 and the second substrate 20 are joined in the Z axis through a sealing material 6 disposed along the outer edge of the second substrate 20. In the space surrounded by the first substrate 10, the second substrate 20 and the sealing material 6, liquid crystals with positive or negative dielectric anisotropy are sealed and thus the liquid crystal layer 5 is provided.

In plan view, a display region E including a plurality of pixels P is provided inside the sealing material 6. The plurality of pixels P is arranged in a matrix along the X axis and the Y axis. In plan view, the region outside the display region E is a peripheral region F. In plan view, a dummy pixel DP is provided in a first peripheral region F1 between the sealing material 6 and the display region E in the peripheral region F. The first peripheral region F1 surrounds the display region E in the XY plane. The dummy pixel DP is disposed in a region closest to the display region E in the first peripheral region F1. The region where the dummy pixel DP is disposed is a dummy pixel region DF that does not contribute to the display.

In plan view, a partition member 23 that surrounds the display region E is provided in the first peripheral region F1. For example, an inspection circuit 41 is provided in the region between the display region E and the sealing material 6 of one side extended along the X axis and disposed on the +Y direction side in the Y axis in the first peripheral region F1. A scan line driving circuit 45 is provided in the region between the display region E and the sealing material 6 of two sides extending along the X axis in the first peripheral region F1. A plurality of wirings 49 that couples the two scan line driving circuits 45 is provided in the region between the sealing material 6 and the inspection circuit 41 in the first peripheral region F1.

A plurality of external connection terminals 43 is provided in a second peripheral region F2 of the first substrate 10 outside the sealing material 6 in the peripheral region F. The plurality of external connection terminals 43 is extended along the X axis and disposed along the X axis with a spacing therebetween in the second peripheral region F2 on the −Y direction side in the Y axis, for example. In plan view, in the second peripheral region F2, a data line driving circuit 47 is provided between the region where the plurality of external connection terminals 43 is disposed and the sealing material 6 extending along the X axis.

Wiring 49 is coupled to the data line driving circuit 47 and the scan line driving circuit 45, and coupled to the plurality of external connection terminals 43. Note that the inspection circuit 41 may be disposed in a region different from the above-described region, i.e., the region between the display region E and the sealing material 6 of one side extended along the X axis and disposed on the +Y direction side in the Y axis.

As illustrated in FIG. 2, a thin film transistor 30, the inspection circuit 41, a wiring 49, and an alignment film 12 are provided at the surface facing the liquid crystal layer 5 in the element substrate 111 as the base material of the first substrate 10. The thin film transistor 30 is a switching element provided for each pixel P. The alignment film 12 covers a pixel electrode 11, the thin film transistor 30 and the wiring 49. The thin film transistor 30 and the pixel electrode 11 are components of pixel P. The first substrate 10 includes the element substrate 111, the pixel electrode 11, the thin film transistor 30, the wiring 49, and the alignment film 12, and is composed of these components and the inspection circuit 41.

The partition member 23, an insulating layer 25, an opposite electrode 21, and an alignment film 22 are provided at the surface facing the liquid crystal layer 5 in the opposed substrate 112 as the base material of the second substrate 20. The insulating layer 25 covers the partition member 23. The opposite electrode 21 is disposed as a common electrode provided to cover the insulating layer 25. The alignment film 22 covers the opposite electrode 21. The second substrate 20 includes the partition member 23, the opposite electrode 21, and the alignment film 22, and is composed of these components and the insulating layer 25. Note that the opposite electrode 21 as a common electrode is provided at the second substrate 20 as an example, but may be provided at the first substrate 10. For example, an insulating layer not illustrated in the drawing may be provided to cover the thin film transistor 30, the inspection circuit 41 and the wiring 49, and the opposite electrode 21 may be provided between the alignment film 12 and the insulating layer not illustrated in the drawing.

In plan view as illustrated in FIG. 1, the scan line driving circuit 45 and the inspection circuit 41 overlap the partition member 23. The partition member 23 functions as a light shielding part. Light L is emitted from a light source apparatus not illustrated in the drawing, and enters the liquid crystal apparatus 100 from the second substrate 20 along the −Y direction. The partition member 23 shields light such that the light L does not enter the peripheral circuit such as the scan line driving circuit 45. The partition member 23 prevents malfunction of the peripheral circuit. The partition member 23 shields light such that unnecessary stray light does not enter the display region E. The partition member 23 prevents a decrease in contrast in the liquid crystal apparatus 100.

The insulating layer 25 is formed of an inorganic material such as silicon oxide ($SiO_2$) that is optically transparent to the light L, for example. The surface of the insulating layer 25 in contact with the liquid crystal layer 5 is a flat surface parallel to the XY plane.

In plan view, a conduction member 7 is provided at the four corners of the sealing material 6, and extended along the Z axis. The opposite electrode 21 is electrically coupled to the conduction member 7. The conduction member 7 is electrically coupled to a common wiring 18 described later.

The pixel electrode 11 and the opposite electrode 21 are formed of a transparent conducting film such as ITO (Indium Tin Oxide) and IZO (Indium Zinc Oxide), for example. The material of the alignment films 12 and 22 is selected based on the optical design of the liquid crystal apparatus 100. Examples of the material of the alignment films 12 and 22 include inorganic compounds such as silicon oxide, and organic compounds such as polyimide.

An optical design of normally white mode or normally black mode is employed for the liquid crystal apparatus 100. In the normally white mode, the transmittance of the pixel P with no voltage application is greater than the transmittance with voltage application. In the normally black mode, the transmittance of the pixel P with no voltage application is smaller than the transmittance with voltage application. In the following description, it is assumed that the liquid crystal apparatus 100 adopts an optical design of normally black mode. Note that in accordance with the optical design of the liquid crystal apparatus 100, a polarization element not illustrated in the drawing is disposed in the spaces on the incident side and the emission side of the light L for the liquid crystal apparatus 100.

Overview of Electrical Structure of Liquid Crystal Apparatus

Figure 3:
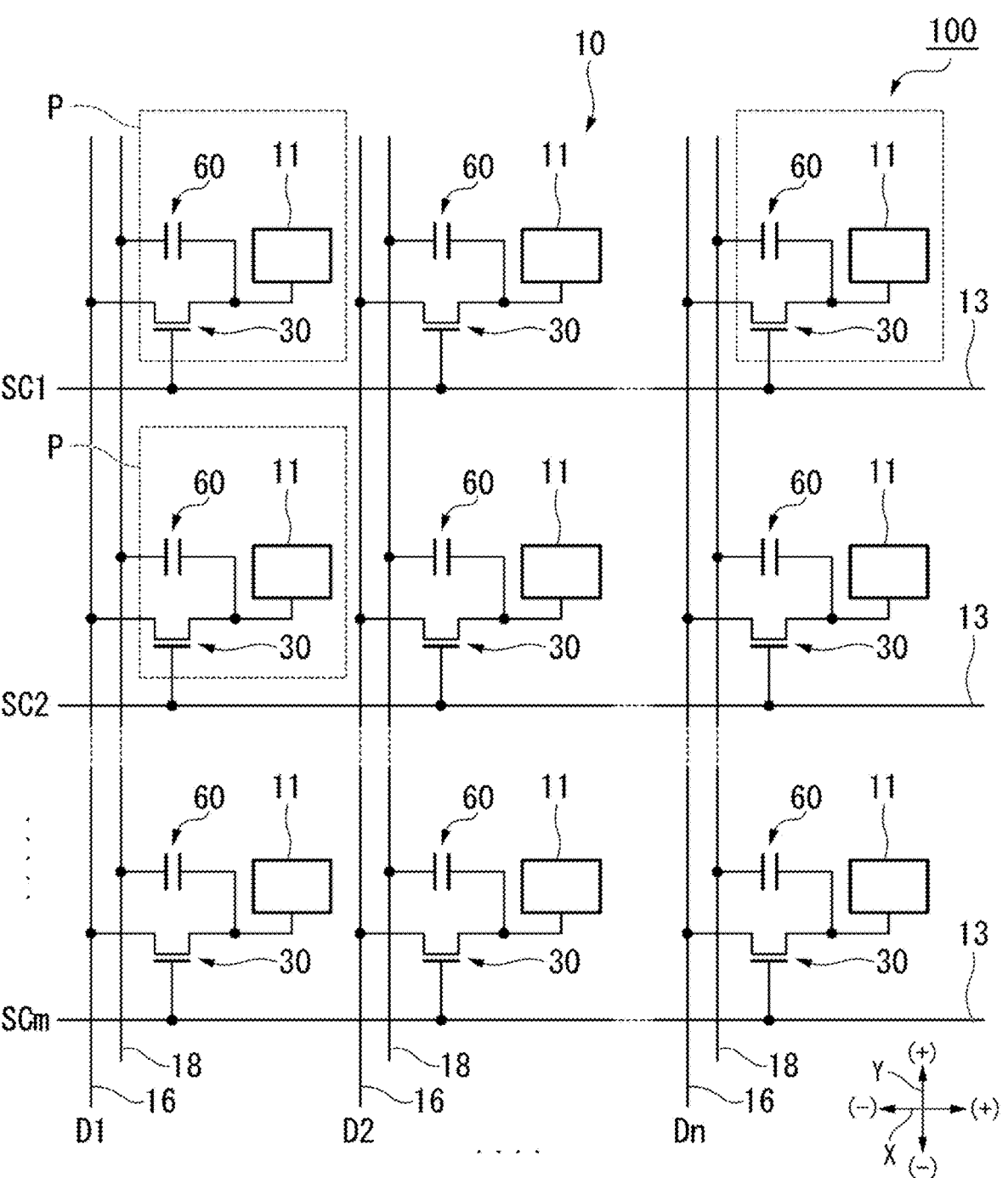
FIG. 3 is an equivalent circuit diagram of the liquid crystal apparatus of FIG. 1.

FIG. 3 is an equivalent circuit diagram of the liquid crystal apparatus 100. As illustrated in FIG. 3, in the liquid crystal apparatus 100, a plurality of scan lines 13, a plurality of data lines 16, and a plurality of the common wirings 18 are provided on the element substrate 111 of the first substrate 10. The plurality of scan lines 13 extends parallel to the X axis. The plurality of data lines 16 and the plurality of common wirings 18 extend parallel to the Y axis. The plurality of data lines 16 intersects at least the plurality of scan lines 13. That is, the extending direction of the scan line 13 and the extending direction of the data line 16 are different from each other. Note that the plurality of common wirings 18 needs not necessarily to extend along the Y axis, and the extending direction of the common wiring 18 is not limited to a specific direction.

The pixel P is defined by the scan line 13 extending along the X axis and the data line 16 extending along the Y axis. The pixel P is provided with the pixel electrode 11, the thin film transistor 30, a sixth relaying electrode 50 and a capacitive element 60.

The scan line 13 is electrically coupled to the gate of the thin film transistor 30. The data line 16 is electrically coupled to the source of the thin film transistor 30. The scan line 13 simultaneously controls the on/off of the thin film transistors 30 provided in the same row. The pixel electrode 11 is electrically coupled to the drain of the thin film transistor 30.

The data line 16 is electrically coupled to the data line driving circuit 47, and applies to the pixel P image signals D1, D2, . . . , Dn supplied from the data line driving circuit 47. The scan line 13 is electrically coupled to the scan line driving circuit 45, and supplies to each the pixel P scanning signals SC1, SC2, . . . , SCm supplied from the scan line driving circuit 45.

The image signal D1 to image signal Dn supplied from the data line driving circuit 47 to the data line 16 may be sequentially supplied, or may be collectively supplied for each group of the plurality of data lines 16 adjacent to each other. The scan line driving circuit 45 sequentially supplies the scanning signal SC1 to the scanning signal SCm to the scan line 13 in the form of pulses at predetermined timings.

When the scanning signal SC1 is input to the thin film transistor 30, the TFT 30 is set to the on state only for a certain period. In this manner, the image signal D1 supplied from the data line 16 is written in the pixel electrode 11 at a predetermined timing. The image signal D1 of a predetermined level written in the liquid crystal layer 5 through the pixel electrode 11 is held for a certain period between the opposite electrodes 21 disposed to face each other through the pixel electrode 11 and the liquid crystal layer 5.

The capacitive element 60 is electrically coupled in parallel to the liquid crystal capacitance provided between the pixel electrode 11 and the opposite electrode 21. This prevents leakage of the image signal D1 held by the liquid crystal layer 5. One end of the capacitive element 60 is electrically coupled to the drain of the TFT 30 and the pixel electrode 11. The other end of the capacitive element 60 is electrically coupled to the common wiring 18 to which a constant potential is applied.

Figure 4A:
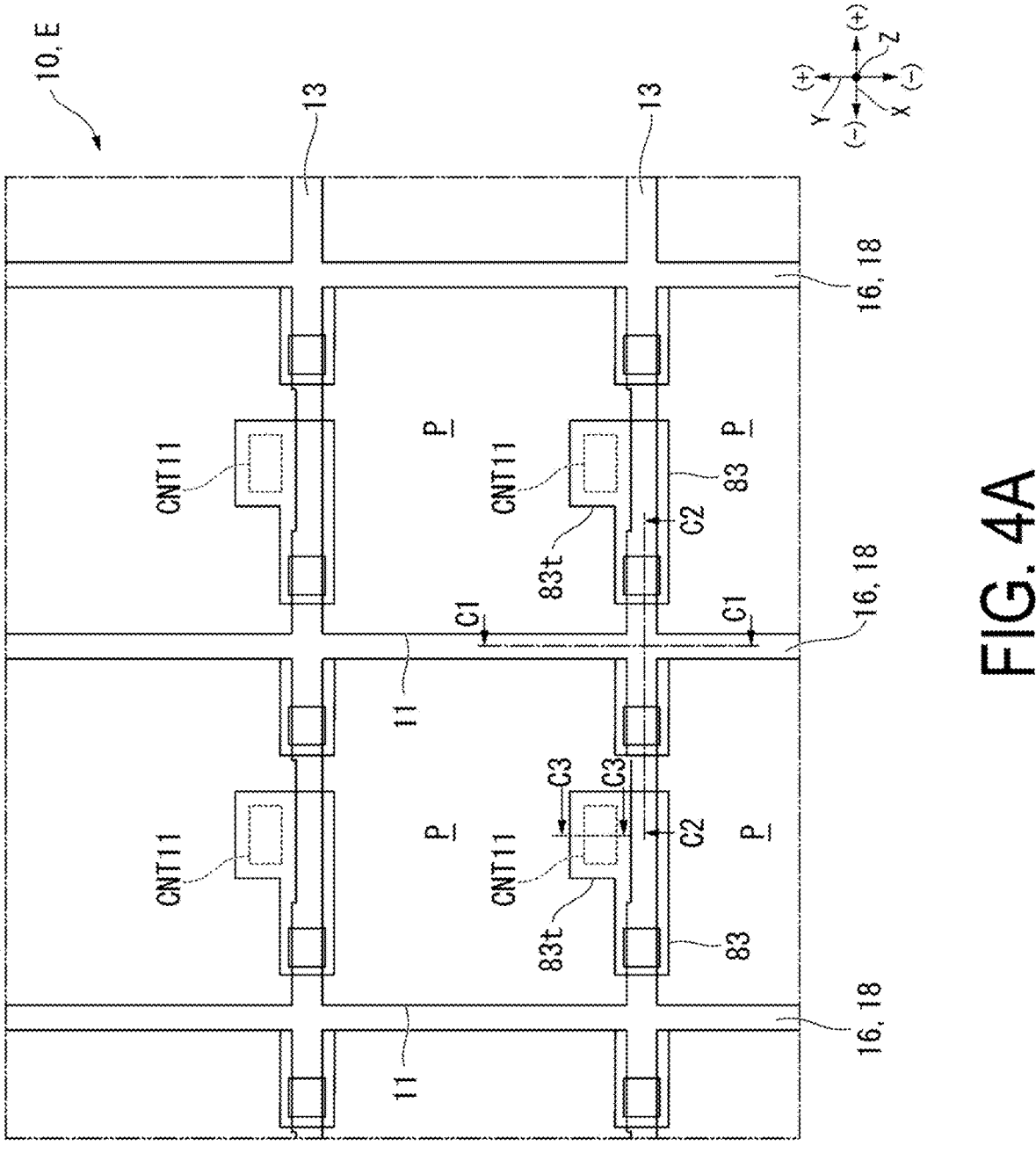
FIG. 4A is a plan view of a first substrate of the liquid crystal apparatus of FIG. 1.
Figure 4B:
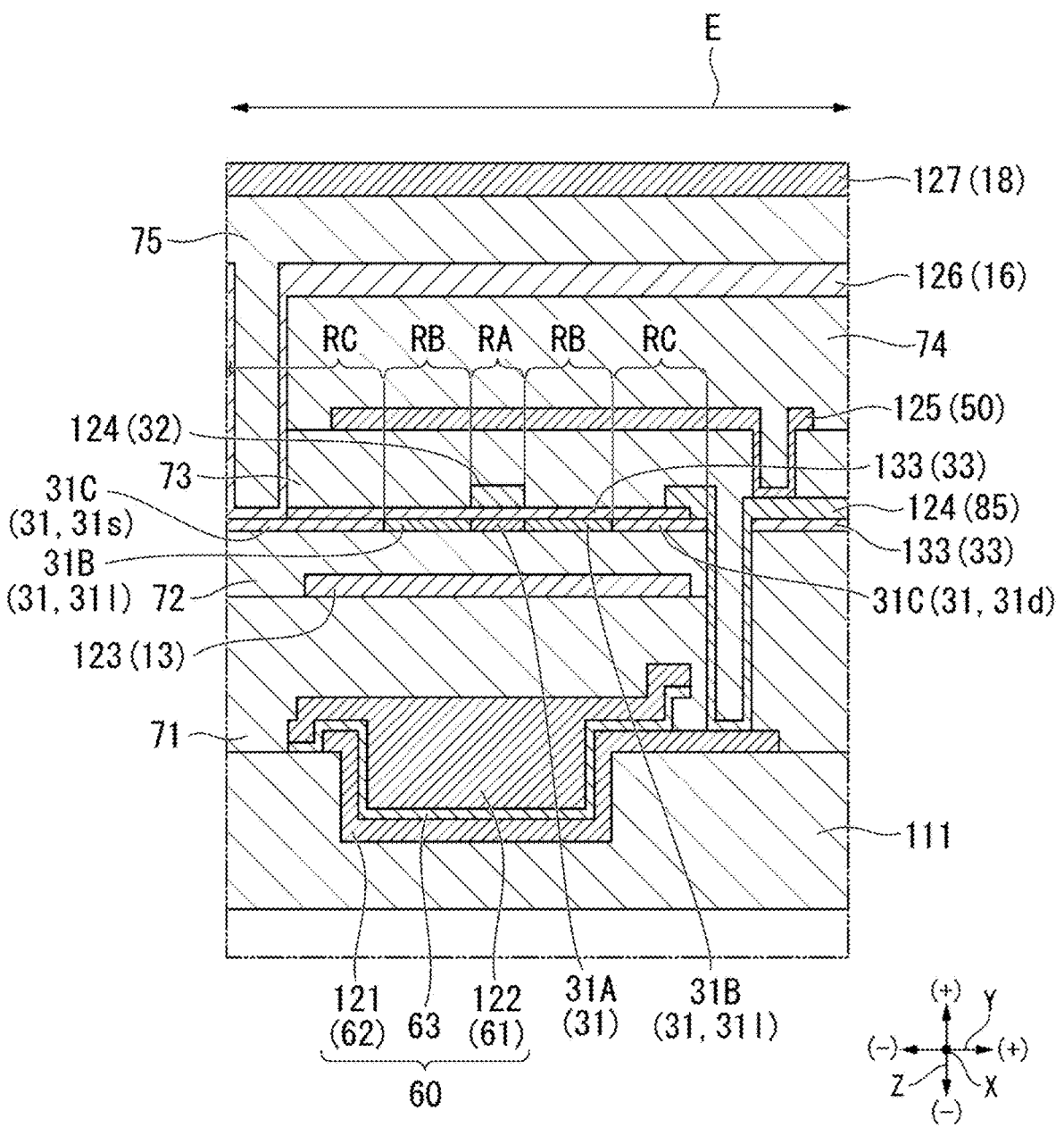
FIG. 4B is a sectional view of the first substrate of FIG. 4A.
Figure 4C:
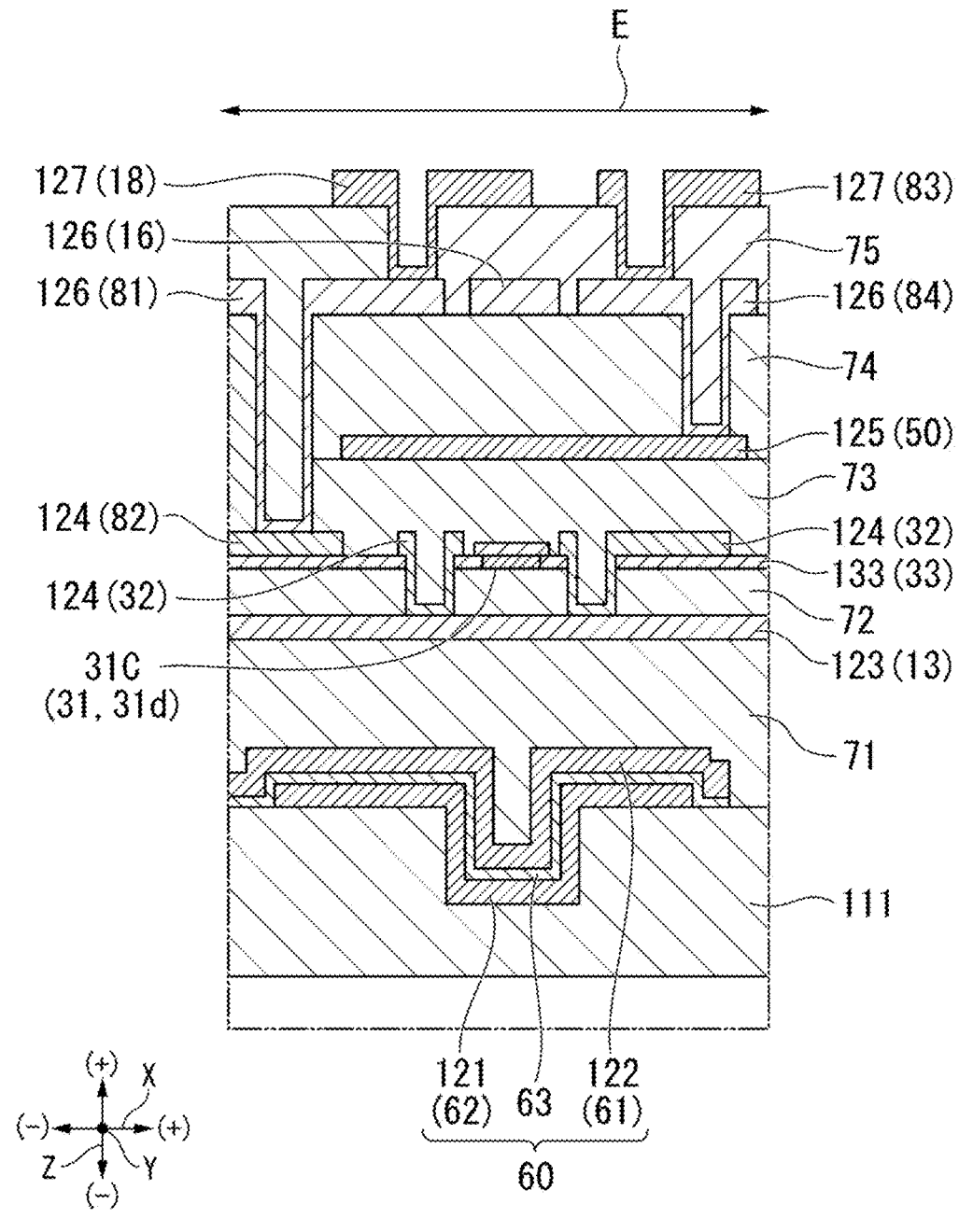
FIG. 4C is a sectional view of the first substrate of FIG. 4A.
Figure 4D:
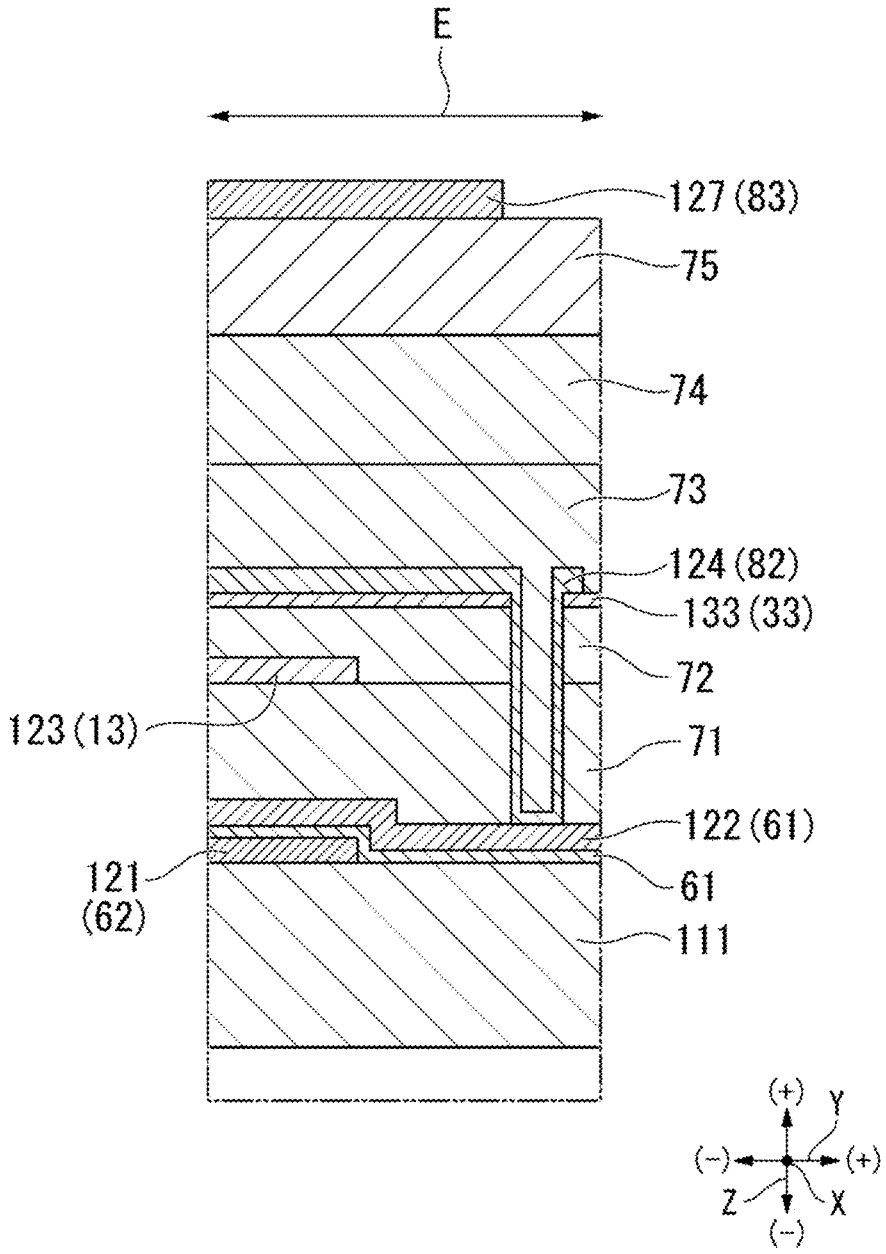
FIG. 4D is a sectional view of the first substrate of FIG. 4A.

Although omitted in FIG. 3, the inspection circuit 41 is coupled to the data line 16. Thus, in the manufacturing process of the liquid crystal apparatus 100, operation defects of the liquid crystal apparatus 100 and the like can be confirmed by detecting the image signals D1, D2, . . . , Dn.
Overview of Electrical Structure of Liquid Crystal Element FIG. 4A is a plan view of the pixel P of the liquid crystal apparatus 100. FIG. 4B is a sectional view of the pixel P, taken along the line C1-C1 illustrated in FIG. 4A. FIG. 4C is another sectional view of the pixel P, taken along the line C2-C2 illustrated in FIG. 4A. FIG. 4D is a sectional view of the pixel P, taken along the line C3-C3 illustrated in FIG. 4A. Note that in each of FIGS. 4B to 4D, the upper part structure of the pixel P described later is omitted.

As illustrated in FIGS. 4A to 4D, a first conductive layer 121, a second conductive layer 122, a third conductive layer 123, a semiconductor layer 31, a fourth conductive layer 124, a fifth conductive layer 125, a sixth conductive layer 126, a seventh conductive layer 127, and the pixel electrode 11 are sequentially stacked in the +Z direction on the element substrate 111.

The first conductive layer 121 includes a second capacitive electrode 62 of the capacitive element 60. The second conductive layer 122 includes a first capacitive electrode 61 of the capacitive element 60. The third conductive layer 123 includes the scan line 13. The semiconductor layer 31 and the fourth conductive layer 124 make up the thin film transistor 30. A top-gate structure and an LDD (Lightly Doped Drain) structure are employed for the thin film transistor 30. The semiconductor layer 31 includes the semiconductor layer 31A of a first region RA, the semiconductor layer 31B of a second region RB, and the semiconductor layer 31C of a third region RC. The fourth conductive layer 124 includes a gate electrode 32 of the thin film transistor 30. An insulating film 133 as a gate insulating film 33 is provided between the semiconductor layer 31 and the gate electrode 32 of the fourth conductive layer 124.

The semiconductor layer 31A is provided adjacent to the gate electrode 32 of the fourth conductive layer 124 through the gate insulating film 33 in the Z axis. Specifically, the semiconductor layer 31A is disposed below the gate electrode 32 with the gate insulating film 33 therebetween. In the semiconductor layer 31, the semiconductor layer 31B is provided adjacent to the semiconductor layer 31A in the Y axis on the +Y direction side and the −Y direction side of the semiconductor layer 31A. Impurities such as phosphor (P) are injected in the semiconductor layer 31B. The semiconductor layer 31C includes the remaining portion other than the semiconductor layers 31A and 31B in the semiconductor layer 31, and is provided adjacent to the semiconductor layer 31B in the Y axis on the +Y direction side and the −Y direction side than the semiconductor layer 31B. As in the semiconductor layer 31B, impurities such as phosphor are injected in the semiconductor layer 31C. It should be noted that the impurity concentration of the semiconductor layer 31C of the third region RC is higher than the impurity concentration of the semiconductor layer 31B of the second region RB. The semiconductor layers 31B and 31C provided on the +Y direction side than the gate electrode 32 in the Y axis make up one of the drain region and the source region of the thin film transistor 30, and they make up a drain region 31d in this embodiment. The semiconductor layers 31B and 31C provided on the −Y direction side in the Y axis than the gate make up the other of the drain region and the source region of the thin film transistor 30, and they make up a source region 31s in this embodiment. Specifically, impurities are added at a predetermined concentration required as the drain region and the source region of the thin film transistor 30 in the semiconductor layer 31C of the third region RC. As described above, impurities are added in the semiconductor layer 31B of the second region RB at a concentration lower than a predetermined concentration. The semiconductor layer 31B makes up an LDD 311. With the semiconductor layer 31B, the electric field and the impurity distribution of the source-drain diffusion layer during operation of the thin film transistor 30 are mitigated, and degradation of the thin film transistor 30 is suppressed.

The fifth conductive layer 125 includes a sixth relaying electrode 50. The sixth conductive layer 126 includes the data line 16. The seventh conductive layer 127 includes the common wiring 18.

A second dielectric film 63 is provided between the first conductive layer 121 as the second capacitive electrode 62 and the second conductive layer 122 as the first capacitive electrode 61. A first interlayer insulating layer 71 is provided between the second conductive layer 122 and the third conductive layer 123. A second interlayer insulating layer 72 is provided between the third conductive layer 123 and the semiconductor layer 31. A third interlayer insulating layer 73 as a second insulating layer is provided between the fourth conductive layer 124 and the fifth conductive layer 125. A fourth interlayer insulating layer 74 as a first insulating layer is provided between the fifth conductive layer 125 and the sixth conductive layer 126. A fifth interlayer insulating layer 75 is provided between the sixth conductive layer 126 and the seventh conductive layer 127.

As illustrated in FIG. 4B, the capacitive element 60 includes the first capacitive electrode 61 disposed on the side closer to the scan line 13 in the Z axis, i.e., the +Z direction side, and the second capacitive electrode 62 disposed on the side closer to the element substrate 111 than the first capacitive electrode 61 in the Z axis, i.e., the −Z direction side.

As illustrated in FIGS. 4C and 4D, the first capacitive electrode 61 of the capacitive element 60 is electrically coupled to the common wiring 18 through a first relaying electrode 81 included in the sixth conductive layer 126 and a second relaying electrode 82 included in the fourth conductive layer 124. As illustrated in FIG. 4C, the common wiring 18 and the second relaying electrode 82 are electrically coupled through the first relaying electrode 81 disposed in the sixth conductive layer 126. As illustrated in FIG. 4C, the second relaying electrode 82 is electrically coupled to a protruding portion 61t of the first capacitive electrode 61 of the capacitive element 60. As described later, the protruding portion 61t is a part of the first capacitive electrode 61.

The sixth relaying electrode 50 and the second capacitive electrode 62 of the capacitive element 60 are electrically coupled to the pixel electrode 11 and the drain region 31d of the thin film transistor 30. As illustrated in FIG. 4D, the pixel electrode 11 is electrically coupled to a third relaying electrode 83 included in the seventh conductive layer 127. As illustrated in FIG. 4C, the third relaying electrode 83 is electrically coupled to a fourth relaying electrode 84 included in the sixth conductive layer 126. The fourth relaying electrode 84 is electrically coupled to the sixth relaying electrode 50. As illustrated in FIG. 4B, the sixth relaying electrode 50 is electrically coupled to a fifth relaying electrode 85 included in the fourth conductive layer 124. The fifth relaying electrode 85 is electrically coupled to the second capacitive electrode 62 of the capacitive element 60.

The signal wirings such as the scan line 13 and the common wiring 18, the thin film transistor 30, and the electrodes such as the first relaying electrode 81 are provided in a light shielding region SD that planarly sections the plurality of pixels P. The light shielding region SD includes a linear portion including the scan line 13 extending along the X axis and a linear portion including the data line 16 extending along the Y axis, and is provided in a grid pattern in plan view.

Figure 5A:
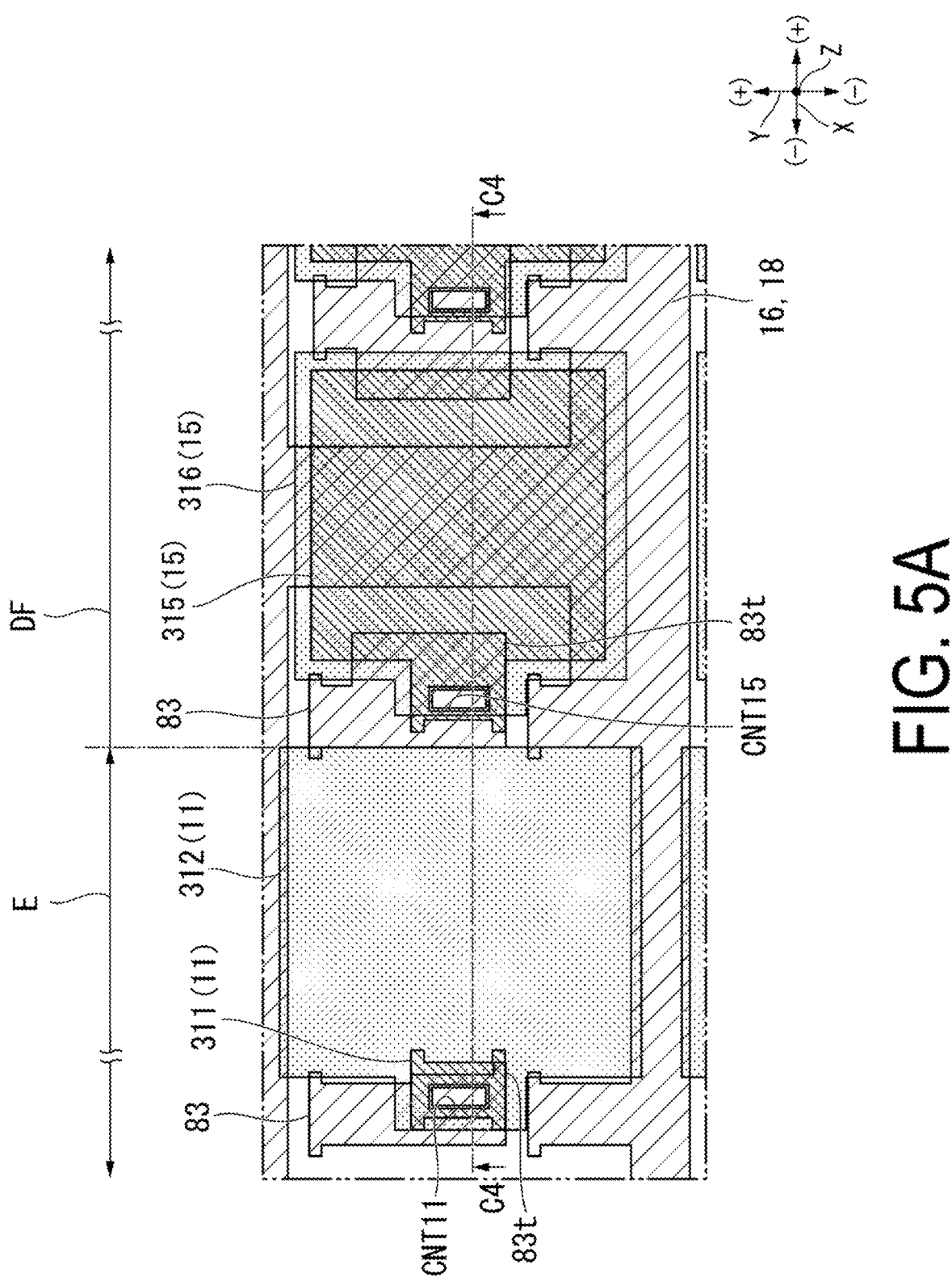
FIG. 5A is a plan view of an upper part structure of a pixel and a dummy pixel of the liquid crystal apparatus of FIG. 1.

FIG. 5A is a plan view of an upper part structure of the pixel P and the dummy pixel DP of the liquid crystal apparatus 100.

Figure 5B:
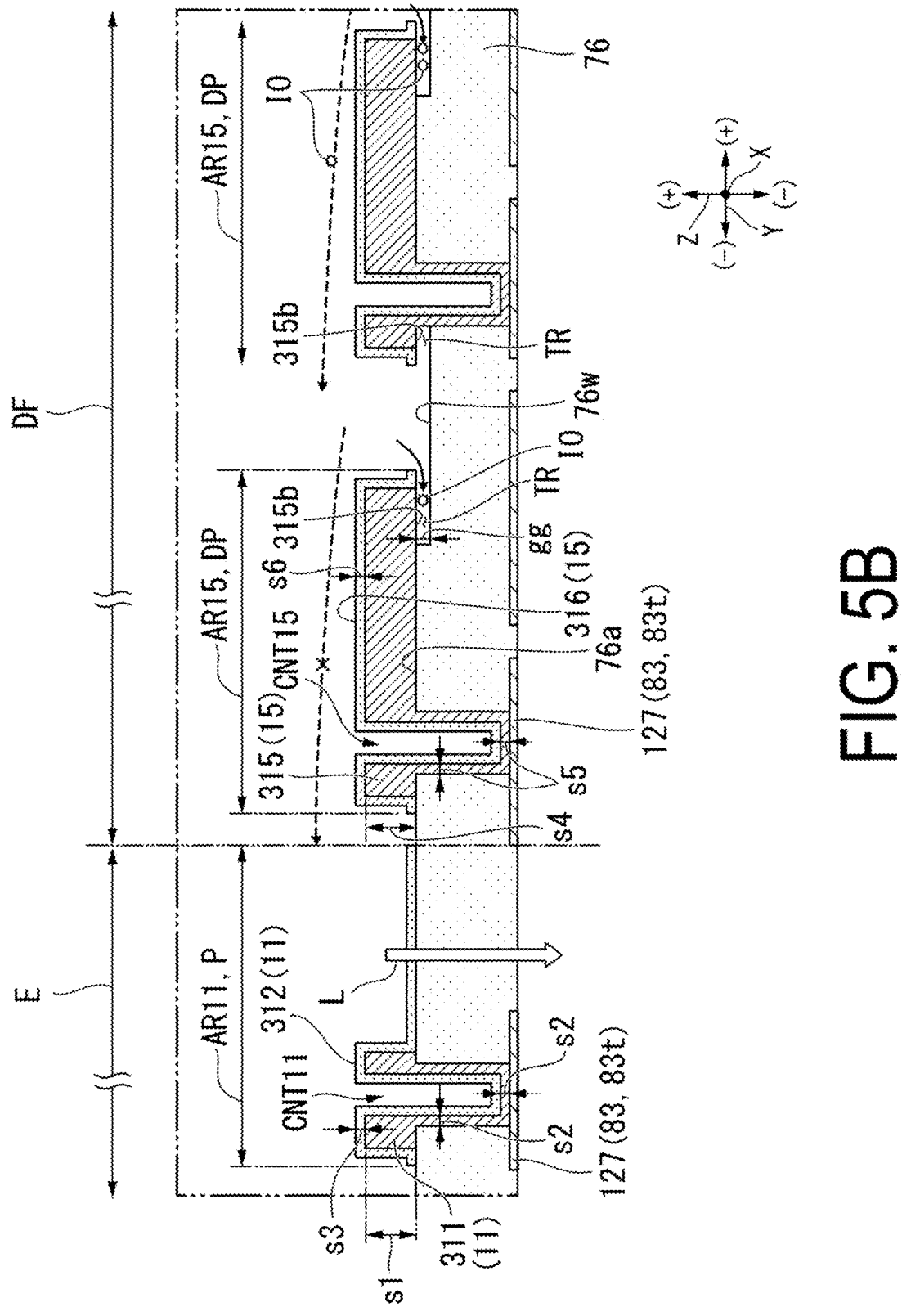
FIG. 5B is a sectional view of the upper part structure of the pixel and the dummy pixel of the liquid crystal apparatus of FIG. 1.

FIG. 5B is a sectional view of the upper part structure of the pixel P and the dummy pixel DP, taken along the line C4-C4 illustrated in FIG. 5A. Note that the upper part structure means a structure formed on the +Z direction side than the fifth interlayer insulating layer 75, including the seventh conductive layer 127 in the Z axis. In FIGS. 5A and 5B, the alignment film 12 is omitted.

As illustrated in FIGS. 5A and 5B, a sixth interlayer insulating layer 76 is provided on the seventh conductive layer 127 provided in the upper part of the first substrate 10, i.e., a portion on the +Z direction side of the first substrate 10$a$ in the display region E. The sixth interlayer insulating layer 76 is also formed on the seventh conductive layer 127 provided in the upper part of the first substrate 10, i.e., a portion on the +Z direction side of the first substrate 10$a$ in the dummy pixel region DF outside the display region E in plan view. The same structure as the structure of the pixel P on the −Z direction side than the upper part structure above the element substrate 111 is formed in the dummy pixel region DF for the purpose of preventing occurrence of display defects such as color unevenness of the liquid crystal apparatus 100.

The pixel electrode 11 is provided for each of the plurality of pixels P of the display region E. In plan view, the pixel electrode 11 is provided on the sixth interlayer insulating layer 76 in an opening region AR11 defined as the pixel P. The pixel electrode 11 includes a first pixel electrode layer 311 and a second pixel electrode layer 312.

In plan view, the first pixel electrode layer 311 is disposed only in a region corresponding to the center portion of the opening region AR11 in the X axis at the end portion on the −Y direction side in the opening region AR11, and overlaps a protruding portion 83$t$ of the third relaying electrode 83 of the pixel P. Note that in FIG. 5B, the illustration of the steps of the common wiring 18 and the third relaying electrode 83 included in the seventh conductive layer 127 in the Z axis is omitted. The first pixel electrode layer 311 is coupled to the protruding portion 83$t$ of the third relaying electrode 83 of the pixel P by a contact hole CNT 11 formed in the center portion in the X axis at the end portion on the −Y direction side in the opening region AR11 in plan view, and thus electrically coupled to the third relaying electrode 83 of the pixel P.

The first pixel electrode layer 311 is formed on the sixth interlayer insulating layer 76 near the periphery of the center portion in the X axis at the end portion on the −Y direction side in the opening region AR11 in plan view. Thus, the first pixel electrode layer 311 is provided also on the sixth interlayer insulating layer 76 making up the wall surface and bottom of the contact hole CNT 11. A thickness s1, i.e., the height in the Z axis of the first pixel electrode layer 311 formed on the surface parallel to the XY plane of the sixth interlayer insulating layer 76 is greater than a thickness s2, i.e., the height in the XY plane or in the Z axis of the first pixel electrode layer 311 formed at the wall surface and bottom of the contact hole CNT 11. The first pixel electrode layer 311 is composed of a transparent conductive material such as ITO, for example.

The second pixel electrode layer 312 is formed in a region overlapping the first pixel electrode layer 311 in plan view to cover the entire surface exposed from the sixth interlayer insulating layer 76 in the first pixel electrode layer 311. The second pixel electrode layer 312 is provided in the entirety of the opening region AR11 including the region overlapping the first pixel electrode layer 311 in plan view. The second pixel electrode layer 312 covers the first pixel electrode layer 311 from the +Z direction side as described above, and covers the surface of the sixth interlayer insulating layer 76 in the region where the first pixel electrode layer 311 is not provided in plan view in the opening region AR11.

The second pixel electrode layer 312 is provided with a substantially constant thickness in the opening region AR11. The thickness, i.e., the height in the XY plane or in the Z axis of the second pixel electrode layer 312 formed to cover the first pixel electrode layer 311 is the same as the thickness, i.e., the height in the Z axis of the second pixel electrode layer 312 on the sixth interlayer insulating layer 76 in the region where the first pixel electrode layer 311 is not provided in plan view in the opening region AR11. A thickness s3 of the second pixel electrode layer 312 is smaller than the thickness s1 of the first pixel electrode layer 311, and is the same as the thickness s2 of the first pixel electrode layer 311. The second pixel electrode layer 312 is composed of a transparent conductive material with higher oxygen content than a transparent conductive material such as ITO making up the first pixel electrode layer 311, for example. The thickness s1 of the first pixel electrode layer 311 is about 140 nm, for example. In this case, the thickness s3 of the second pixel electrode layer 312 is about 10 nm to 20 nm, for example.

In the opening region AR11 of the pixel P of the display region E, in plan view, the area of the region corresponding to the center portion in the X axis and the end portion on the −Y direction side where the first pixel electrode layer 311 is provided is significantly smaller than the region where the first pixel electrode layer 311 is not provided. That is, in most of the region of the opening region AR11, the first pixel electrode layer 311 is not provided, and only the second pixel electrode layer 312 is provided with a thickness smaller than the first pixel electrode layer 311. Thus, the transmittance of the incident light L from the +Z direction side of the first substrate 10, i.e., the alignment film 12 side not illustrated in the drawing toward the element substrate 111 is improved than the case where the first pixel electrode layer 311 is provided in the entirety of the opening region AR11.

In order to increase the transmittance of the light L that enters the liquid crystal apparatus 100 from the +Z direction side as described above, the thickness s3 of the second pixel electrode layer 312 is equal to or smaller than ⅕, more preferably ⅛, still more preferably ⅒ of the thickness s1 of the first pixel electrode layer 311.

A dummy pixel electrode 15 is provided for each of the plurality of dummy pixels DP of the dummy pixel region DF. In plan view, the dummy pixel electrode 15 is provided on the sixth interlayer insulating layer 76 of an opening region AR15 defined as the dummy pixel DP. The shape in plan view of the dummy pixel electrode 15 is different from the shape in plan view of the pixel electrode 11. The dummy pixel electrode 15 includes a first dummy pixel electrode layer 315 and a second dummy pixel electrode layer 316.

In plan view, the first dummy pixel electrode layer 315 is disposed only in the region corresponding to the center portion in the X axis in the opening region AR15 and the end portion on the −Y direction side in the opening region AR15, and overlaps the protruding portion 83*t* of the third relaying electrode 83 in the dummy pixel DP. The first dummy pixel electrode layer 315 is coupled to the protruding portion 83*t* of the third relaying electrode 83 of the dummy pixel DP by the contact hole CNT15 formed in the center portion in the X axis and the end portion on the −Y direction side in the opening region AR15 in plan view, and electrically coupled to the third relaying electrode 83 of the dummy pixel DP. Note that the contact hole CNT15 is formed simultaneously with the contact hole CNT 11 in the step of forming the contact hole CNT 11 in the sixth interlayer insulating layer 76.

The first dummy pixel electrode layer 315 is formed over almost the entirety of the opening region AR15 in plan view. The first dummy pixel electrode layer 315 is provided also on the sixth interlayer insulating layer 76 making up the wall surface and bottom of the contact hole CNT15. The shape in plan view and area of the opening region AR15 making up the dummy pixel DP is substantially the same as the shape in plan view and area of the opening region AR11 making up the pixel P. In plan view, the first dummy pixel electrode layer 315 is greater than the first pixel electrode layer 311.

A thickness s4, i.e., the height in the Z axis of the first dummy pixel electrode layer 315 formed on the surface parallel to the XY plane of the sixth interlayer insulating layer 76 is the same as the thickness s1 of the first pixel electrode layer 311, and is greater than a thickness s5, i.e., the height in the XY plane or in the Z axis of the first dummy pixel electrode layer 315 formed at the wall surface and bottom of the contact hole CNT15. The first dummy pixel electrode layer 315 is composed of a transparent conductive material such as ITO, and is formed of the same material as that of the first pixel electrode layer 311.

In plan view, the second dummy pixel electrode layer 316 is formed in the entirety of the opening region AR15 to cover the entire surface exposed from the sixth interlayer insulating layer 76 in the first dummy pixel electrode layer 315.

The second dummy pixel electrode layer 316 is provided with a substantially constant thickness in the opening region AR15. A thickness s6, i.e., the height in the XY plane or in the Z axis of the second dummy pixel electrode layer 316 formed to cover the first dummy pixel electrode layer 315 is smaller than the thickness s4 of the first dummy pixel electrode layer 315, and is the same as the thickness s5 of the first dummy pixel electrode layer 315 and the thickness s3 of the second pixel electrode layer 312. The second dummy pixel electrode layer 316 is composed of a transparent conductive material with higher oxygen content than a transparent conductive material such as ITO making up the first dummy pixel electrode layer 315, and is composed of the same material as that of the second pixel electrode layer 312, for example. The thickness s4 of the first dummy pixel electrode layer 315 is about 140 nm, for example. In this case, the thickness s6 of the second dummy pixel electrode layer 316 is about 10 nm, for example.

As described above, in plan view, the first dummy pixel electrode layer 315 and the second dummy pixel electrode layer 316 are provided on the sixth interlayer insulating layer 76 overlapping the opening region AR15, i.e., on the +Z direction side than the sixth interlayer insulating layer 76. It should be noted that in at least a part of the region not overlapping the third relaying electrode 83 in the opening region AR15, the first dummy pixel electrode layer 315 and the second dummy pixel electrode layer 316 are separated from the sixth interlayer insulating layer 76 in the Z axis. The region on the +Y direction side in the opening region AR15 is preferable as the at least a part of the region not overlapping the third relaying electrode 83 in the opening region AR15. The region on the +Y direction side in the opening region AR15 is farthest away from the contact hole CNT15 in comparison with the other region in the opening region AR15, and is close to the outside of the dummy pixel region DF in plan view.

More specifically, in plan view, the sixth interlayer insulating layer 76 overlapping the region on the +Y direction side in each opening region AR15 of the dummy pixel region DF is recessed to the −Z direction side than the sixth interlayer insulating layer 76 overlapping the center region of the opening region AR15. In one or more opening regions AR15 except for the opening region AR15 closest to the display region E in the XY plane in the dummy pixel region DF, the sixth interlayer insulating layer 76 overlapping the region on the −Y direction side than the first dummy pixel electrode layer 315 on the −Y direction side provided at the contact hole CNT15 is recessed to the −Z direction side than the sixth interlayer insulating layer 76 overlapping the center region of the opening region AR15.

In the opening region AR15, a spacing gg in the Z axis is formed between the surface 76*a* of the sixth interlayer insulating layer 76 overlapping the center region in plan view and a surface 76*w* of the sixth interlayer insulating layer 76 overlapping the outer periphery region including the region on the +Y direction side than the center region and on the −Z direction side than the surface 76*w*. In the opening region AR15, a space TR is formed between the surface 76*w* of the sixth interlayer insulating layer 76 and a bottom surface 315*b*, i.e., the −Z direction side surface, of the first dummy pixel electrode layer 315 in the outer periphery region in plan view, and the bottom surface, i.e., the −Z direction side surface, of the second dummy pixel electrode layer 316 in the outer periphery region. Note that the bottom surface 315*b* of the first dummy pixel electrode layer 315 substantially acts as the upper wall surface, i.e., the +Z direction side wall surface of the space TR, and as such the reference numeral of the bottom surface of the second dummy pixel electrode layer 316 is omitted in FIG. 5B.

In the manufacturing process of the liquid crystal apparatus, the ionic impurities IO may be diffused toward the liquid crystal layer 5 of the display region E from the sealing material 6 and the like through the first peripheral region F1 and the dummy pixel region DF. In the liquid crystal apparatus 100, the space TR is formed in each opening region AR15 in the dummy pixel region DF as described above. In this manner, the ionic impurities IO diffused from the sealing material 6 and the like toward the display region E through the dummy pixel region DF are captured in the space TR through the gap between the opening regions AR15 adjacent to each other in the XY plane, for example. In the XY plane, the space TR is formed in the plurality of opening regions AR15, and thus the capturing probability of the ionic impurities IO in the space TR is increased. Since the ionic impurities IO are captured in the space TR, the ionic impurities IO that reach the display region E are effectively reduced, and the occurrence of display defects such as corner staining, display unevenness, and burn-in in the liquid crystal apparatus 100 is prevented.

The spacing gg is not limited to a specific value. The greater the spacing gg, the higher the capturing probability of the ionic impurities IO in the space TR. It should be noted that the spacing gg is appropriately set in such a manner as not to excessively reduce the spacing in the Z axis between the surface 76w and the surface, i.e., the +Z direction side surface of the third relaying electrode 83 in the dummy pixel region DF. In addition, the spacing gg is greater than the film thickness of the alignment film 12, which is not illustrated in the drawing, provided on the +Z direction side of the pixel electrode 11 and the dummy pixel electrode 15.

Overview of Manufacturing Method of Liquid Crystal Apparatus

Next, a manufacturing method of the liquid crystal apparatus 100 is described. Note that the following describes a manufacturing process of the first substrate 10 including characteristic configurations in a manufacturing method of the liquid crystal apparatus 100.

Note that basically, the first substrate 10 can be manufactured by methods used in known semiconductor processes, including reduced-pressure CVD (Chemical Vapor Deposition), atmospheric pressure CVD, plasma CVD, photolithography, sputtering, etching, and CMP (Chemical Mechanical Planarization) methods, or by a combination of these methods. The following describes a suitable manufacturing method for manufacturing the structure of the first substrate 10 of the liquid crystal apparatus 100, but other manufacturing methods may be used as long as equivalent structures can be formed and the functions and characteristics required for the configurations are ensured.

Figure 6A:
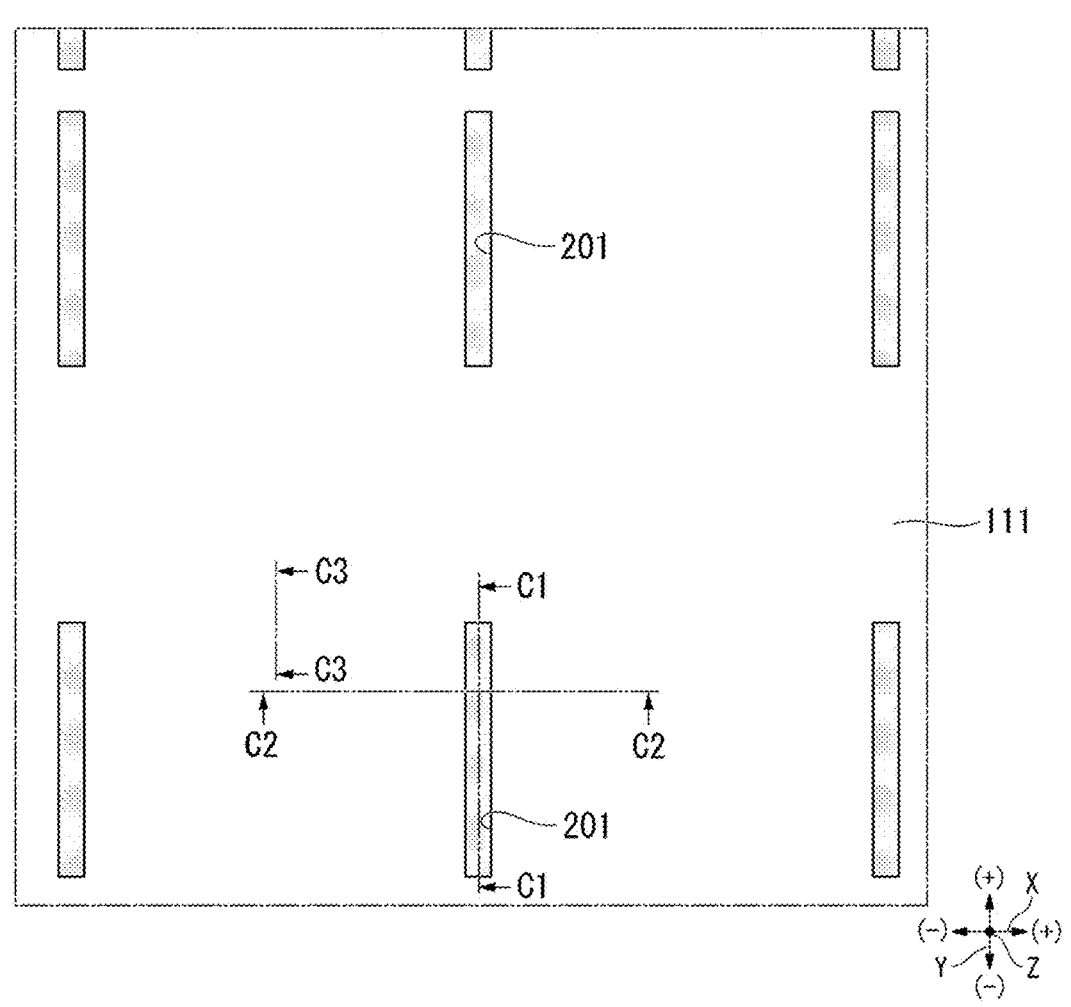
FIG. 6A is a plan view for describing a manufacturing process of the first substrate of the liquid crystal apparatus of FIG. 1.
Figure 6B:
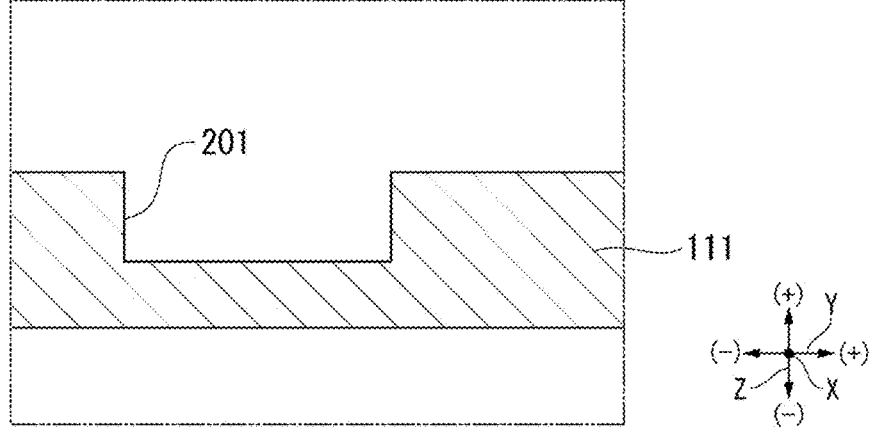
FIG. 6B is a sectional view for describing a manufacturing process of the first substrate of the liquid crystal apparatus of FIG. 1.
Figure 6C:
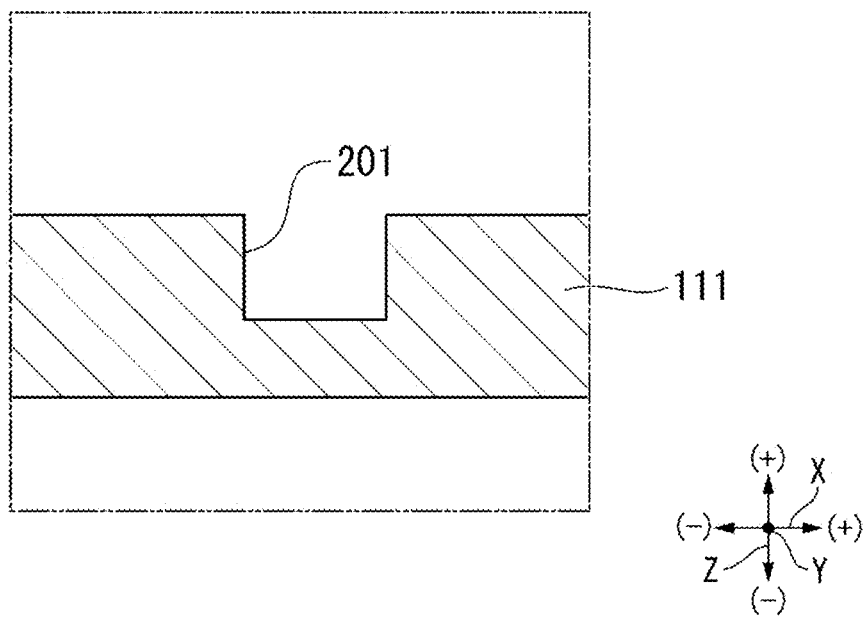
FIG. 6C is a sectional view for describing a manufacturing process of the first substrate of the liquid crystal apparatus of FIG. 1.
Figure 6D:
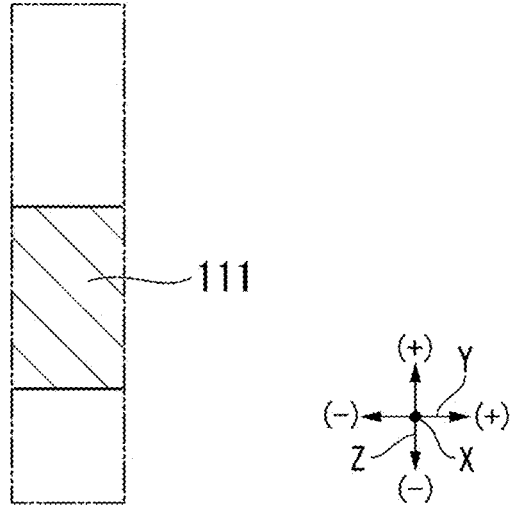
FIG. 6D is a sectional view for describing a manufacturing process of the first substrate of the liquid crystal apparatus of FIG. 1.

FIG. 6A is a plan view illustrating a manufacturing process for the first substrate 10. FIG. 6B is a sectional view illustrating a manufacturing process for the first substrate 10, taken along the line C1-C1 illustrated in FIG. 6A. FIG. 6C is another sectional view illustrating a manufacturing process for the first substrate 10, taken along the line C2-C2 illustrated in FIG. 6A. FIG. 6D is a sectional view illustrating a manufacturing process for the first substrate 10, taken along the line C3-C3 illustrated in FIG. 6A. As illustrated in FIGS. 6A to 6D, a plurality of trenches 201 is formed in the light shielding region SD not illustrated in the drawing in the surface of the element substrate 111. The width on the Y axis of each trench 201 is greater than the width on the X axis. That is, each trench 201 is formed in a slender shape along the Y axis.

Figure 7A:
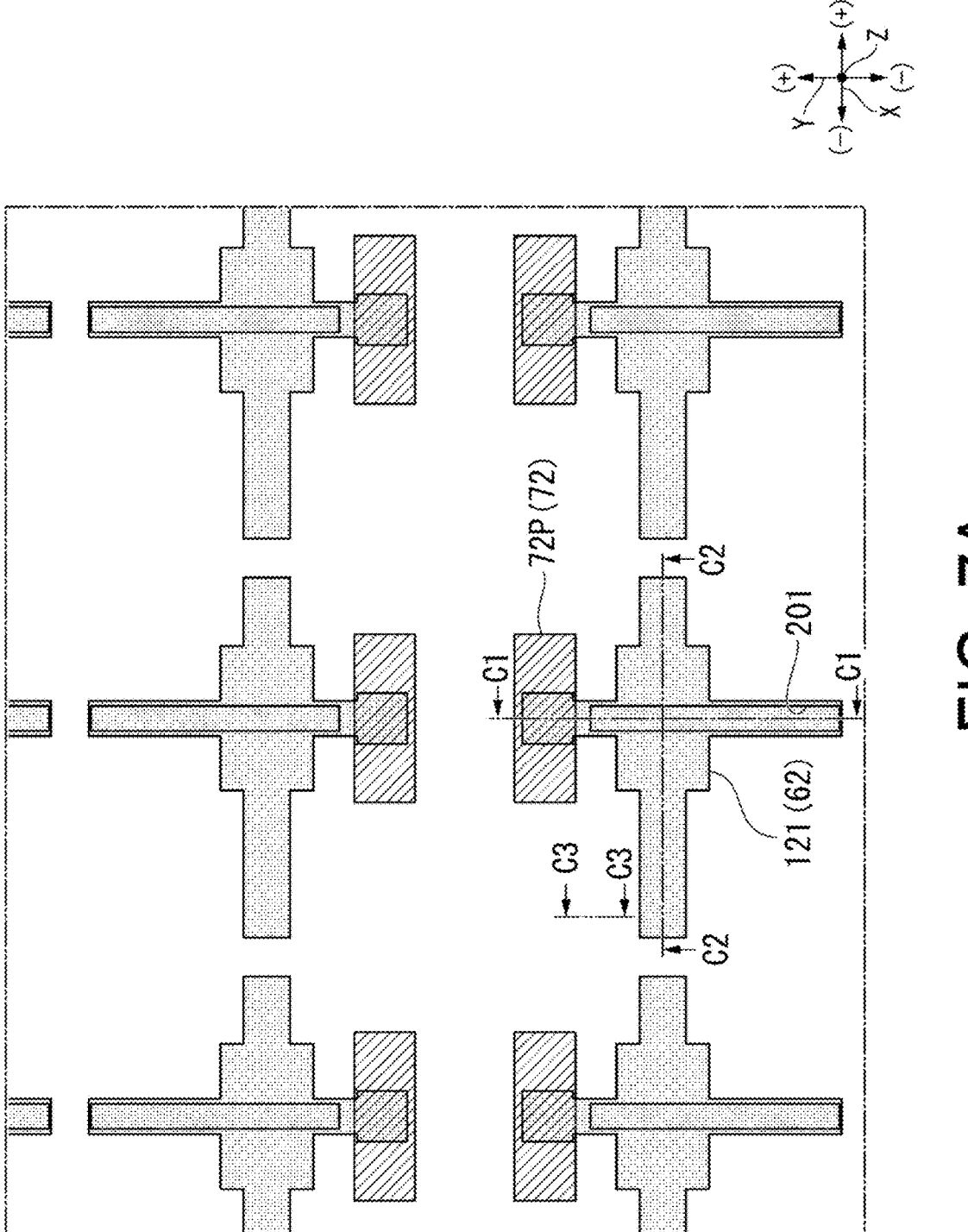
FIG. 7A is a plan view for describing a manufacturing process of the first substrate of the liquid crystal apparatus of FIG. 1.
Figure 7B:
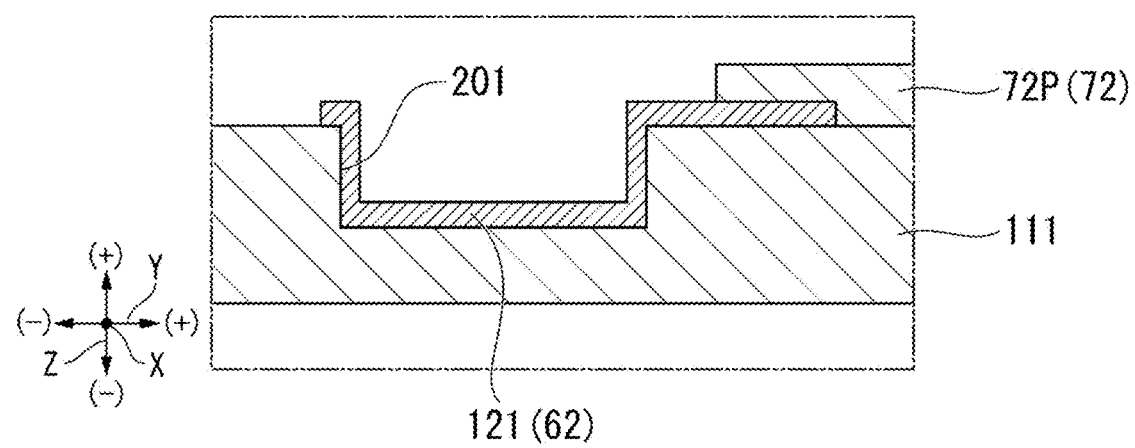
FIG. 7B is a sectional view for describing a manufacturing process of the first substrate of the liquid crystal apparatus of FIG. 1.
Figure 7C:
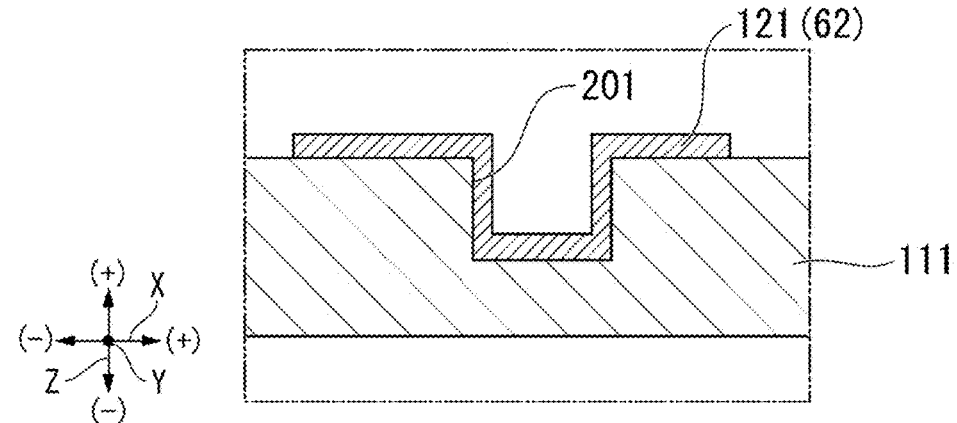
FIG. 7C is a sectional view for describing a manufacturing process of the first substrate of the liquid crystal apparatus of FIG. 1.
Figure 7D:
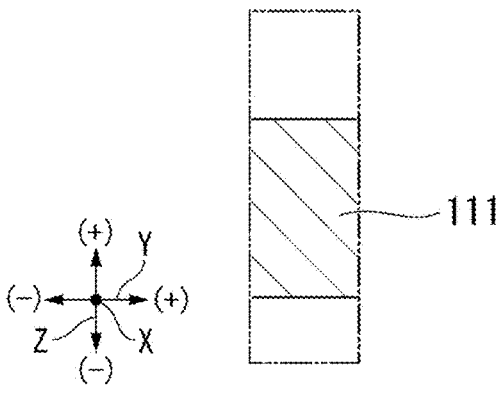
FIG. 7D is a sectional view for describing a manufacturing process of the first substrate of the liquid crystal apparatus of FIG. 1.

FIG. 7A is a plan view illustrating a manufacturing process for the first substrate 10. FIG. 7B is a sectional view illustrating a manufacturing process for the first substrate 10, taken along the line C1-C1 illustrated in FIG. 7A. FIG. 7C is another sectional view illustrating a manufacturing process for the first substrate 10, taken along the line C2-C2 illustrated in FIG. 7A. FIG. 7D is a sectional view illustrating a manufacturing process for the first substrate 10, taken along the line C3-C3 illustrated in FIG. 7A. As illustrated in FIGS. 7A to 7D, the second capacitive electrode 62 of the capacitive element 60 is formed at the trench 201.

Specifically, a conductive polysilicon film is formed on the element substrate 111 including the inner wall surface of the trench 201. On the element substrate 111, the first conductive layer 121 composed of a deposit polysilicon containing phosphor is formed with a film thickness of 50 nm to 100 nm. Thereafter, the second capacitive electrode 62 is formed by performing patterning through dry etching to obtain the shape illustrated in FIGS. 7A to 7C.

The conductive layer making up the second capacitive electrode 62 covers the inner wall surface of the trench 201 in the X axis and the Y axis, and protrudes from the upper end of the side wall surface of the trench 201 to the surface of the element substrate 111 on both sides of the trench 201. The width on the Y axis of the conductive layer making up the second capacitive electrode 62 protruding further to the +Y direction side along the surface of the element substrate 111 from the upper end of the side wall surface parallel to the X axis on the +Y direction side of the trench 201 is greater than the width on the Y axis of the conductive layer making up the second capacitive electrode 62 protruding further to the −Y direction side along the surface of the element substrate 111 from the upper end of the side wall surface parallel to the X axis on the −Y direction side of the trench 201. The width on the X axis of the conductive layer making up the second capacitive electrode 62 protruding further to the +X direction side along the surface of the element substrate 111 from the upper end of the side wall surface parallel to the Y axis on the +X direction side of the trench 201 is smaller than the width on the X axis of the conductive layer making up the second capacitive electrode 62 protruding further to the −X direction side along the surface of the element substrate 111 from the upper end of the side wall surface parallel to the Y axis on the −X direction side of the trench 201.

After the second capacitive electrode 62 is formed, an oxide film 72P that covers a part of the second capacitive electrode 62 is formed. The part of the second capacitive electrode 62 is the end portion of the second capacitive electrode 62 protruding further to the +Y direction side along the surface of the element substrate 111 from the upper end of the side wall surface parallel to the X axis on the +Y direction side of the trench 201. In plan view, the oxide film 72P is formed in an island shape to cover the above-described end portion of the second capacitive electrode 62. The oxide film 72P is a TEOS (Tetraethyl Orthosilicate) film, or an HTO (High Temperature Oxide) film, for example. The film thickness of the oxide film 72P is about 100 nm. After the oxide film composed of TEOS or the like is formed, patterning is performed to form the oxide film 72P with an island shape. The oxide film 72P is disposed at a position where the fifth relaying electrode 85 described later is provided. When the first capacitive electrode 61 described later is patterned, the oxide film 72P functions as an etching stopper film for protecting the second capacitive electrode 62.

Figure 8A:
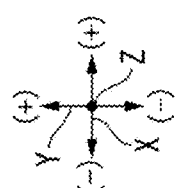
FIG. 8A is a plan view for describing a manufacturing process of the first substrate of the liquid crystal apparatus of FIG. 1.
Figure 8B:
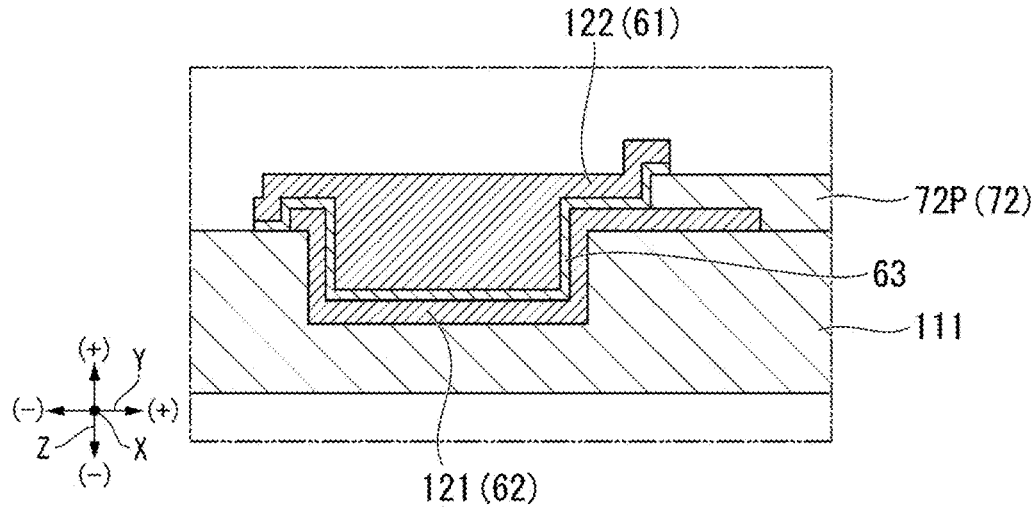
FIG. 8B is a sectional view for describing a manufacturing process of the first substrate of the liquid crystal apparatus of FIG. 1.
Figure 8C:
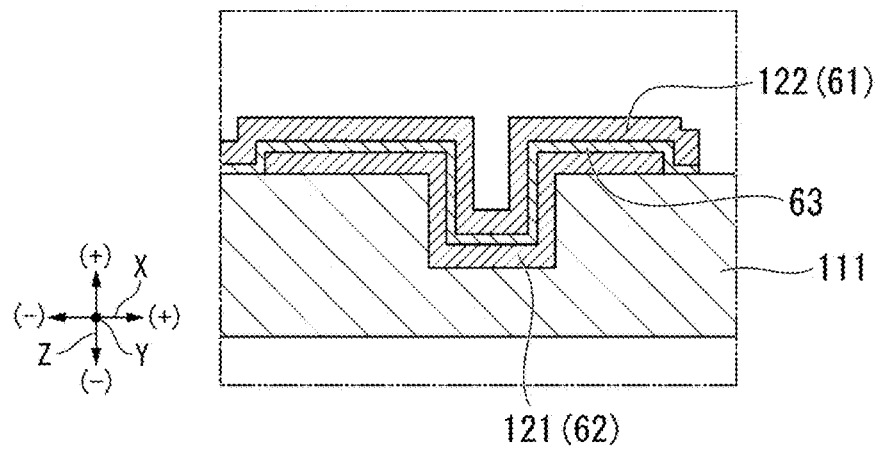
FIG. 8C is a sectional view for describing a manufacturing process of the first substrate of the liquid crystal apparatus of FIG. 1.
Figure 8D:
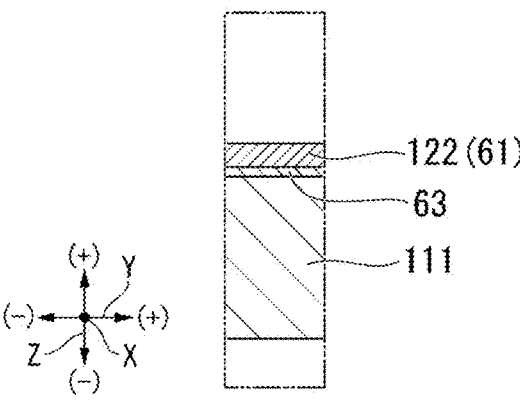
FIG. 8D is a sectional view for describing a manufacturing process of the first substrate of the liquid crystal apparatus of FIG. 1.

FIG. 8A is a plan view illustrating a manufacturing process for the first substrate 10. FIG. 8B is a sectional view illustrating a manufacturing process for the first substrate 10, taken along the line C1-C1 illustrated in FIG. 8A. FIG. 8C is another sectional view illustrating a manufacturing process for the first substrate 10, taken along the line C2-C2 illustrated in FIG. 8A. FIG. 8D is a sectional view illustrating a manufacturing process for the first substrate 10, taken along the line C3-C3 illustrated in FIG. 8A. As illustrated in FIGS. 8A to 8D, the first capacitive electrode 61 of the capacitive element 60 is formed in the structure described with reference to FIGS. 7A to 7D. Specifically, the second dielectric film 63 is formed on the second capacitive electrode 62 and on a part of the oxide film 72P. Thereafter, the first capacitive electrode 61 is formed on the second dielectric film 63.

More specifically, on the second capacitive electrode 62, a silicon oxide ($SiO_2$) film, a silicon nitride (SiN) film, or a metal oxide film composed of $HfO_2$, $ZrO_2$ or the like is formed with a film thickness of 20 nm as the second dielectric film 63. Thereafter, the first capacitive electrode 61 composed of a conductive polysilicon film is formed on the second dielectric film 63. More specifically, the second conductive layer 122 composed of a deposit polysilicon containing phosphor is formed with a film thickness of 50 nm to 100 nm on the second dielectric film 63. Thereafter, the second dielectric film 63 and the first capacitive electrode 61 are formed by patterning the second conductive layer 122 through dry etching.

The first capacitive electrode 61 has an area larger than the second capacitive electrode 62 in plan view except for a portion for providing a contact hole CNT3 for providing the fifth relaying electrode 85 as described later. The shape of the second dielectric film 63 in plan view is the same as that of the second capacitive electrode 62. A part of the outer edge of the second capacitive electrode 62 covers the second capacitive electrode 62 and is in contact with the element substrate 111.

Note that in the first capacitive electrode 61, a part of the portion overlapping the oxide film 72P in plan view is removed during the patterning of the second conductive layer 122. With the fourth conductive layer 124 provided in a contact hole CNT4, the first capacitive electrode 61 and the second relaying electrode 82 are electrically coupled to each other. As described later, the contact hole CNT4 is formed to reach the surface of the first capacitive electrode 61.

Figure 9A:
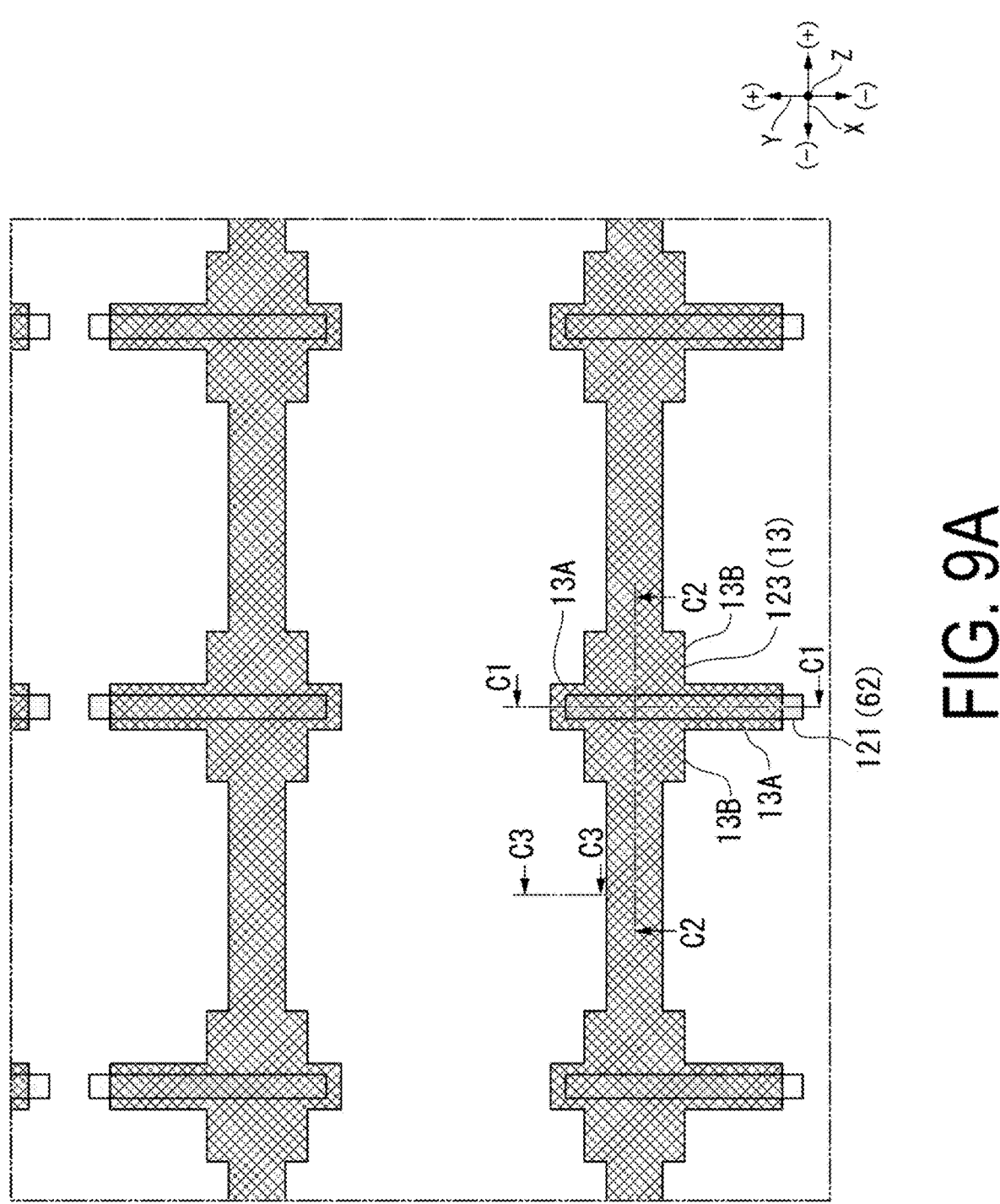
FIG. 9A is a plan view for describing a manufacturing process of the first substrate of the liquid crystal apparatus of FIG. 1.
Figure 9B:
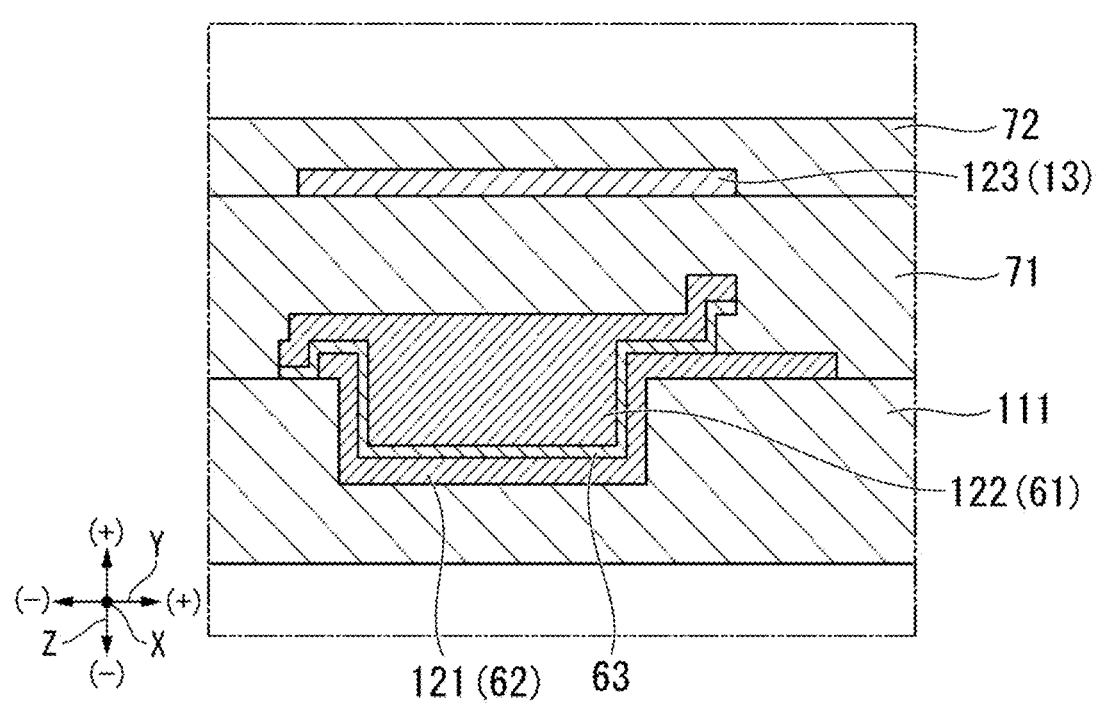
FIG. 9B is a sectional view for describing a manufacturing process of the first substrate of the liquid crystal apparatus of FIG. 1.
Figure 9C:
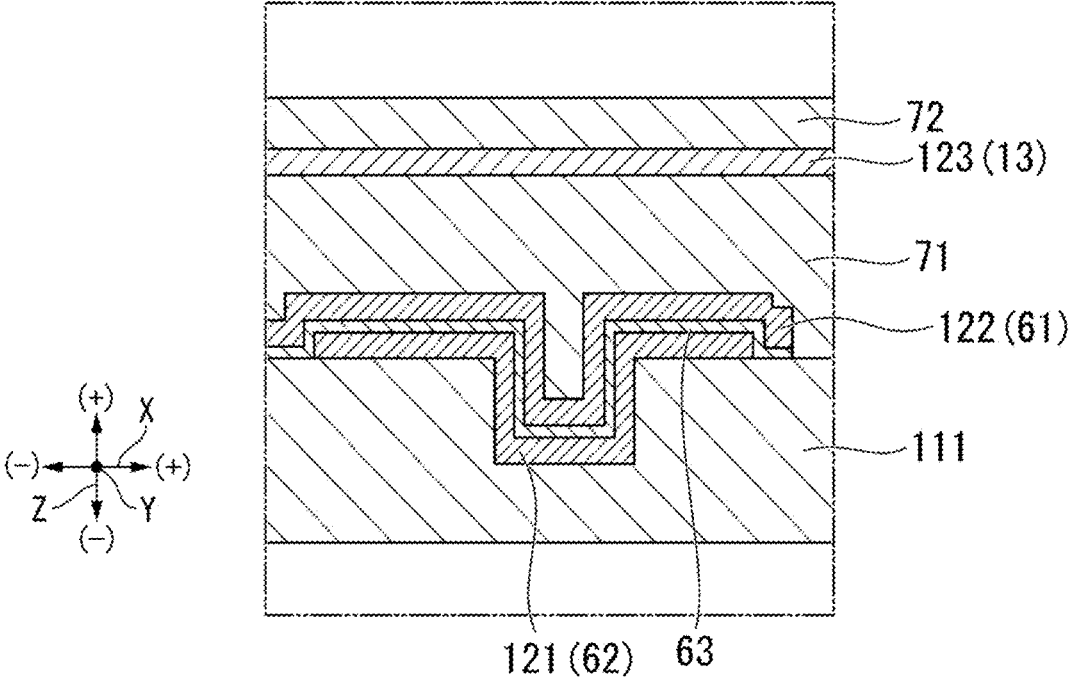
FIG. 9C is a sectional view for describing a manufacturing process of the first substrate of the liquid crystal apparatus of FIG. 1.
Figure 9D:
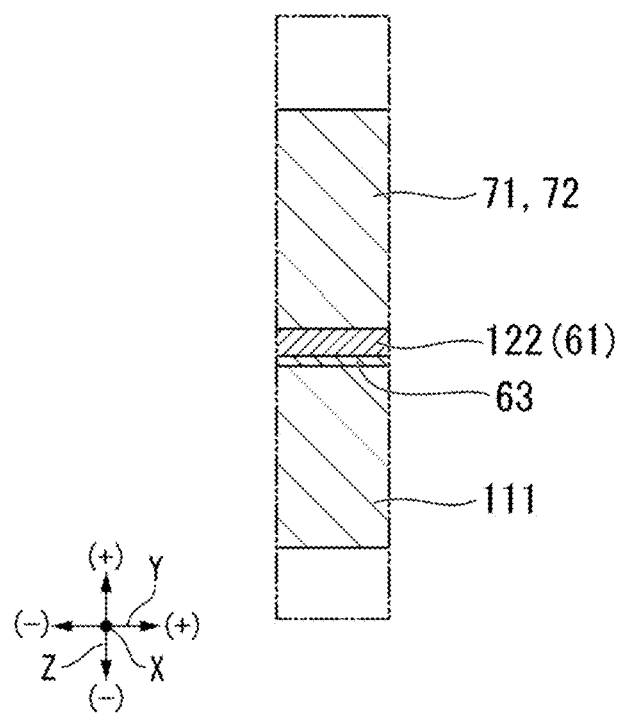
FIG. 9D is a sectional view for describing a manufacturing process of the first substrate of the liquid crystal apparatus of FIG. 1.

FIG. 9A is a plan view illustrating a manufacturing process for the first substrate 10. FIG. 9B is a sectional view illustrating a manufacturing process for the first substrate 10, taken along the line C1-C1 illustrated in FIG. 9A. FIG. 9C is another sectional view illustrating a manufacturing process for the first substrate 10, taken along the line C2-C2 illustrated in FIG. 9A. FIG. 9D is a sectional view illustrating a manufacturing process for the first substrate 10, taken along the line C3-C3 illustrated in FIG. 9A. As illustrated in FIGS. 9A to 9D, the scan line 13 is formed in the structure described with reference to FIGS. 8A to 8D.

Specifically, the first interlayer insulating layer 71 is formed on the first capacitive electrode 61. Thereafter, the scan line 13 is formed. The first interlayer insulating layer 71 is formed of a TEOS film, for example. The film thickness of the first interlayer insulating layer 71 is 400 nm to 600 nm, for example. The third conductive layer 123 composed of a tungsten silicide (WSi) film is formed with a film thickness of 100 nm to 400 nm on the first interlayer insulating layer 71. Thereafter, the scan line 13 is formed by patterning the third conductive layer 123 as illustrated in FIG. 9A.

The scan line 13 extends along the X axis. The scan line 13 includes a first portion 13A extending in the +Y direction side and the −Y direction side than the trench 201 at a position overlapping the trench 201 in plan view, and a second portion 13B disposed on both sides of the first portion 13A in the X axis. Unlike the first portion 13A, the second portion 13B extends to the +Y direction side and the −Y direction side than the portion extending along the X axis. A contact hole CNT1 described later is formed at the position of the second portion 13B in plan view. The scan line 13 is formed of a metal material with a light-shielding property against the light L, and functions as a light shielding part of the thin film transistor 30.

Figure 10A:
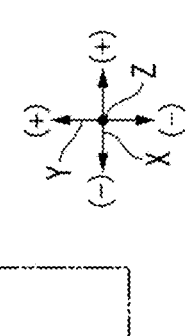
FIG. 10A is a plan view for describing a manufacturing process of the first substrate of the liquid crystal apparatus of FIG. 1.
Figure 10B:
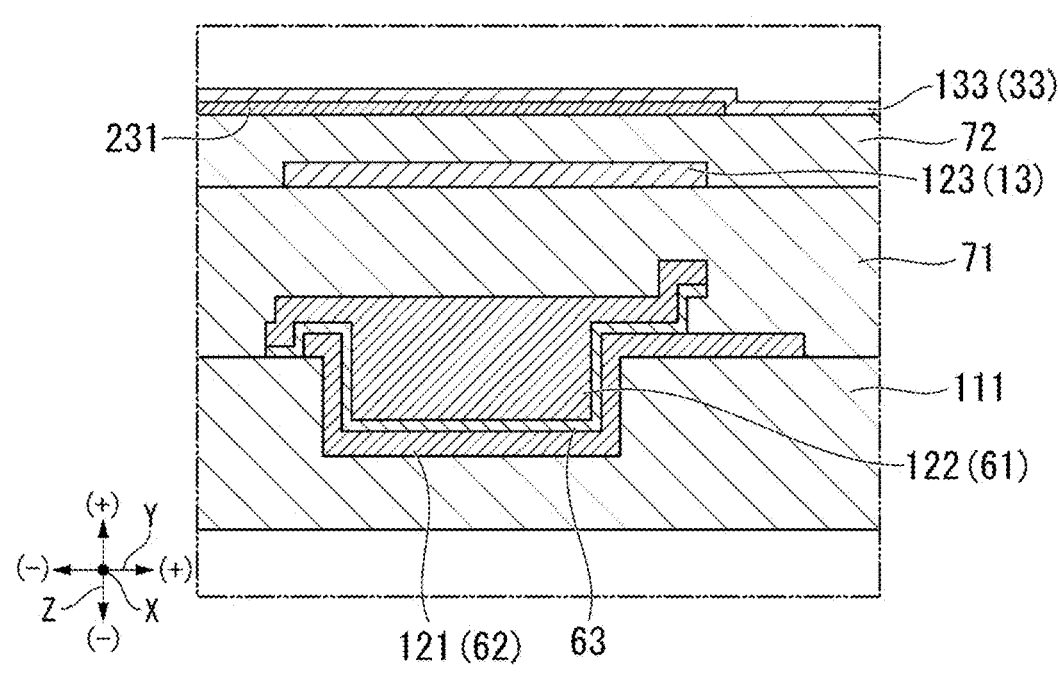
FIG. 10B is a sectional view for describing a manufacturing process of the first substrate of the liquid crystal apparatus of FIG. 1.
Figure 10C:
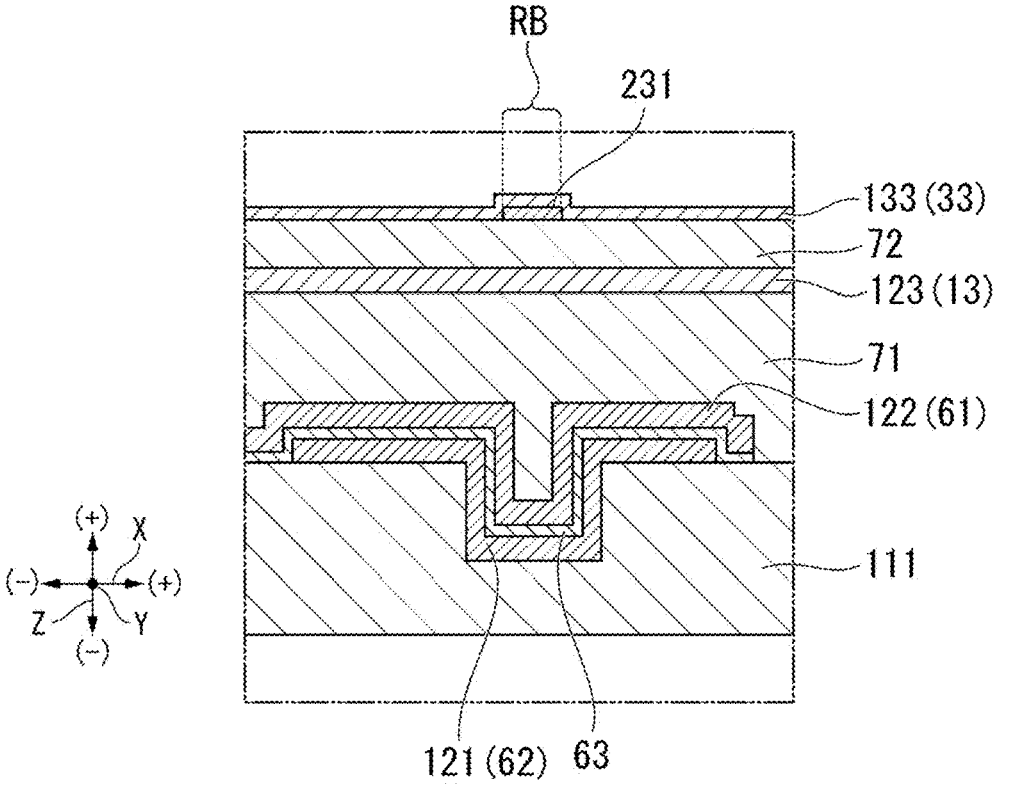
FIG. 10C is a sectional view for describing a manufacturing process of the first substrate of the liquid crystal apparatus of FIG. 1.
Figure 10D:
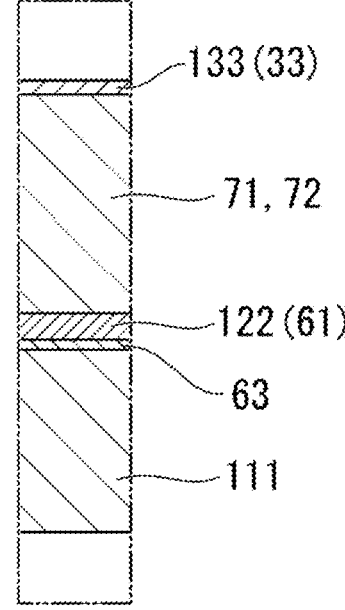
FIG. 10D is a sectional view for describing a manufacturing process of the first substrate of the liquid crystal apparatus of FIG. 1.
Figure 10D:
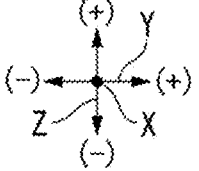

FIG. 10A is a plan view illustrating a manufacturing process for the first substrate 10. FIG. 10B is a sectional view illustrating a manufacturing process for the first substrate 10, taken along the line C1-C1 illustrated in FIG. 10A. FIG. 10C is another sectional view illustrating a manufacturing process for the first substrate 10, taken along the line C2-C2 illustrated in FIG. 10A. FIG. 10D is a sectional view illustrating a manufacturing process for the first substrate 10, taken along the line C3-C3 illustrated in FIG. 10A. As illustrated in FIGS. 10A to 10D, the semiconductor layer 31 is formed in the structure described with reference to FIGS. 9A to 9D.

Specifically, the second interlayer insulating layer 72 is formed on the scan line 13. Thereafter, a semiconductor layer 231 is formed on the second interlayer insulating layer 72. The second interlayer insulating layer 72 is formed of a TEOS film, for example. The film thickness of the second interlayer insulating layer 72 is 200 nm to 600 nm, for example. After an amorphous silicon film is formed on the second interlayer insulating layer 72, a heat treatment is performed to form the semiconductor layer 231 composed of polysilicon. The longitudinal direction of the semiconductor layer 231 is the same direction as the longitudinal direction of the trench 201 and is the direction parallel to the Y axis. In plan view, the semiconductor layer 231 is formed at a position overlapping the trench 201.

Subsequently, the insulating film 133 composed of an HTO film is formed on the semiconductor layer 231 and on the exposed second interlayer insulating layer 72. The film thickness of the insulating film 133 is 30 nm to 100 nm, for example.

Figure 11A:
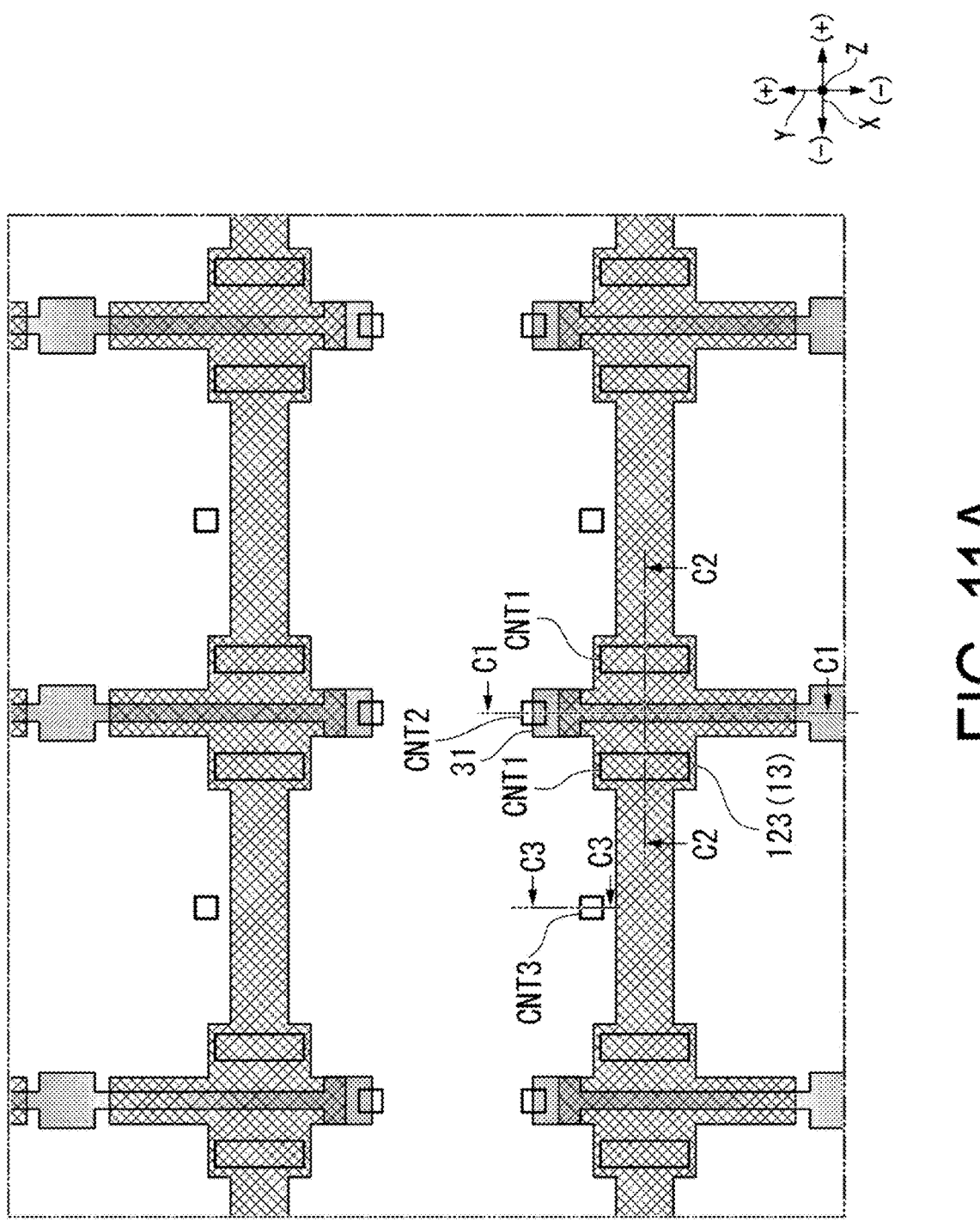
FIG. 11A is a plan view for describing a manufacturing process of the first substrate of the liquid crystal apparatus of FIG. 1.
Figure 11B:
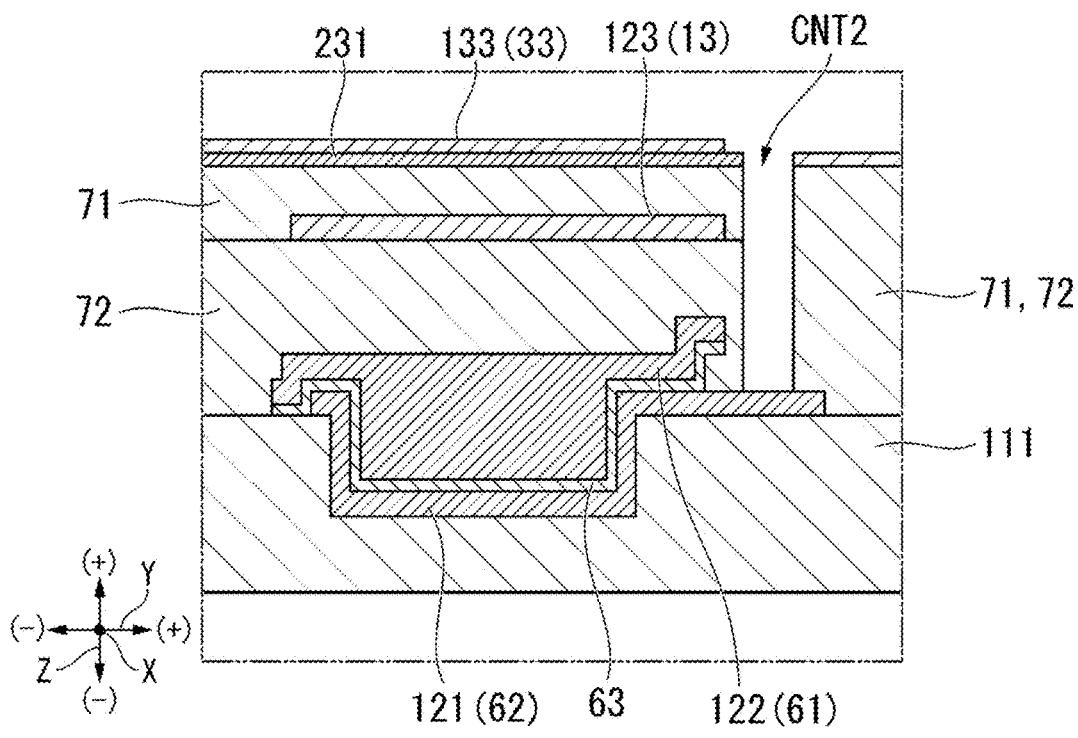
FIG. 11B is a sectional view for describing a manufacturing process of the first substrate of the liquid crystal apparatus of FIG. 1.
Figure 11C:
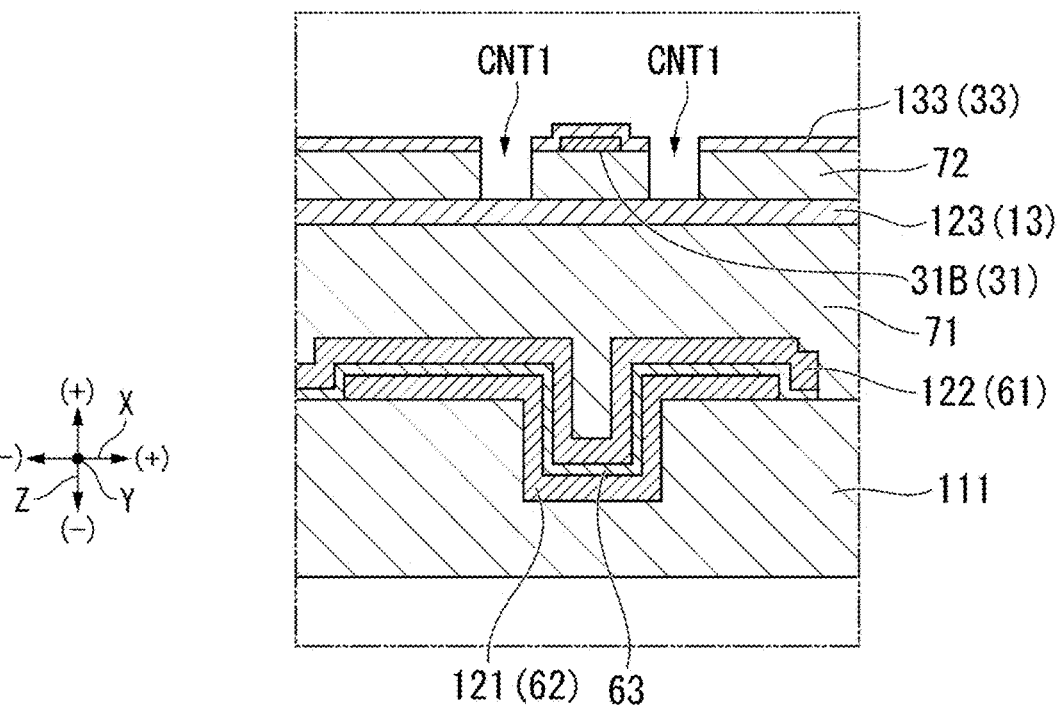
FIG. 11C is a sectional view for describing a manufacturing process of the first substrate of the liquid crystal apparatus of FIG. 1.
Figure 11D:
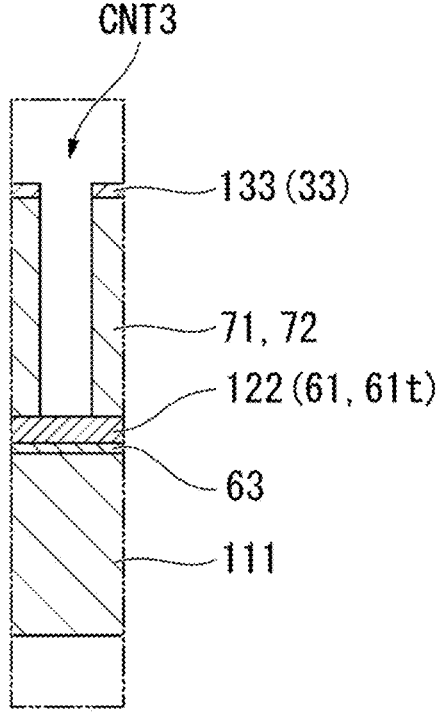
FIG. 11D is a sectional view for describing a manufacturing process of the first substrate of the liquid crystal apparatus of FIG. 1.
Figure 11D:
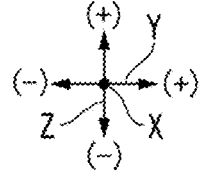

FIG. 11A is a plan view illustrating a manufacturing process for the first substrate 10. FIG. 11B is a sectional view illustrating a manufacturing process for the first substrate 10, taken along the line C1-C1 illustrated in FIG. 11A. FIG. 11C is another sectional view illustrating a manufacturing process for the first substrate 10, taken along the line C2-C2 illustrated in FIG. 11A. FIG. 11D is a sectional view illustrating a manufacturing process for the first substrate 10, taken along the line C3-C3 illustrated in FIG. 11A. As illustrated in FIGS. 11A to 11D, the contact holes CNT1, CNT2 and CNT3 are formed in the structure described with reference to FIGS. 10A to 10D.

Specifically, as illustrated in FIGS. 11A and 11C, the contact holes CNT1 are formed on both sides of the channel of the semiconductor layer 31, i.e., the semiconductor layer 31B in the X axis at positions overlapping the second portion 13B of the scan line 13 in plan view. The contact holes CNT1 extend through the gate insulating film 33 and the second interlayer insulating layer 72 in the Z axis. The scan line 13 is exposed at the bottoms of the contact holes CNT1.

As illustrated in FIG. 11B, the contact hole CNT2 extends through the gate insulating film 33, the second interlayer insulating layer 72, the first interlayer insulating layer 71 and the oxide film 72P in the Z axis. The second capacitive electrode 62 of the capacitive element 60 is exposed at the bottom of the contact hole CNT2. The semiconductor layer 31C making up the drain region 31d is exposed at the inner wall of the contact hole CNT2. In the Y axis, the end portion adjacent to the opening edge of the contact hole CNT2 is peeled in the gate insulating film 33 covering the semiconductor layer 31C. In the Y axis, the end portion in contact with the opening edge of the contact hole CNT2 is exposed in the semiconductor layer 31C.

As illustrated in FIG. 11D, the contact hole CNT3 extends through the gate insulating film 33, the second interlayer insulating layer 72 and the first interlayer insulating layer 71 in the Z axis. The protruding portion 61t of the third capacitive electrode 61 of the capacitive element 60 is exposed at the bottom of the contact hole CNT3.

Figure 12A:
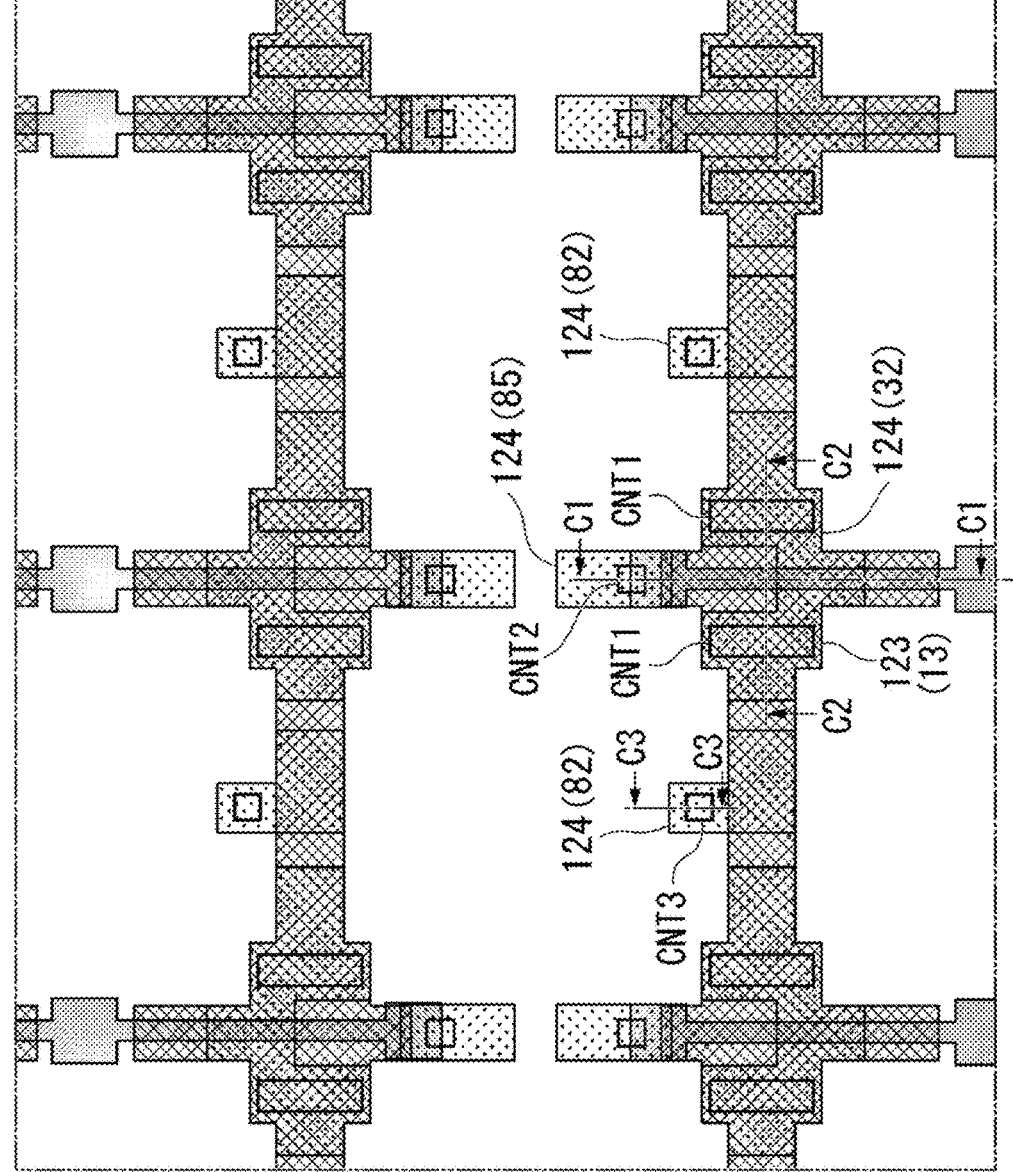
FIG. 12A is a plan view for describing a manufacturing process of the first substrate of the liquid crystal apparatus of FIG. 1.
Figure 12B:
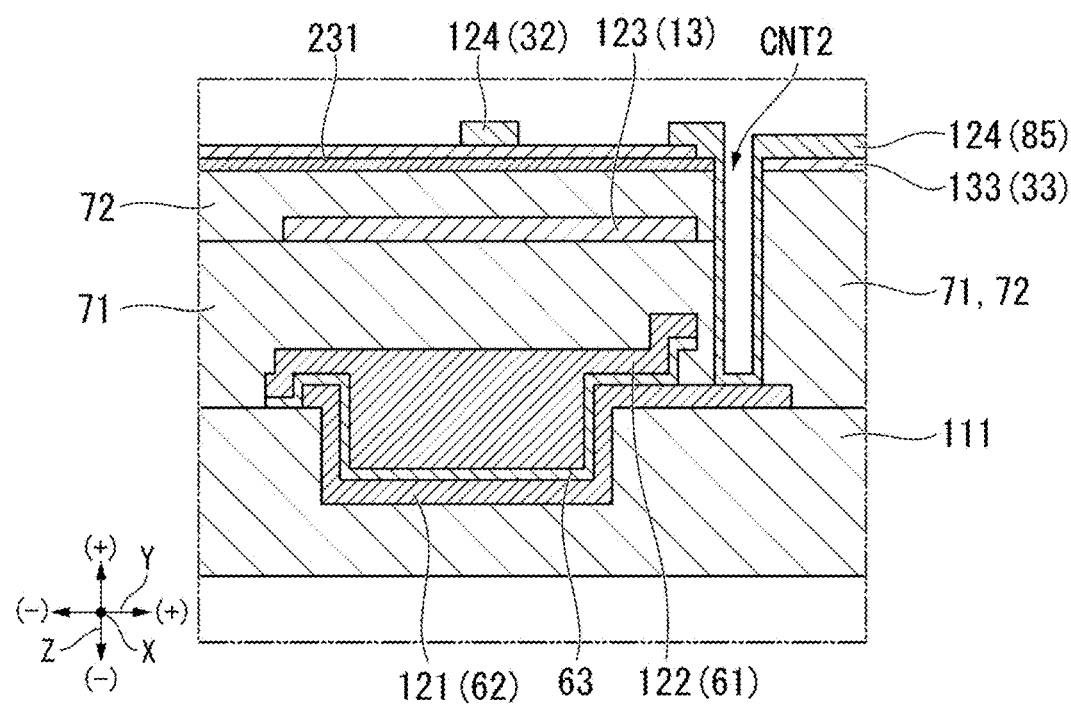
FIG. 12B is a sectional view for describing a manufacturing process of the first substrate of the liquid crystal apparatus of FIG. 1.
Figure 12C:
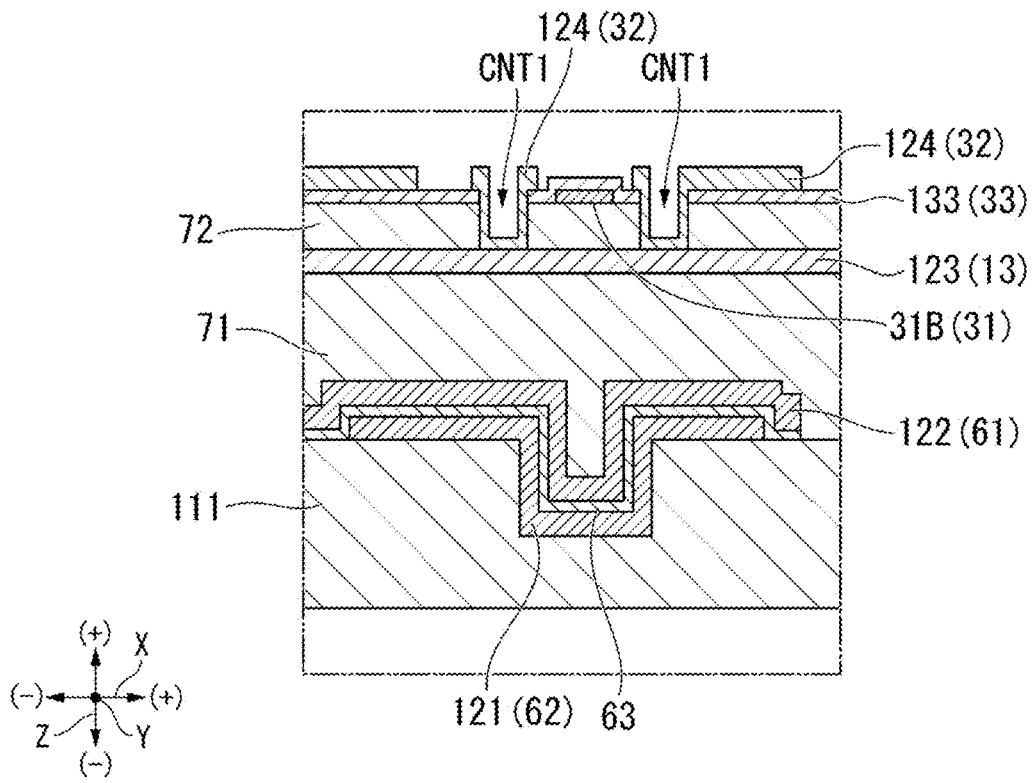
FIG. 12C is a sectional view for describing a manufacturing process of the first substrate of the liquid crystal apparatus of FIG. 1.
Figure 12D:
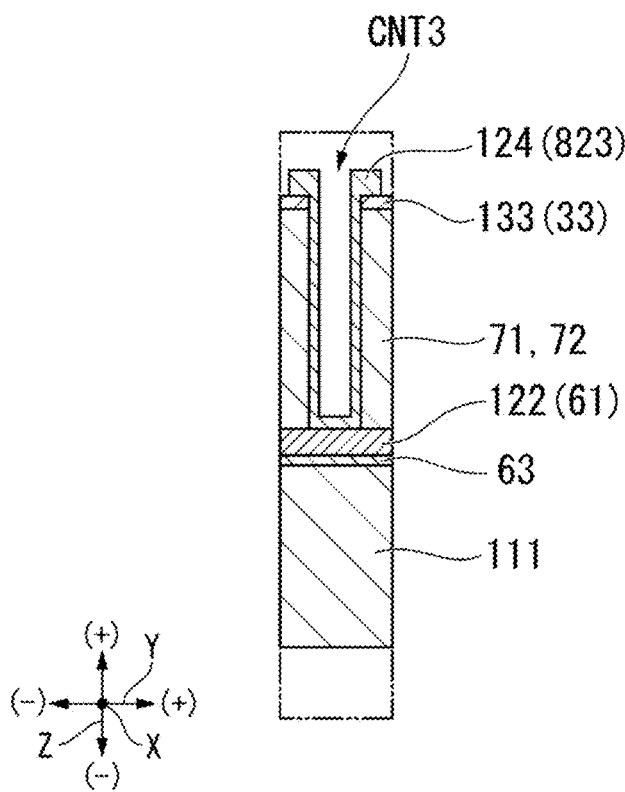
FIG. 12D is a sectional view for describing a manufacturing process of the first substrate of the liquid crystal apparatus of FIG. 1.

FIG. 12A is a plan view illustrating a manufacturing process for the first substrate 10. FIG. 12B is a sectional view illustrating a manufacturing process for the first substrate 10, taken along the line C1-C1 illustrated in FIG. 12A. FIG. 12C is another sectional view illustrating a manufacturing process for the first substrate 10, taken along the line C2-C2 illustrated in FIG. 12A. FIG. 12D is a sectional view illustrating a manufacturing process for the first substrate 10, taken along the line C3-C3 illustrated in FIG. 12A. As illustrated in FIGS. 12A to 12D, the gate electrode 32, the second relaying electrode 82, and the fifth relaying electrode 85 are formed in the structure described with reference to FIGS. 11A to 11D.

Specifically, the fourth conductive layer 124 is formed on the gate insulating film 33 and inside the contact holes CNT1, CNT2 and CNT3. The fourth conductive layer 124 has a two-layer structure of a stack of a conductive polysilicon film and a light-shielding conducting film. The diameter of the contact holes CNT2 and CNT3 is substantially the same as that of the contact hole CNT1, but the contact holes CNT2 and CNT3 are deeper than the contact hole CNT1. That is, the contact holes CNT2 and CNT3 have higher aspect ratios than the contact hole CNT1. In view of this, deposit polysilicon containing phosphor is formed inside the contact holes CNT2 and CNT3, and a tungsten silicide film as a light-shielding conducting film is stacked at the deposit polysilicon film, for example. By forming the fourth conductive layer 124 with the two-layer structure as described above, the fourth conductive layer 124 is stabilized at the inner wall surface of the contact holes CNT2 and CNT3 with a high aspect ratio, and the coverage of the fourth conductive layer 124 can be achieved in a favorable state.

The gate electrode 32, the second relaying electrode 82 and the fifth relaying electrode 85 are formed by patterning the fourth conductive layer 124 after the fourth conductive layer 124 is formed as described above.

Through this step, the gate electrode 32 is electrically coupled to the scan line 13 through the contact holes CNT1. The fifth relaying electrode 85 is electrically coupled to the second capacitive electrode 62 of the capacitive element 60 through the contact hole CNT2. The second relaying electrode 82 is electrically coupled to the protruding portion 61*t* of the first capacitive electrode 61 of the capacitive element 60 through the contact hole CNT3. Note that the gate electrode 32 is formed on the semiconductor layer 31 and inside the contact holes CNT1 so as to surround the semiconductor layer 31 along the +Z direction, the +X direction and the −X direction, and thus functions as a light shielding part of the semiconductor layer 31.

Figure 13A:
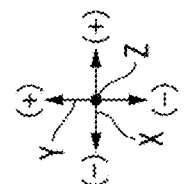
FIG. 13A is a plan view for describing a manufacturing process of the first substrate of the liquid crystal apparatus of FIG. 1.
Figure 13B:
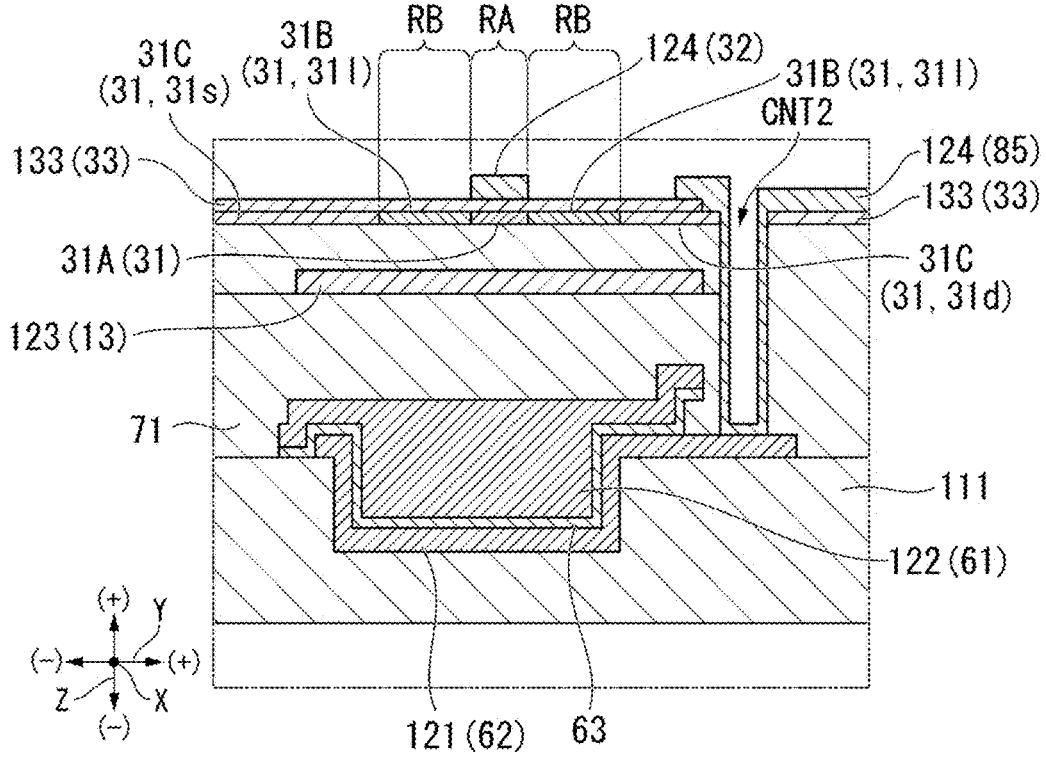
FIG. 13B is a sectional view for describing a manufacturing process of the first substrate of the liquid crystal apparatus of FIG. 1.
Figure 13C:
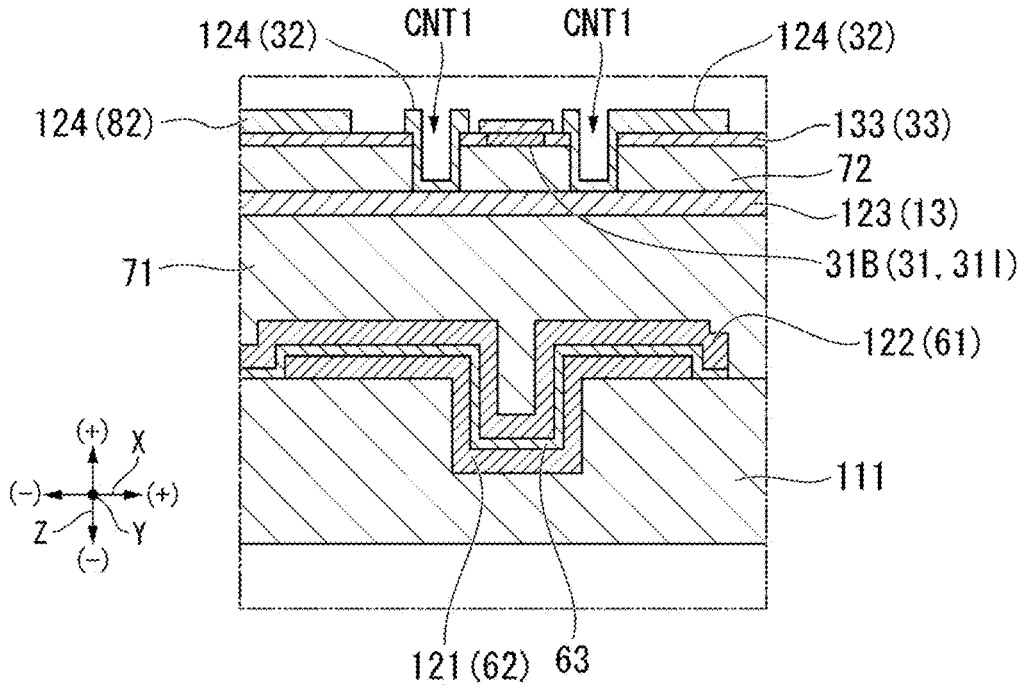
FIG. 13C is a sectional view for describing a manufacturing process of the first substrate of the liquid crystal apparatus of FIG. 1.

FIG. 13A is a plan view illustrating a manufacturing process for the first substrate 10. FIG. 13B is a sectional view illustrating a manufacturing process for the first substrate 10, taken along the line C1-C1 illustrated in FIG. 13A. FIG. 13C is another sectional view illustrating a manufacturing process for the first substrate 10, taken along the line C2-C2 illustrated in FIG. 13A. The view taken along the line C3-C3 illustrated in FIG. 13A is the same as FIG. 12D, and is therefore omitted. As illustrated in FIGS. 13A to 13C, the semiconductor layers 31B and 31C are formed in the structure described with reference to FIGS. 12A to 12D.

Specifically, channel doping is performed by injecting impurity ions to the semiconductor layer 231 in the second region RB and the third region RC in the Y axis from the side opposite to the semiconductor layer 231 through the insulating film 133 in the −Z direction with the fourth conductive layer 124 as a mask in the Z axis. In this case, the injection amount of the impurity ions for the semiconductor layer 231 in the second region RB is set to an amount smaller than the injection amount of the impurity ions for the semiconductor layer 231 in the third region RC. In view of this, when injecting impurity ions to the semiconductor layer 231 in the second region RB and the third region RC as described above, the injection amount of the impurity ions is set in accordance with the impurity concentration of the semiconductor layer 31B making up the LDD. After injecting impurity ions to the semiconductor layer 231 in the second region RB and the third region RC in accordance with the impurity concentration of the semiconductor layer 31B, a resist is formed on the fourth conductive layer 124 in the first region RA and the second region RB in the Y axis and on the insulating film 133, as illustrated in FIG. 13A. Subsequently, with the resist as a mask, impurity ions are further injected only to the semiconductor layer 231 in the third region RC. At this time, the additional injection amount of impurity ions only to the semiconductor layer 231 in the third region RC is set in accordance with the impurity concentration difference between the semiconductor layers 31B and 31C.

Through this step, the semiconductor layer 31B making up the LDD of the thin film transistor 30, the semiconductor layer 31C making up the drain region 31*d*, and the semiconductor layer 31C making up the source region 31*s* are formed at the semiconductor layer 31.

Figure 14A:
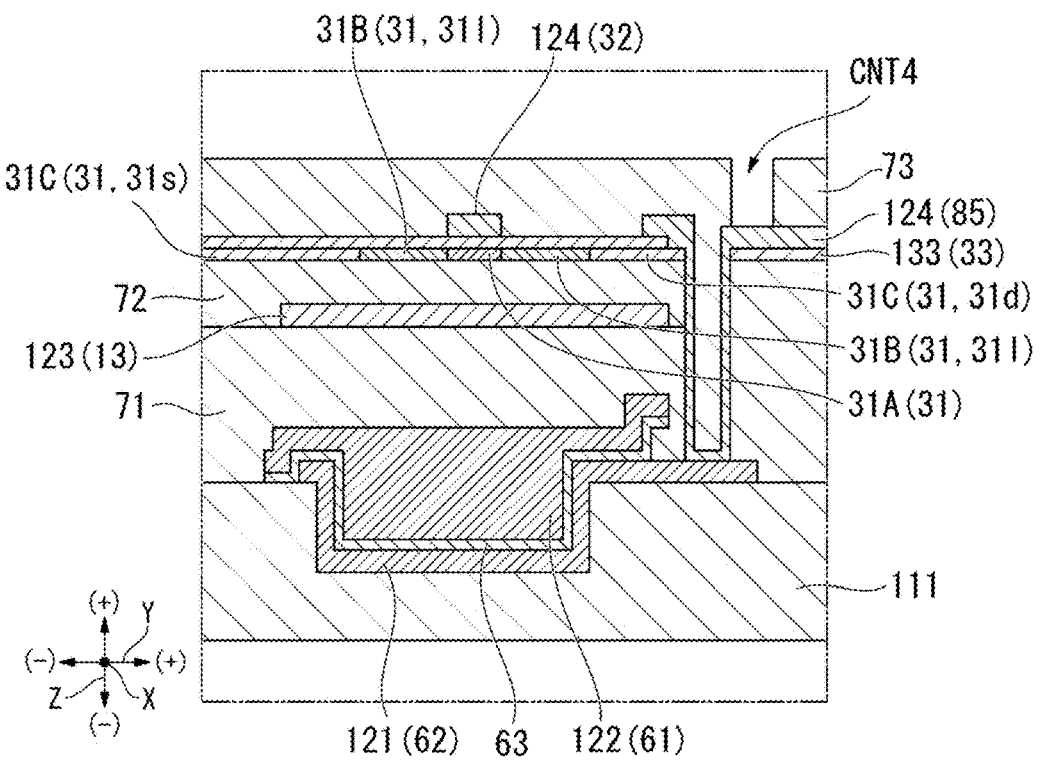
FIG. 14A is a sectional view for describing a manufacturing process of the first substrate of the liquid crystal apparatus of FIG. 1.
Figure 14B:
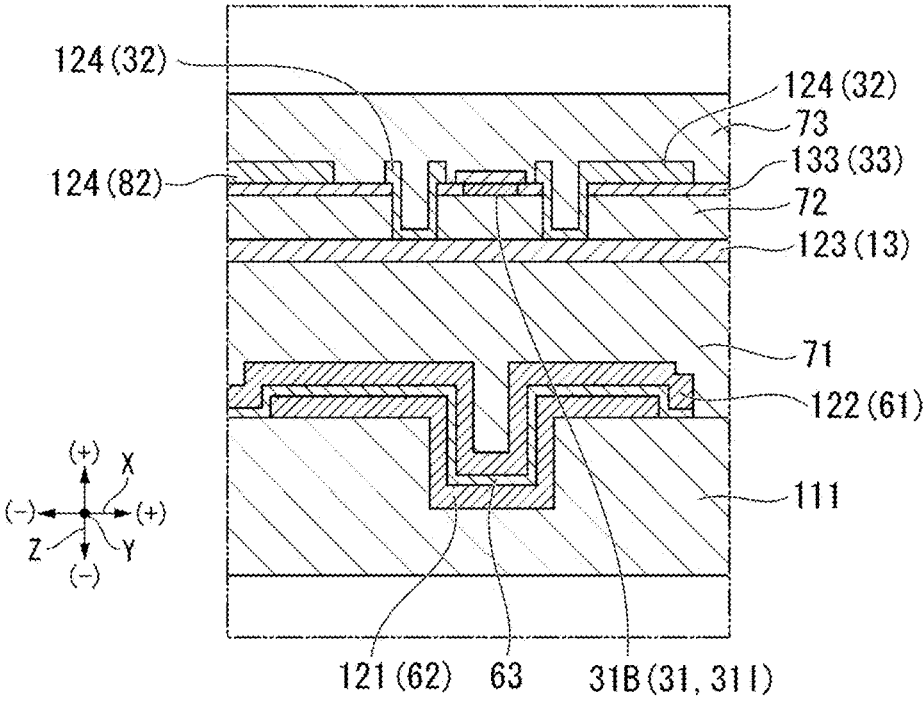
FIG. 14B is a sectional view for describing a manufacturing process of the first substrate of the liquid crystal apparatus of FIG. 1.
Figure 14C:
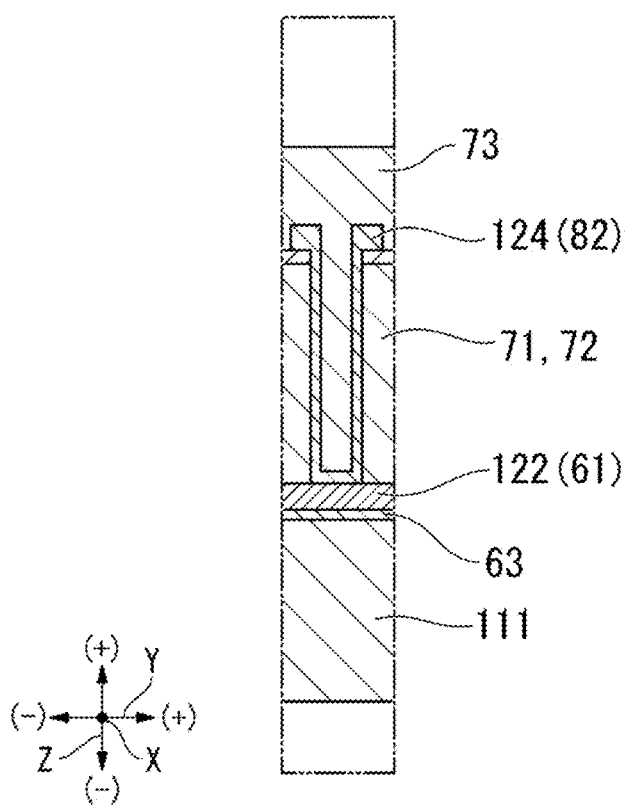
FIG. 14C is a sectional view for describing a manufacturing process of the first substrate of the liquid crystal apparatus of FIG. 1.

A plan view of a manufacturing process of the first substrate 10 is the same as FIG. 12A, and is therefore omitted. FIG. 14A is a sectional view illustrating a manufacturing process for the first substrate 10, taken along the line C1-C1 illustrated in FIG. 12A. FIG. 14B is another sectional view illustrating a manufacturing process for the first substrate 10, taken along the line C2-C2 illustrated in FIG. 12A. FIG. 14C is a sectional view illustrating a manufacturing process for the first substrate 10, taken along the line C3-C3 illustrated in FIG. 12A. As illustrated in FIGS. 14A to 14C, the contact hole CNT4 is formed in the structure described with reference to FIGS. 13A to 13C.

Specifically, the third interlayer insulating layer 73 composed of a TEOS film is formed on the gate electrode 32, on the second relaying electrode 82, and on the fifth relaying electrode 85. The film thickness of the third interlayer insulating layer 73 is 200 nm to 400 nm. Thereafter, the contact hole CNT4 is formed on the third interlayer insulating layer 73 on the fifth relaying electrode 85. The fifth relaying electrode 85 is exposed at the bottom of the contact hole CNT4.

Figure 15A:
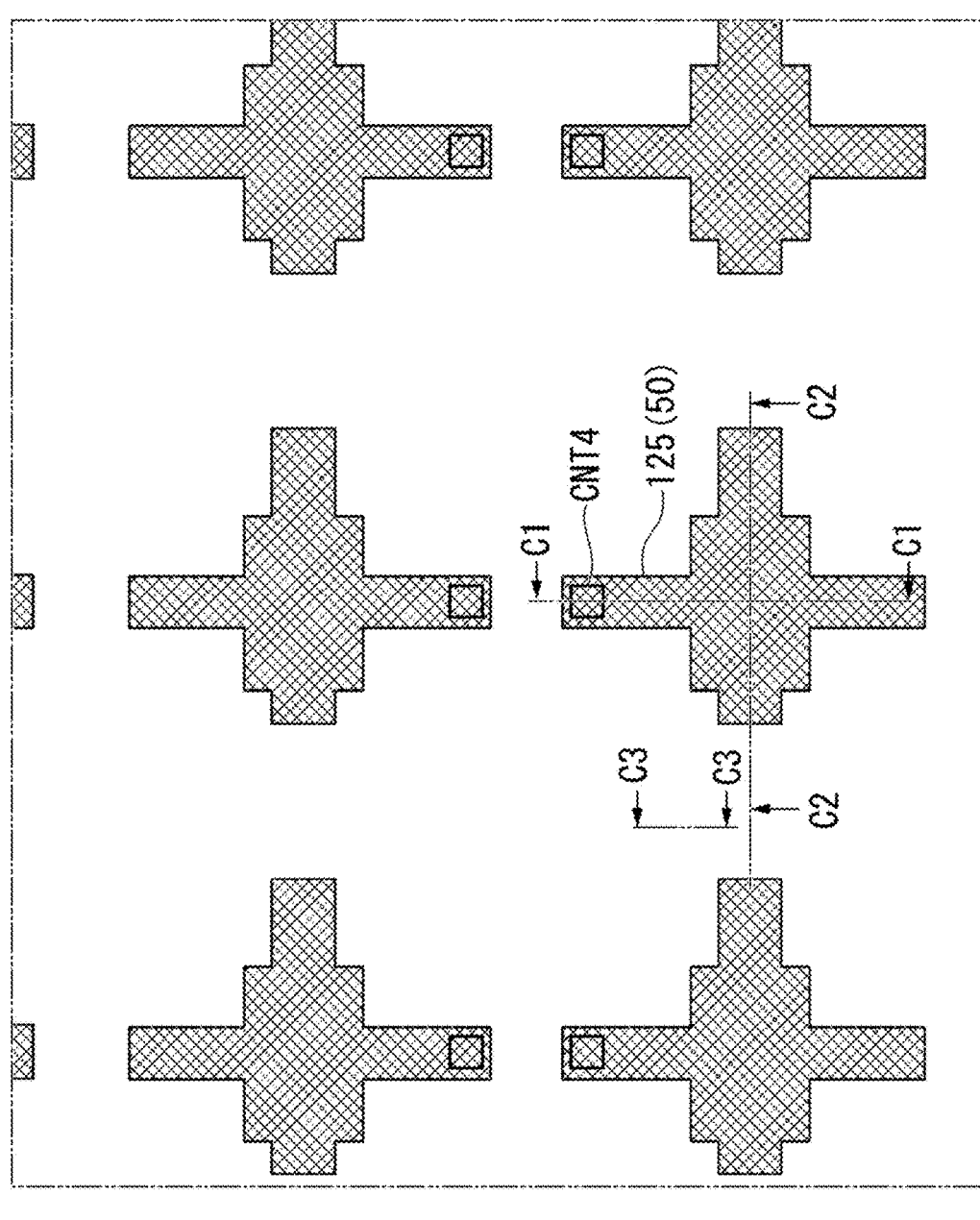
FIG. 15A is a plan view for describing a manufacturing process of the first substrate of the liquid crystal apparatus of FIG. 1.
Figure 15B:
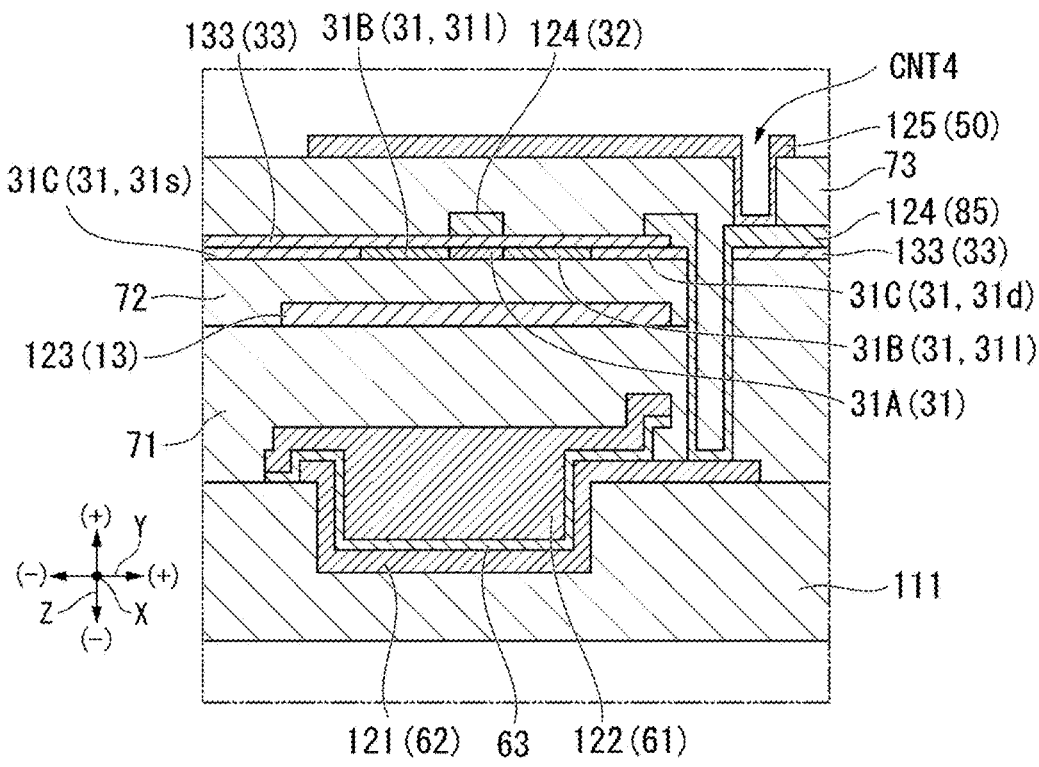
FIG. 15B is a sectional view for describing a manufacturing process of the first substrate of the liquid crystal apparatus of FIG. 1.
Figure 15C:
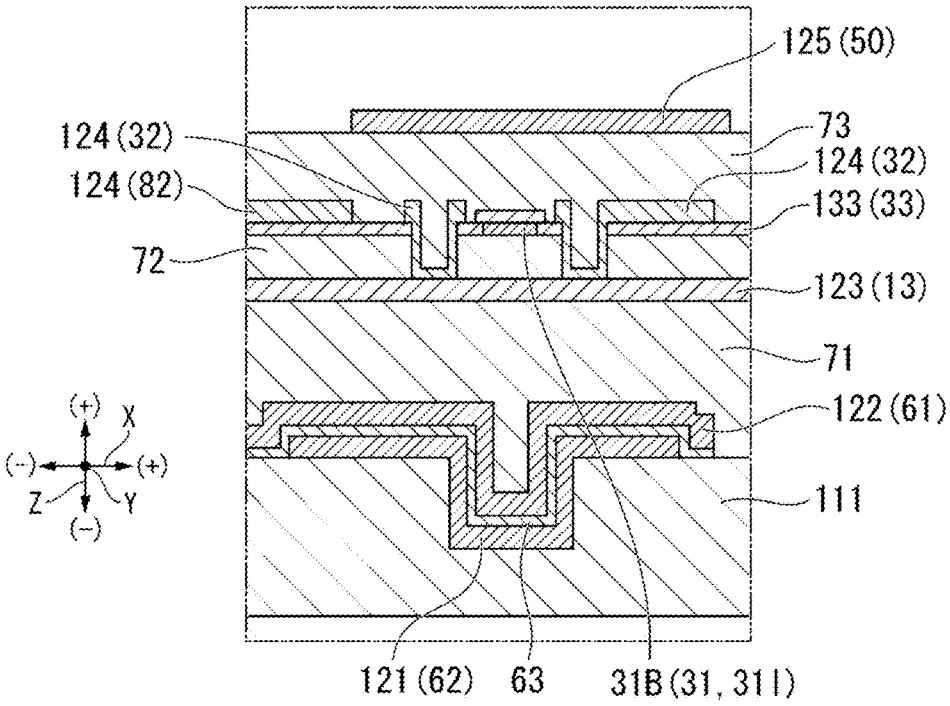
FIG. 15C is a sectional view for describing a manufacturing process of the first substrate of the liquid crystal apparatus of FIG. 1.

FIG. 15A is a plan view illustrating a manufacturing process for the first substrate 10. FIG. 15B is a sectional view illustrating a manufacturing process for the first substrate 10, taken along the line C1-C1 illustrated in FIG. 15A. FIG. 15C is another sectional view illustrating a manufacturing process for the first substrate 10, taken along the line C2-C2 illustrated in FIG. 15A. Regarding the manufacturing process for the first substrate 10 illustrated in FIGS. 15A and 15C, the view taken along the line C3-C3 illustrated in FIG. 15A is the same as FIG. 14C, and is therefore omitted. As illustrated in FIGS. 15A to 15C, the sixth relaying electrode 50 is formed in the structure described with reference to FIGS. 14A to 14C.

The fifth conductive layer 125 making up the sixth relaying electrode 50 has a two-layer structure composed of a conductive polysilicon film and a light-shielding conducting film. Specifically, a deposit polysilicon containing phosphor is formed on the third interlayer insulating layer 73 and inside a contact hole CNT5. Subsequently, a tungsten silicide film as a light-shielding conducting film is stacked at the deposit polysilicon film. Thereafter, the sixth relaying electrode 50 is formed through patterning on a laminate of the deposit polysilicon film and the tungsten silicide film as illustrated in FIGS. 15A to 15C. The sixth relaying electrode 50 is electrically coupled to the fifth relaying electrode 85 electrically coupled to the second capacitive electrode 62 of the capacitive element 60.

Figure 16A:
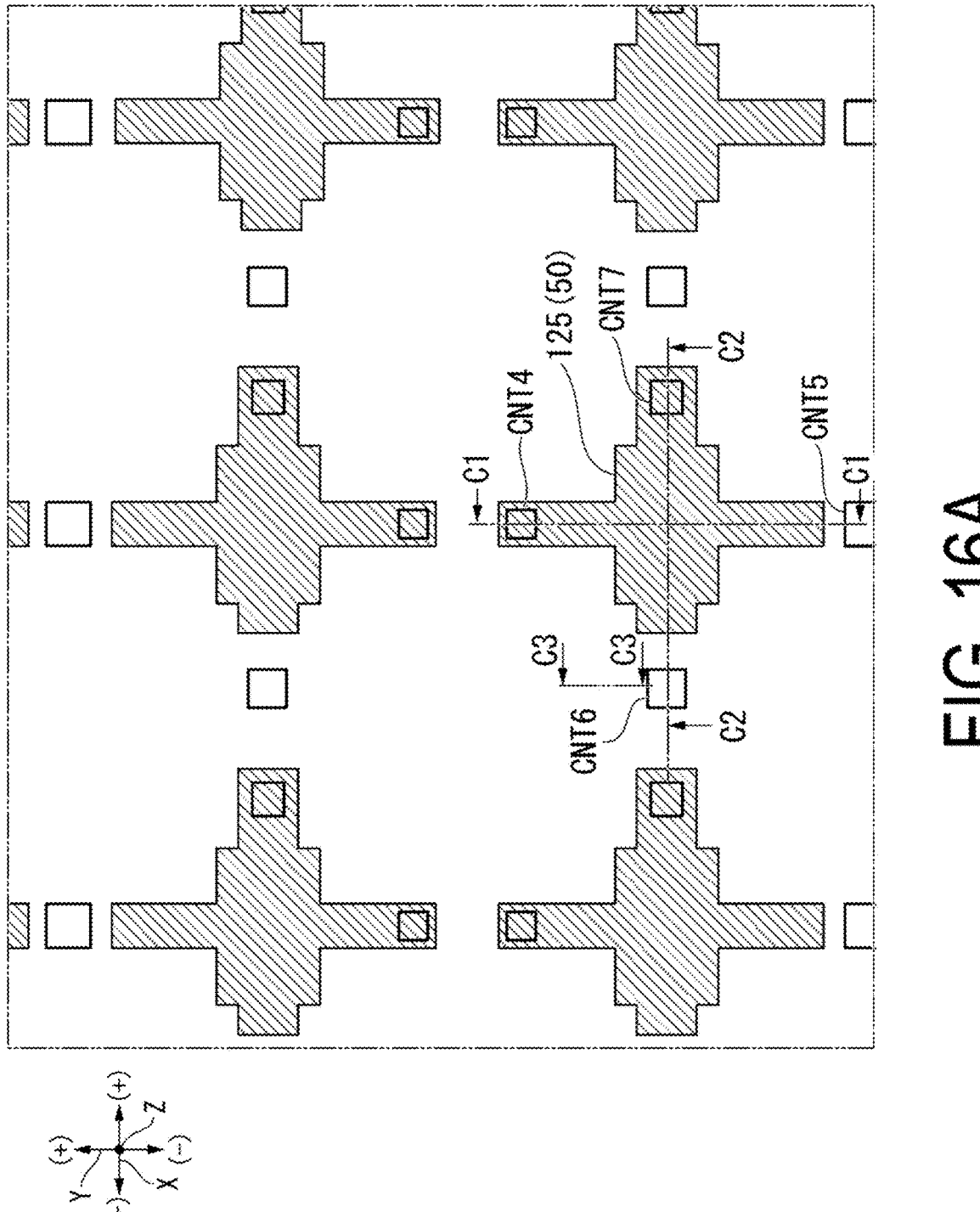
FIG. 16A is a plan view for describing a manufacturing process of the first substrate of the liquid crystal apparatus of FIG. 1.
Figure 16B:
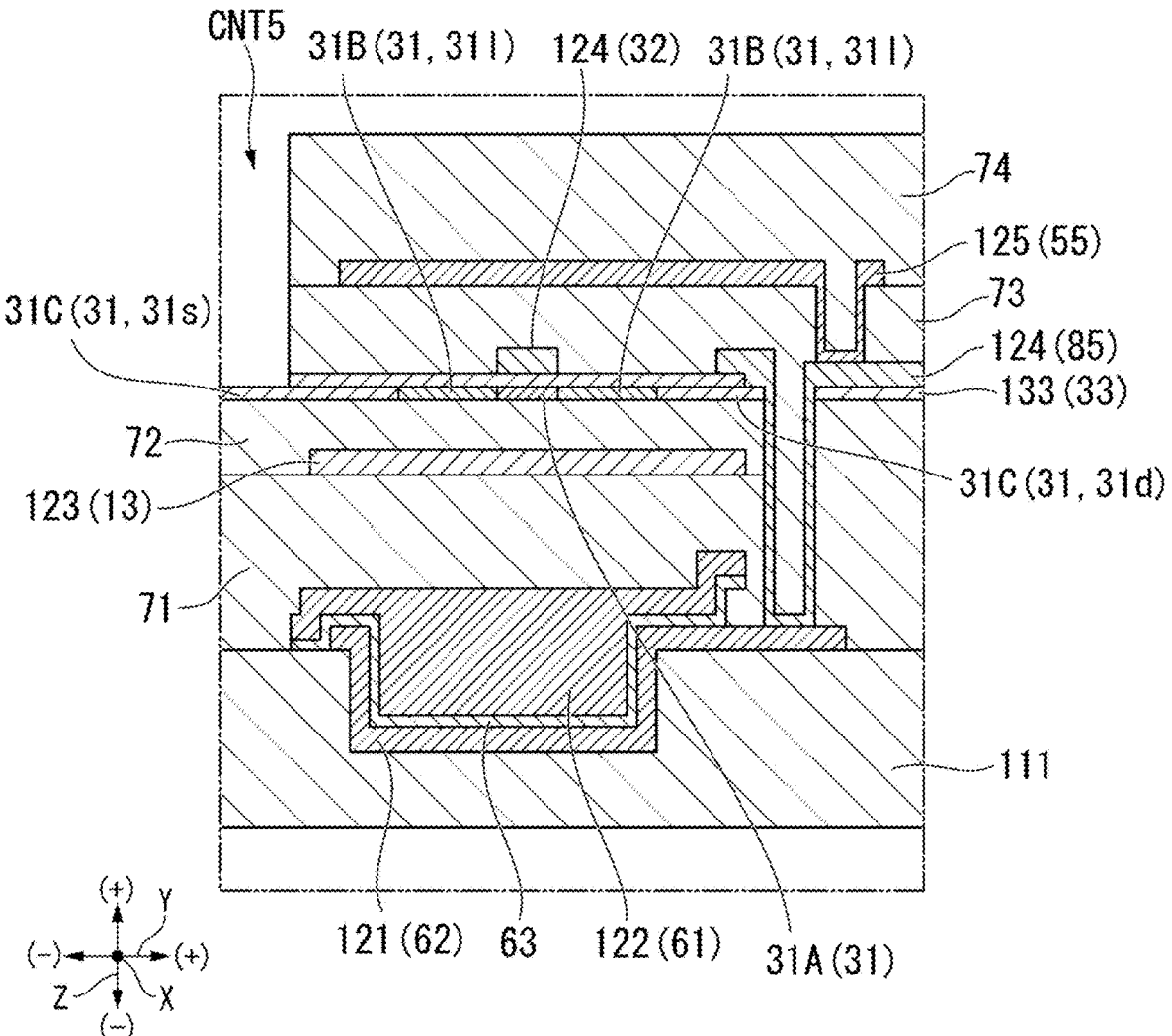
FIG. 16B is a sectional view for describing a manufacturing process of the first substrate of the liquid crystal apparatus of FIG. 1.
Figure 16C:
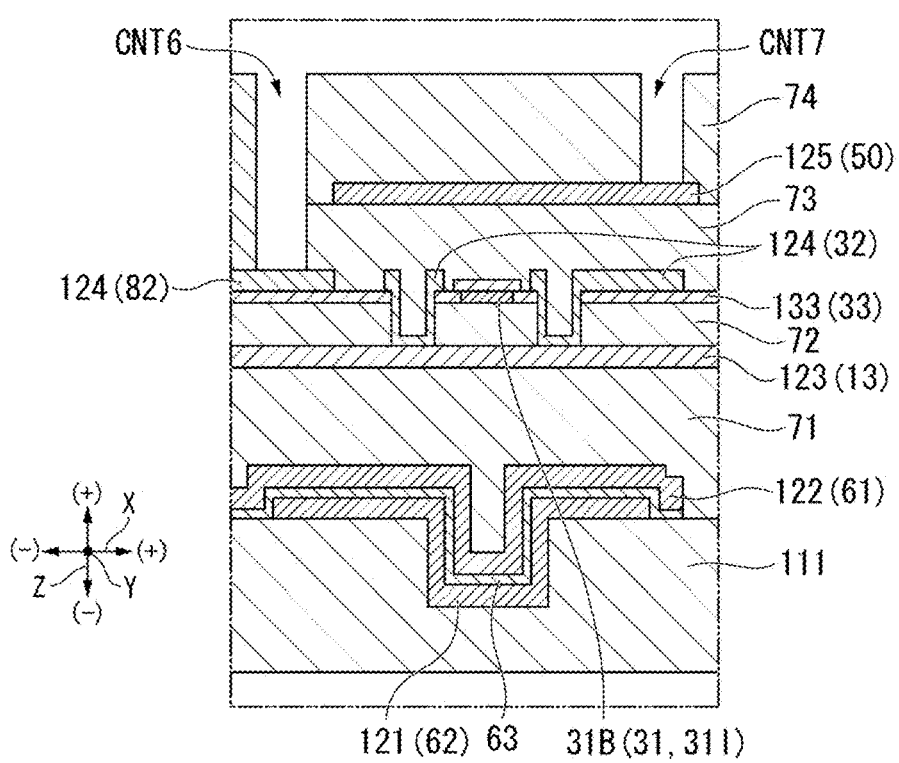
FIG. 16C is a sectional view for describing a manufacturing process of the first substrate of the liquid crystal apparatus of FIG. 1.
Figure 16D:
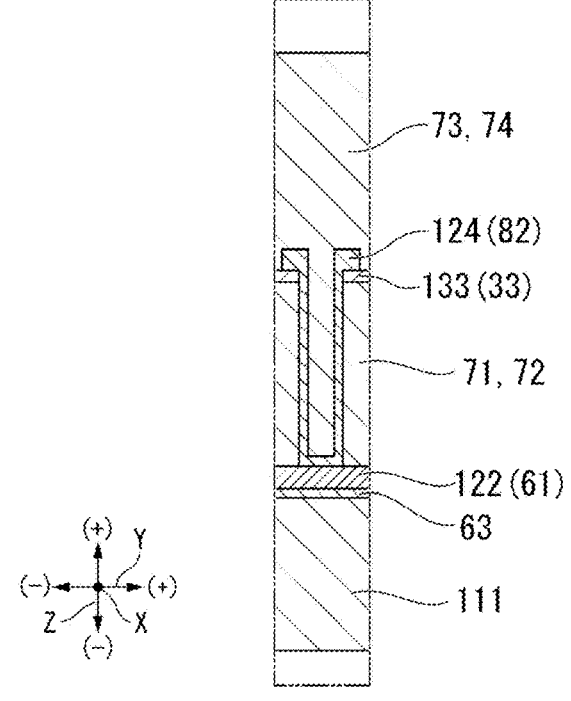
FIG. 16D is a sectional view for describing a manufacturing process of the first substrate of the liquid crystal apparatus of FIG. 1.

FIG. 16A is a plan view illustrating a manufacturing process for the first substrate 10. FIG. 16B is a sectional view illustrating a manufacturing process for the first substrate 10, taken along the line C1-C1 illustrated in FIG. 16A. FIG. 16C is another sectional view illustrating a manufacturing process for the first substrate 10, taken along the line C2-C2 illustrated in FIG. 16A. FIG. 16D is a sectional view illustrating a manufacturing process for the first substrate 10, taken along the line C3-C3 illustrated in FIG. 16A. As illustrated in FIGS. 16A to 16D, contact holes CNT5, CNT6 and CNT7 are formed in the structure described with reference to FIGS. 15A to 15C.

Specifically, the fourth interlayer insulating layer 74 composed of a TEOS film is formed on the sixth relaying electrode 50. The thickness of the fourth interlayer insulating layer 74 is 500 nm to 1000 nm, for example. Thereafter, the contact holes CNT5, CNT6 and CNT7 are formed. As illustrated in FIG. 16A, the contact hole CNT5 is formed at a position different from the sixth relaying electrode 50 in the +Y direction or in the −Y direction in plan view. The contact hole CNT5 extends through the fourth interlayer insulating layer 74 and the third interlayer insulating layer 73 in the Z axis. The gate insulating film 33 on the semiconductor layer 31C making up the source region 31s of the thin film transistor 30 is exposed at the bottom of the contact hole CNT5.

As illustrated in FIG. 16C, the contact hole CNT6 extends through the fourth interlayer insulating layer 74 in the Z axis. The second relaying electrode 82 is exposed at the bottom of the contact hole CNT6.

In plan view, the contact hole CNT7 is formed at a position overlapping the sixth relaying electrode 50. The contact hole CNT7 extends through the fourth interlayer insulating layer 74 and the third interlayer insulating layer 73 in the Z axis. The sixth relaying electrode 50 is exposed at the bottom of the contact hole CNT7. The width on the X axis of the contact hole CNT7 is greater than the width on the Y axis. For example, the width of the contact hole CNT7 on the X axis is 1.1 μm, and the width of the contact hole CNT7 on the Y axis is 0.5 μm.

Figure 17A:
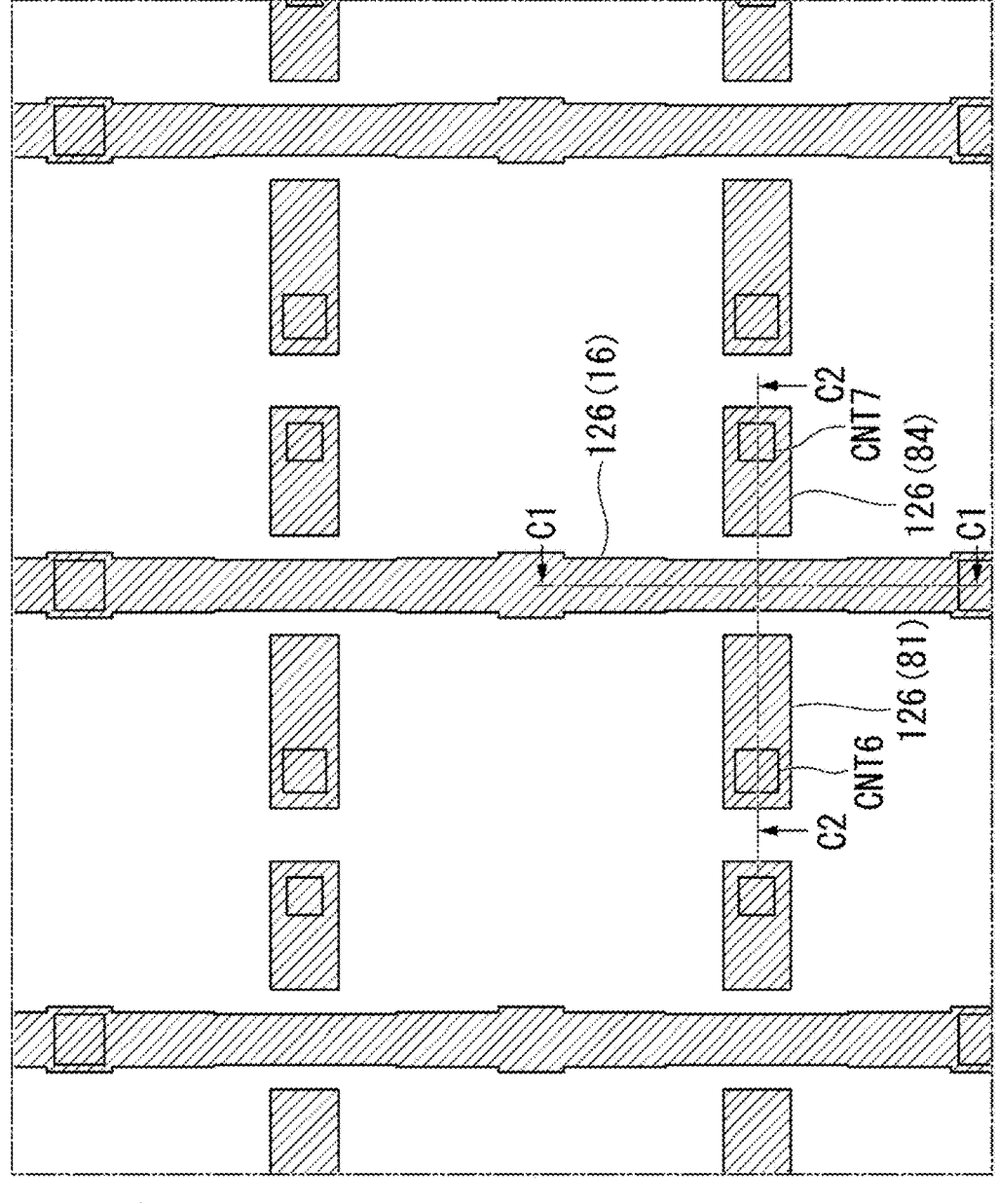
FIG. 17A is a plan view for describing a manufacturing process of the first substrate of the liquid crystal apparatus of FIG. 1.
Figure 17B:
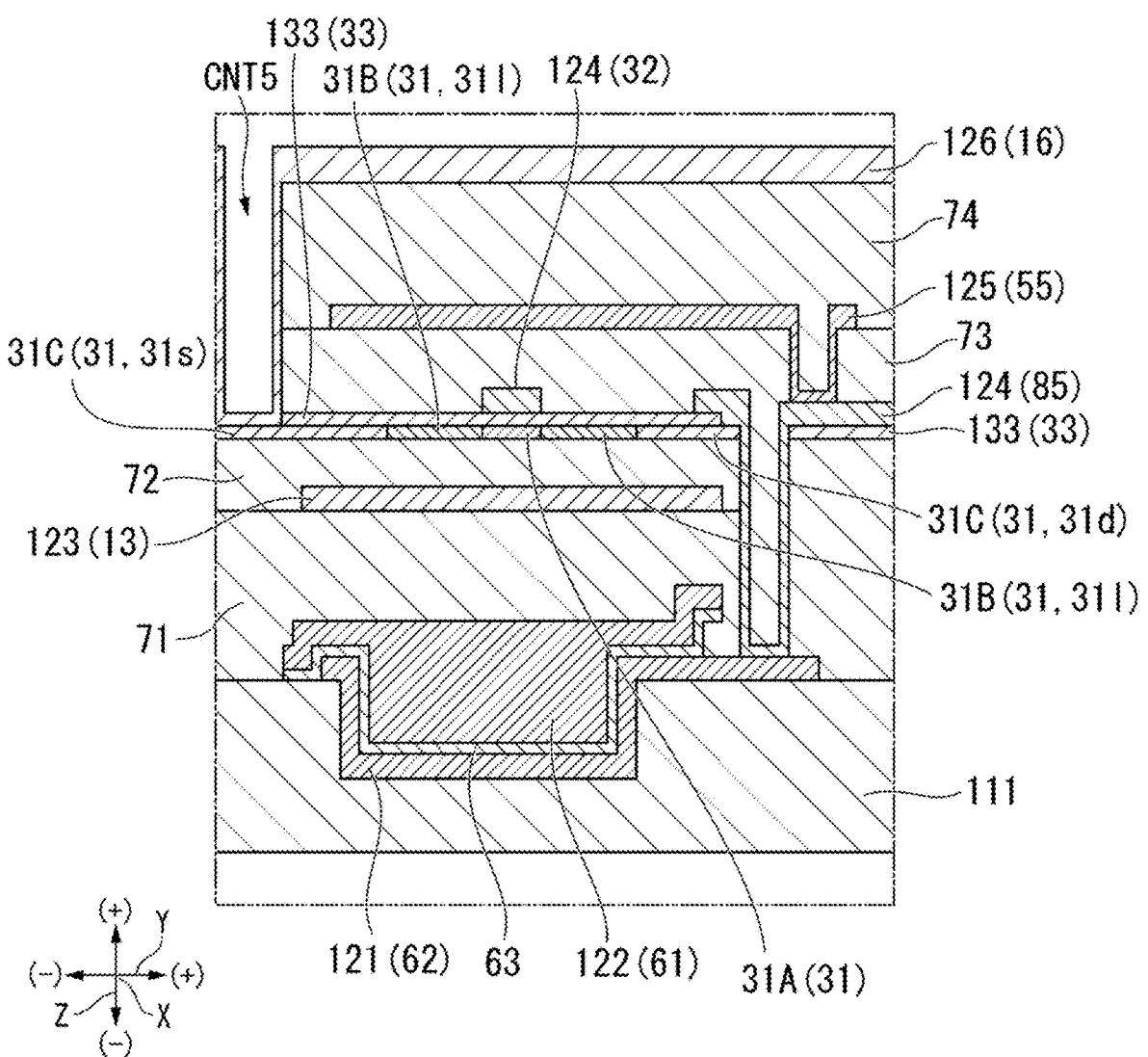
FIG. 17B is a sectional view for describing a manufacturing process of the first substrate of the liquid crystal apparatus of FIG. 1.
Figure 17C:
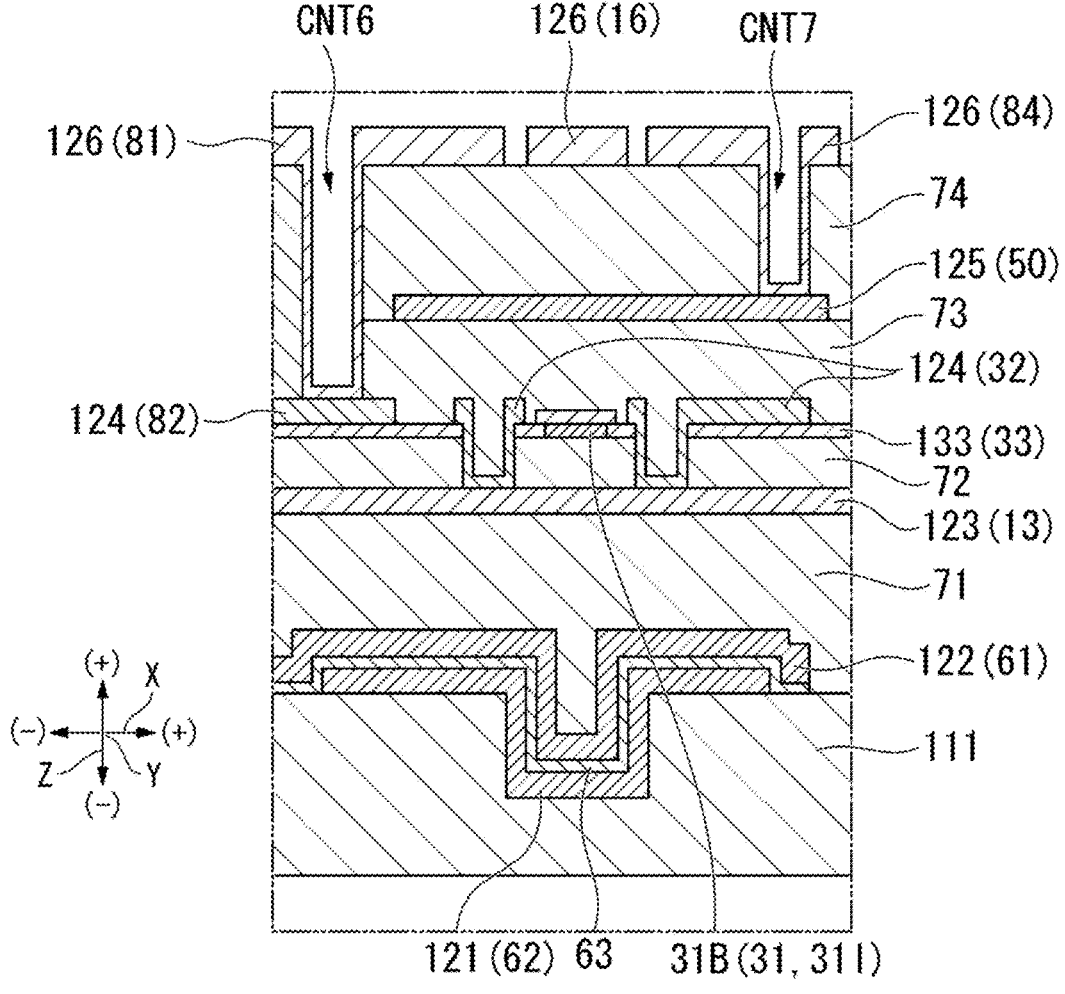
FIG. 17C is a sectional view for describing a manufacturing process of the first substrate of the liquid crystal apparatus of FIG. 1.

FIG. 17A is a plan view illustrating a manufacturing process for the first substrate 10. FIG. 17B is a sectional view illustrating a manufacturing process for the first substrate 10, taken along the line C1-C1 illustrated in FIG. 17A. FIG. 17C is another sectional view illustrating a manufacturing process for the first substrate 10, taken along the line C2-C2 illustrated in FIG. 17A. Regarding the manufacturing process for the first substrate 10 illustrated in FIGS. 17A and 17C, the view taken along the line C3-C3 illustrated in FIG. 17A is the same as FIG. 16D, and is therefore omitted. As illustrated in FIGS. 17A to 17C, the data line 16 is formed in the structure described with reference to FIGS. 16A to 16D.

Specifically, the sixth conductive layer 126 is formed on the fourth interlayer insulating layer 74 and inside the contact holes CNT5, CNT6 and CNT7. The sixth conductive layer 126 is composed of a laminate of a stack of two to four layers of aluminum alloy films, or nitride titanium films and aluminum films. The data line 16, the first relaying electrode 81 and the fourth relaying electrode 84 are formed by patterning the sixth conductive layer 126 as illustrated in FIGS. 17A to 17D after the sixth conductive layer 126 is formed.

As illustrated in FIG. 17B, the data line 16 is formed inside the contact hole CNT5, and electrically coupled to the semiconductor layer 31C making up the source region 31s of the thin film transistor 30 exposed at the bottom of the contact hole CNT5.

As illustrated in FIG. 17C, the first relaying electrode 81 is formed inside the contact hole CNT6, and electrically coupled to the second relaying electrode 82 exposed at the bottom of the contact hole CNT6. The fourth relaying electrode 84 is formed inside the contact hole CNT7, and electrically coupled to the sixth relaying electrode 50 exposed at the bottom of the contact hole CNT7.

Figure 18A:
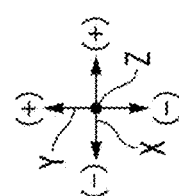
FIG. 18A is a plan view for describing a manufacturing process of the first substrate of the liquid crystal apparatus of FIG. 1.
Figure 18B:
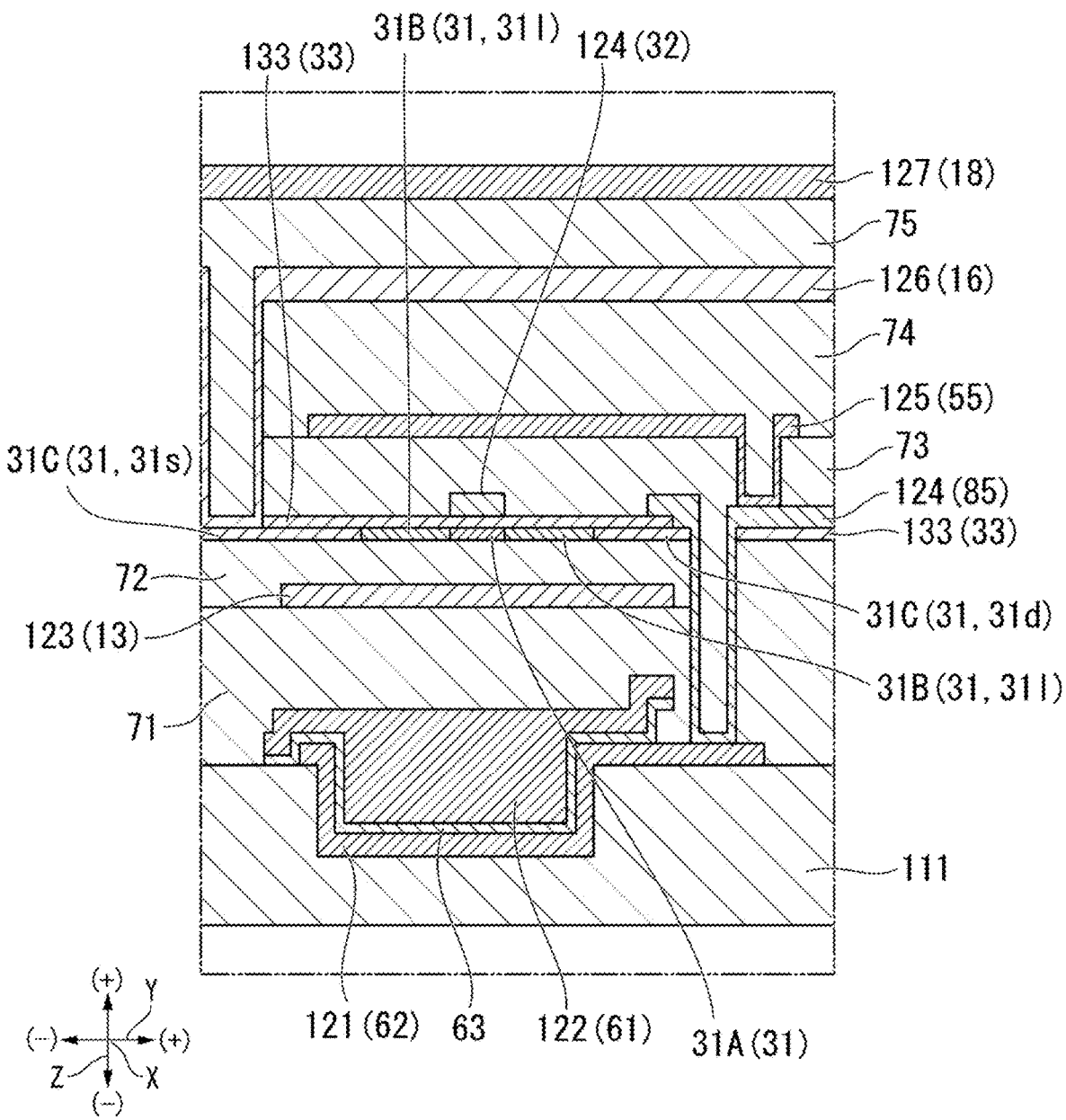
FIG. 18B is a sectional view for describing a manufacturing process of the first substrate of the liquid crystal apparatus of FIG. 1.
Figure 18C:
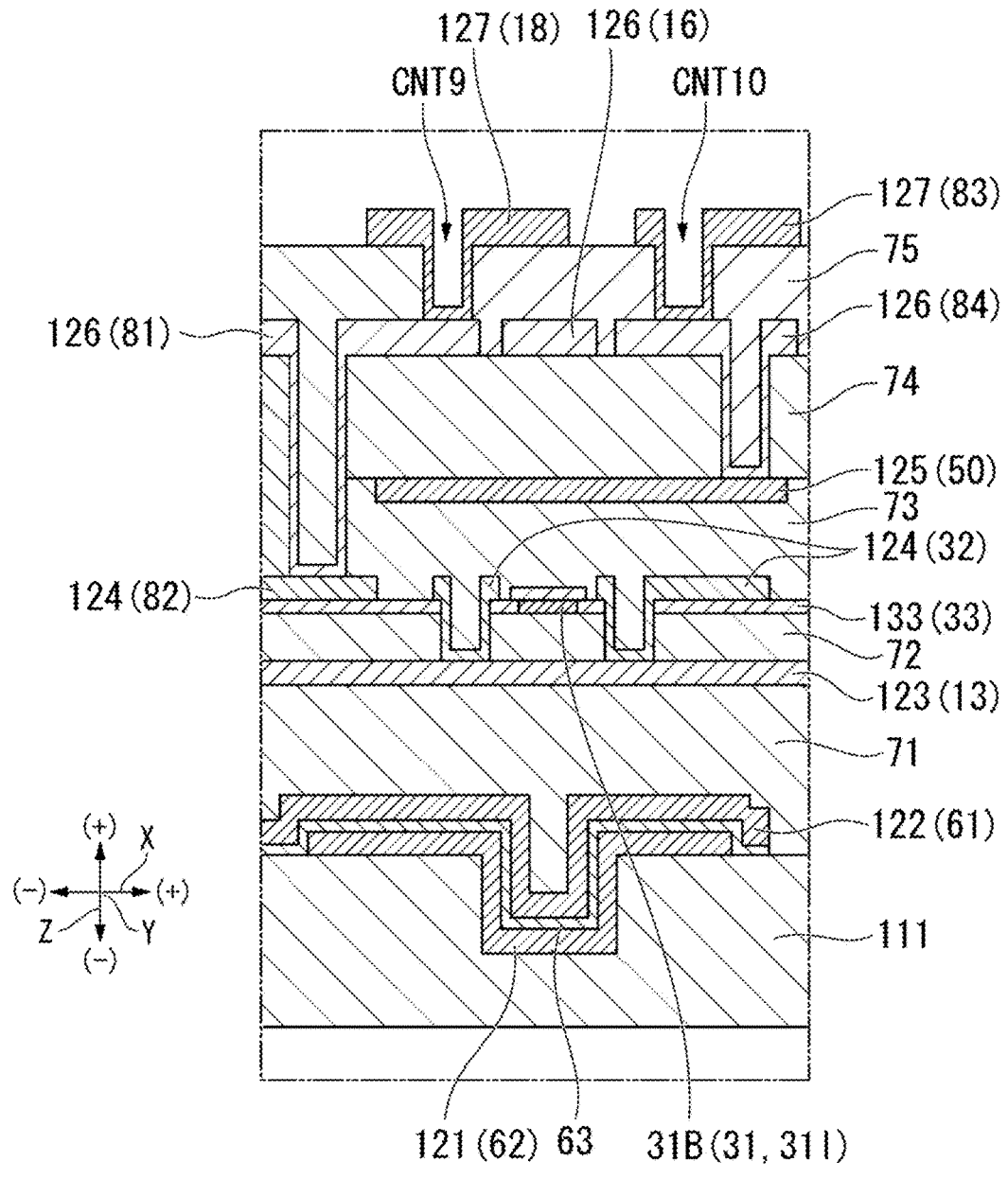
FIG. 18C is a sectional view for describing a manufacturing process of the first substrate of the liquid crystal apparatus of FIG. 1.
Figure 18D:
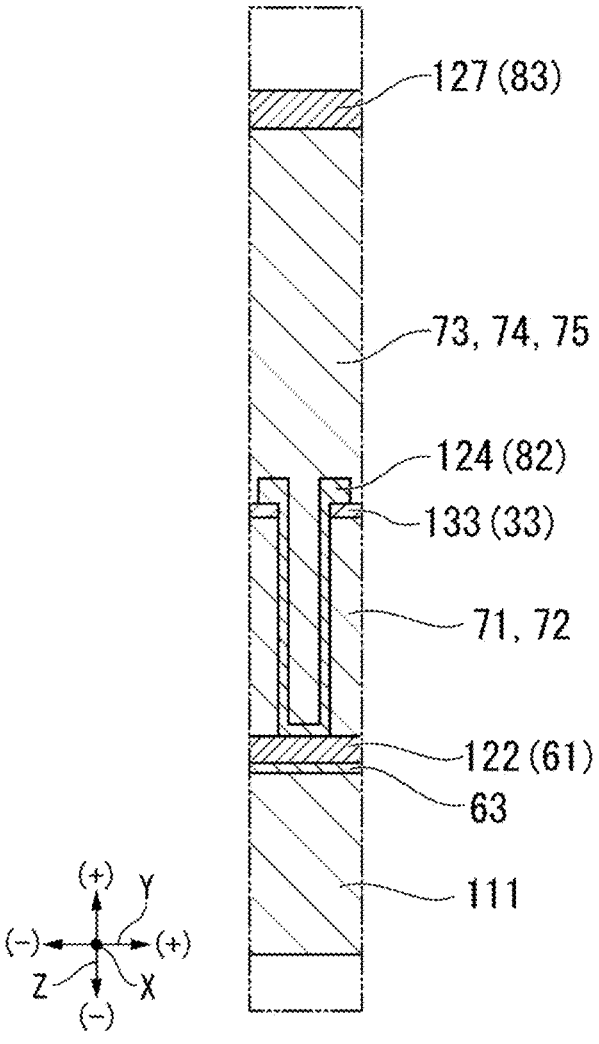
FIG. 18D is a sectional view for describing a manufacturing process of the first substrate of the liquid crystal apparatus of FIG. 1.

FIG. 18A is a plan view illustrating a manufacturing process for the first substrate 10. FIG. 18B is a sectional view illustrating a manufacturing process for the first substrate 10, taken along the line C1-C1 illustrated in FIG. 18A. FIG. 18C is another sectional view illustrating a manufacturing process for the first substrate 10, taken along the line C2-C2 illustrated in FIG. 18A. FIG. 18D is a sectional view illustrating a manufacturing process for the first substrate 10, taken along the line C3-C3 illustrated in FIG. 18A. As illustrated in FIGS. 18A to 18D, the common wiring 18 is formed in the structure described with reference to FIGS. 17A to 17C.

Specifically, the fifth interlayer insulating layer 75 composed of a TEOS film is formed on the data line 16, on the first relaying electrode 81, and on the fourth relaying electrode 84. The film thickness of the fifth interlayer insulating layer 75 is 500 nm to 1000 nm.

Subsequently, contact holes CNT9 and CNT10 are formed. As illustrated in FIG. 18A, the contact hole CNT9 is formed at a position overlapping an extension part 18t extending in the −X direction from the common wiring 18 in plan view. As illustrated in FIG. 18C, the contact hole CNT9 extends through the fifth interlayer insulating layer 75 in the Z axis. The first relaying electrode 81 is exposed at the bottom of the contact hole CNT9.

As illustrated in FIG. 18A, the contact hole CNT10 is formed on the +X direction side of the common wiring 18. As illustrated in FIG. 10C, the contact hole CNT10 extends through the fifth interlayer insulating layer 75 in the Z axis. The fourth relaying electrode 84 is exposed at the bottom of the contact hole CNT10.

Subsequently, the seventh conductive layer 127 is formed on the fifth interlayer insulating layer 75 and inside the contact holes CNT9 and CNT10. The seventh conductive layer 127 is composed of a laminate of a stack of two to four layers of aluminum alloy films or nitride titanium films and aluminum films. The common wiring 18 and the third relaying electrode 83 are formed by patterning the seventh conductive layer 127 as illustrated in FIG. 18A after the seventh conductive layer 127 is formed.

As illustrated in FIGS. 18A and 18B, the common wiring 18 is formed at a position overlapping the data line 16 in plan view. The common wiring 18 is formed inside the contact hole CNT9 and electrically coupled to the first relaying electrode 81 exposed at the bottom of the contact hole CNT9.

As illustrated in FIG. 18A, the third relaying electrode 83 is disposed between the common wirings 18 in the X axis. The third relaying electrode 83 includes the protruding portion 83t protruding in the +Y direction from the portion along the X axis. The protruding portion 83*t* is formed at a position overlapping the second relaying electrode 82 and the protruding portion 61*t* of a third capacitive electrode 61.

As illustrated in FIG. 18C, the third relaying electrode 83 is formed inside the contact hole CNT10, and electrically coupled to the fourth relaying electrode 84 exposed at the bottom of the contact hole CNT10.

Although not shown in the drawing, subsequently, the sixth interlayer insulating layer 76 composed of a TEOS film is formed on the common wiring 18 and on the third relaying electrode 83. The film thickness of the sixth interlayer insulating layer 76 is 500 nm to 1000 nm, for example.

Figure 19A:
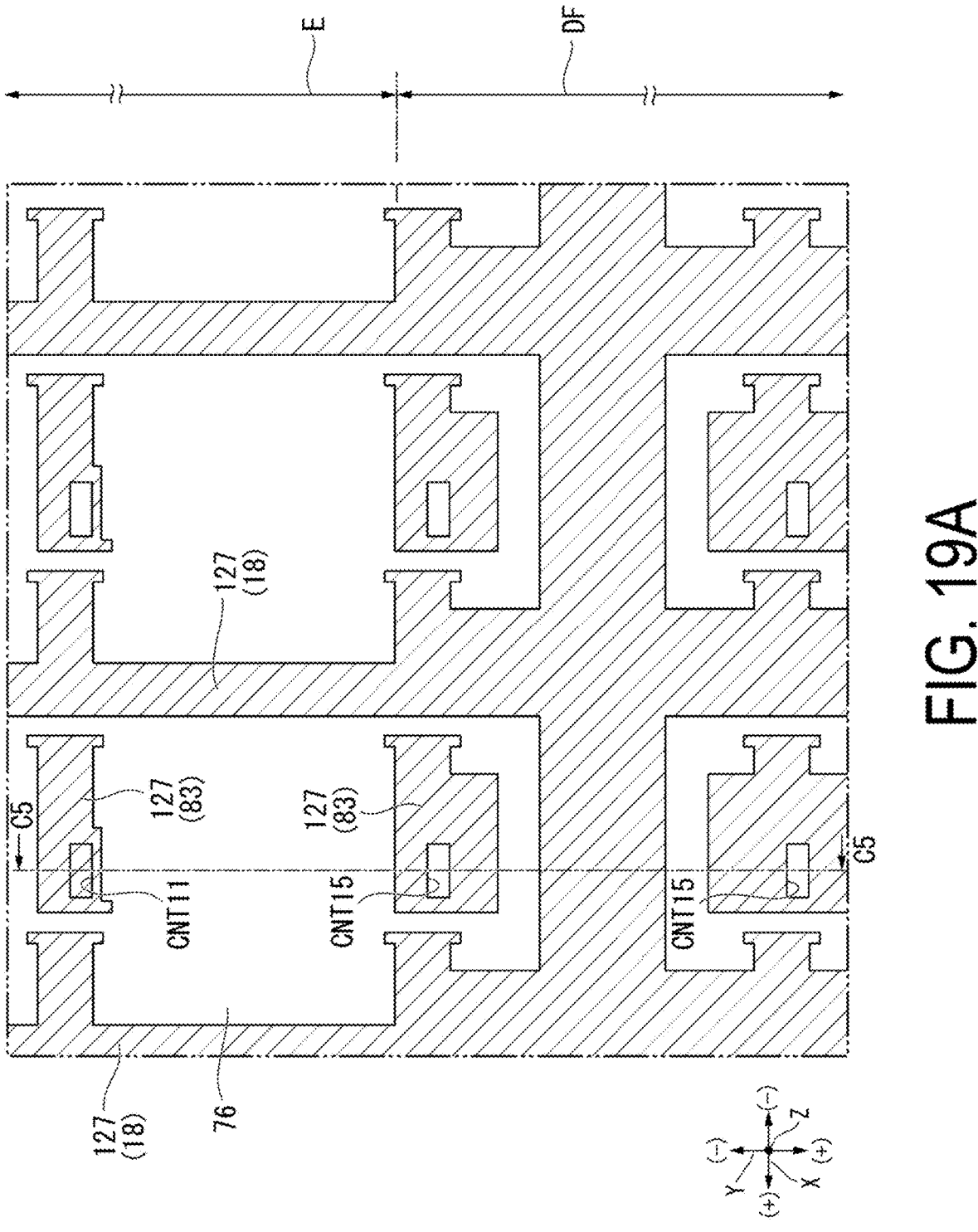
FIG. 19A is a plan view for describing a manufacturing process of the first substrate of the liquid crystal apparatus of FIG. 1.
Figure 19B:
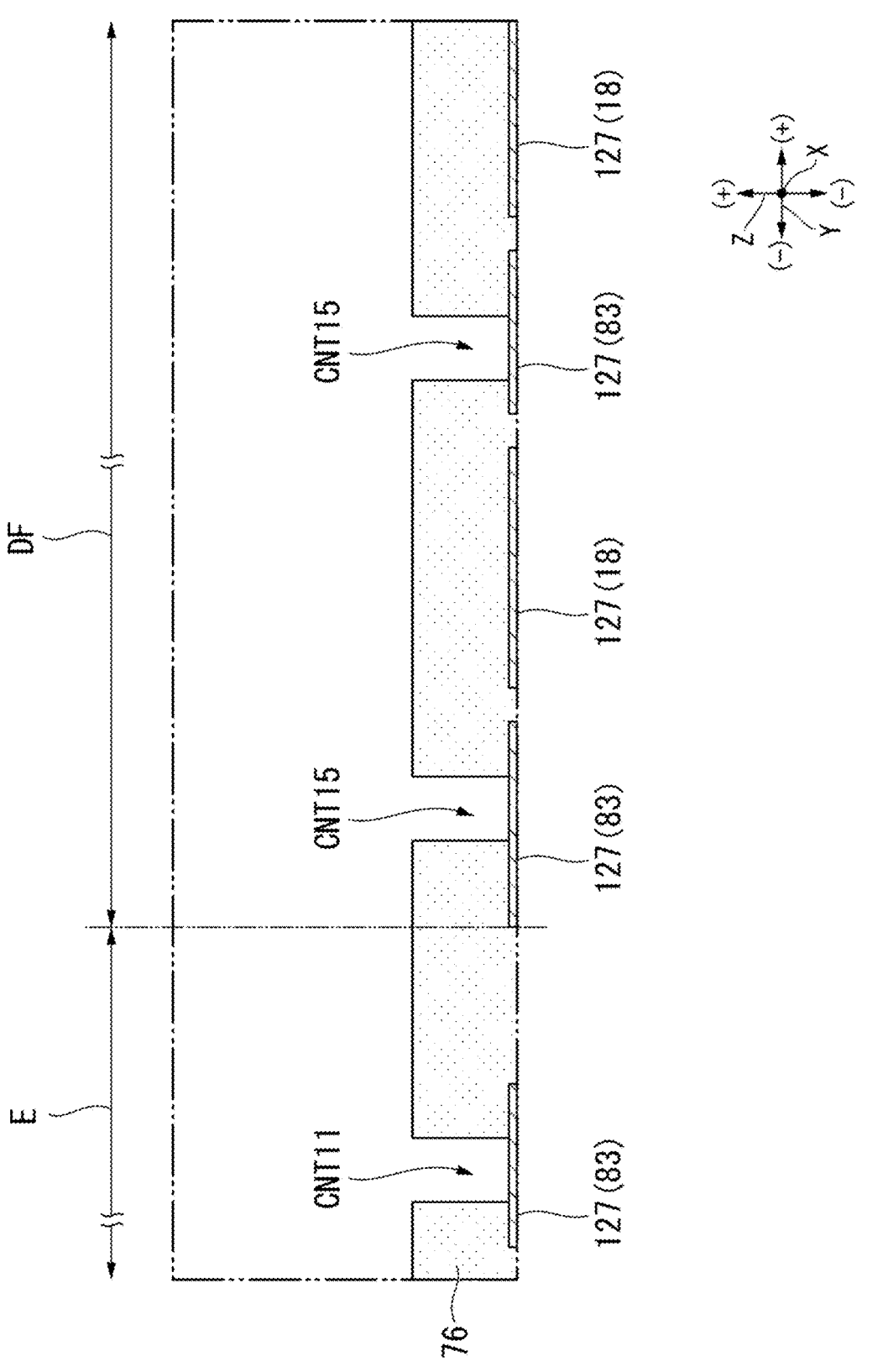
FIG. 19B is a sectional view for describing a manufacturing process of the first substrate of the liquid crystal apparatus of FIG. 1.

FIG. 19A is a plan view illustrating a manufacturing process for an upper part structure of the first substrate 10. FIG. 19B is a sectional view illustrating a manufacturing process for an upper part structure of the first substrate 10, taken along the line C5-C5 illustrated in FIG. 19A. Note that in the sectional views of FIGS. 19B to 23, the illustration of steps in the Z axis of the common wiring 18 and the third relaying electrode 83 included in the seventh conductive layer 127 is omitted. As illustrated in FIGS. 19A and 19B, the contact holes CNT 11 and CNT15 are formed at the sixth interlayer insulating layer 76. More specifically, the contact hole CNT 11 is formed in the sixth interlayer insulating layer 76 overlapping the third relaying electrode 83 in the display region E in plan view. The contact hole CNT15 is formed in the sixth interlayer insulating layer 76 overlapping the third relaying electrode 83 in the dummy pixel region DF in plan view.

Figure 20A:
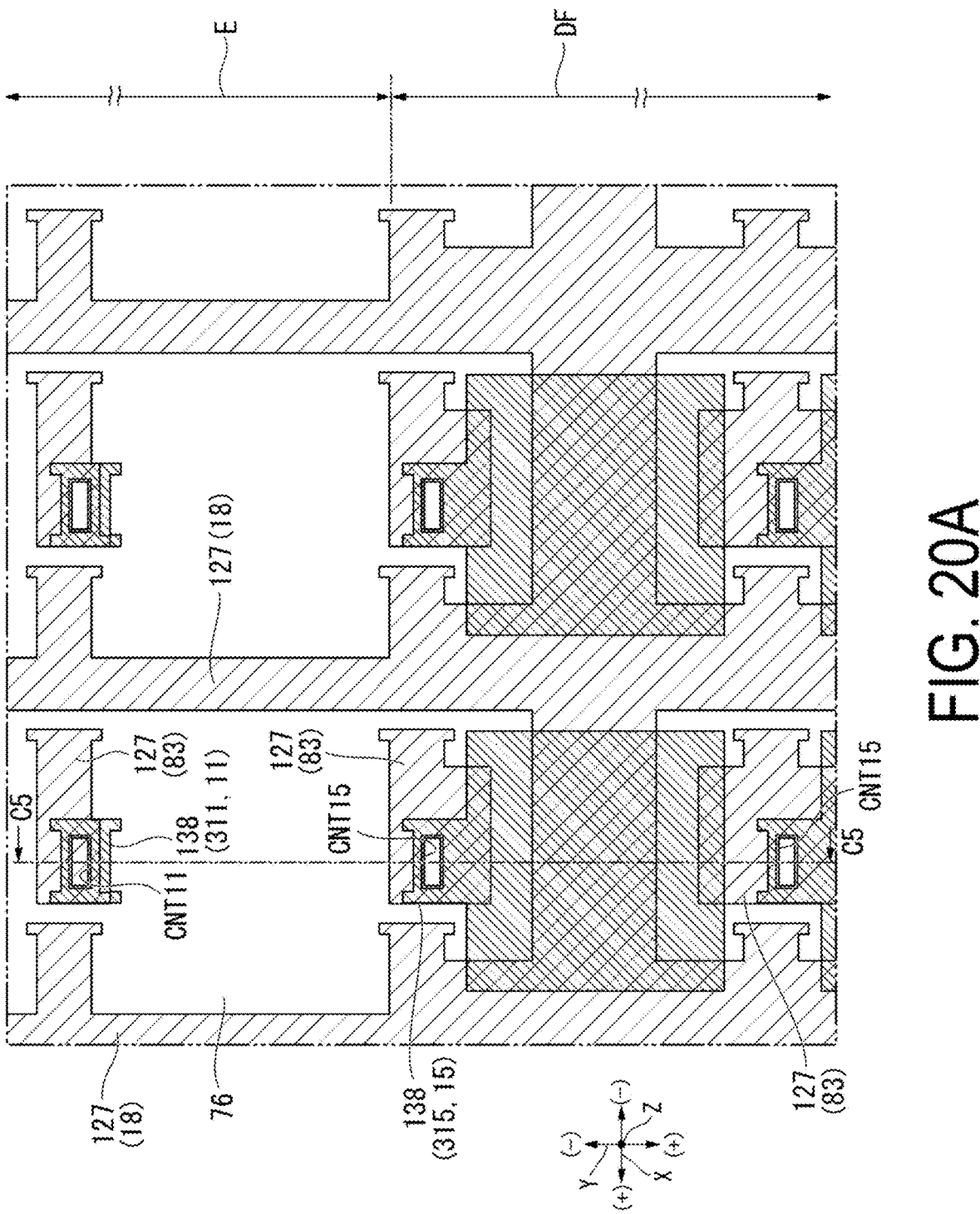
FIG. 20A is a plan view for describing a manufacturing process of the first substrate of the liquid crystal apparatus of FIG. 1.
Figure 20B:
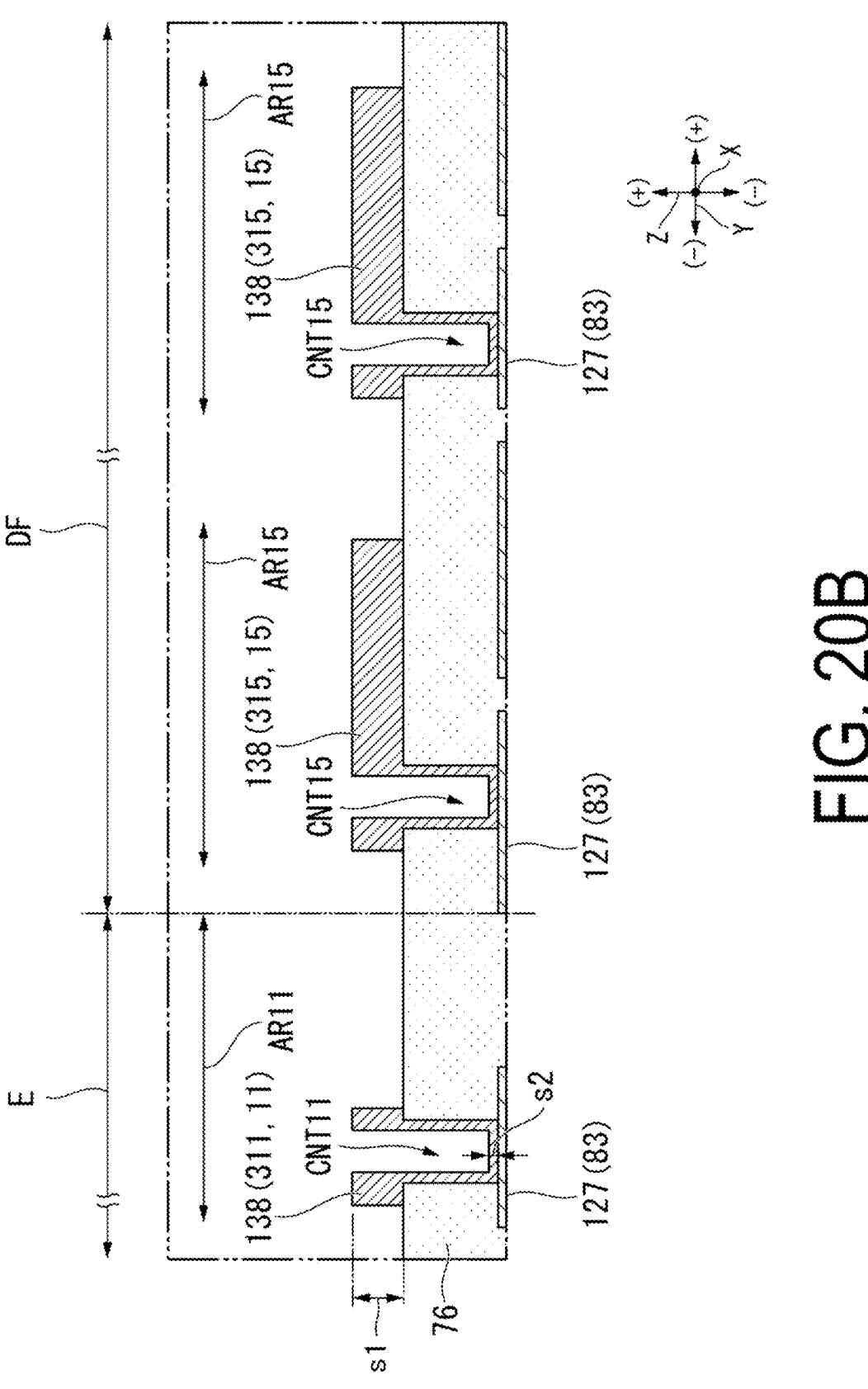
FIG. 20B is a sectional view for describing a manufacturing process of the first substrate of the liquid crystal apparatus of FIG. 1.

FIG. 20A is a plan view illustrating a manufacturing process for an upper part structure of the first substrate 10. FIG. 20B is a sectional view illustrating a manufacturing process for an upper part structure of the first substrate 10, taken along the line C5-C5 illustrated in FIG. 20A. In the structure illustrated in FIGS. 19A and 19B, an eighth conductive layer 138 composed of ITO is formed at the exposed surface of the sixth interlayer insulating layer 76 on the +Z direction side, the inner wall and bottom of the contact hole CNT 11, and the inner wall and bottom of the contact hole CNT15. At this time, the thickness s1 of the eighth conductive layer 138 formed at the surface of the sixth interlayer insulating layer 76 on the +Z direction side is set to a value greater than the thickness s2 of the eighth conductive layer 138 formed at the inner walls and bottoms of the contact holes CNT 11 and CNT15. Note that for the purpose of setting the thickness s1 greater than the thickness s2, it is possible to supply the eighth conductive layer 138 in the contact holes CNT 11 and CNT15 and then remove the unnecessary eighth conductive layer 138 inside the contact holes CNT 11 and CNT15. The eighth conductive layer 138 is composed of a transparent conductive material such as ITO, for example.

Subsequently, by patterning the eighth conductive layer 138 as illustrated in FIGS. 20A and 20B, the first pixel electrode layer 311 of the pixel electrode 11 is formed in each of the plurality of opening regions AR11 in the display region E, and the first dummy pixel electrode layer 315 of the dummy pixel electrode 15 is formed in each of the plurality of opening regions AR15 in the dummy pixel region DF.

Figure 21A:
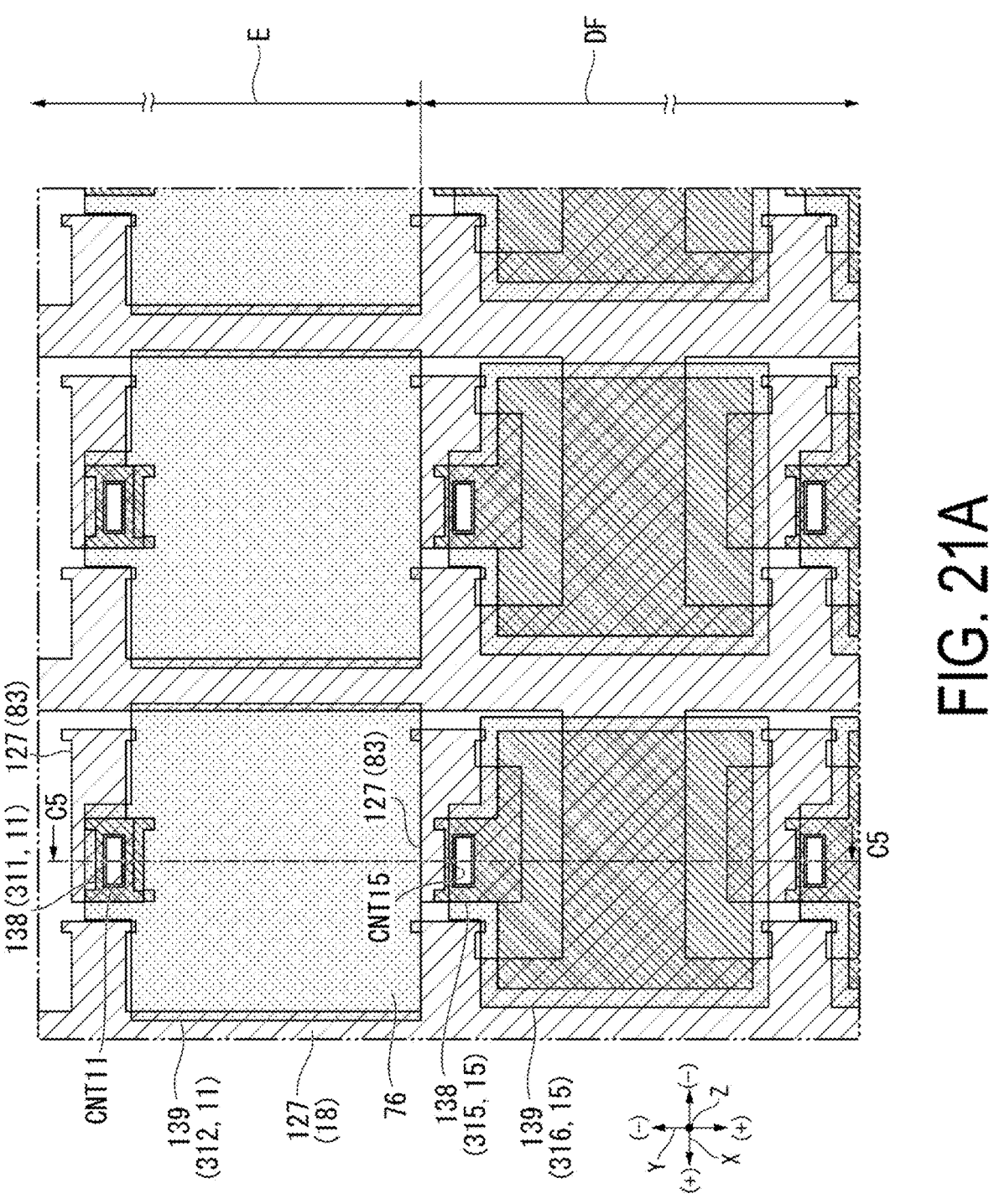
FIG. 21A is a plan view for describing a manufacturing process of the first substrate of the liquid crystal apparatus of FIG. 1.
Figure 21B:
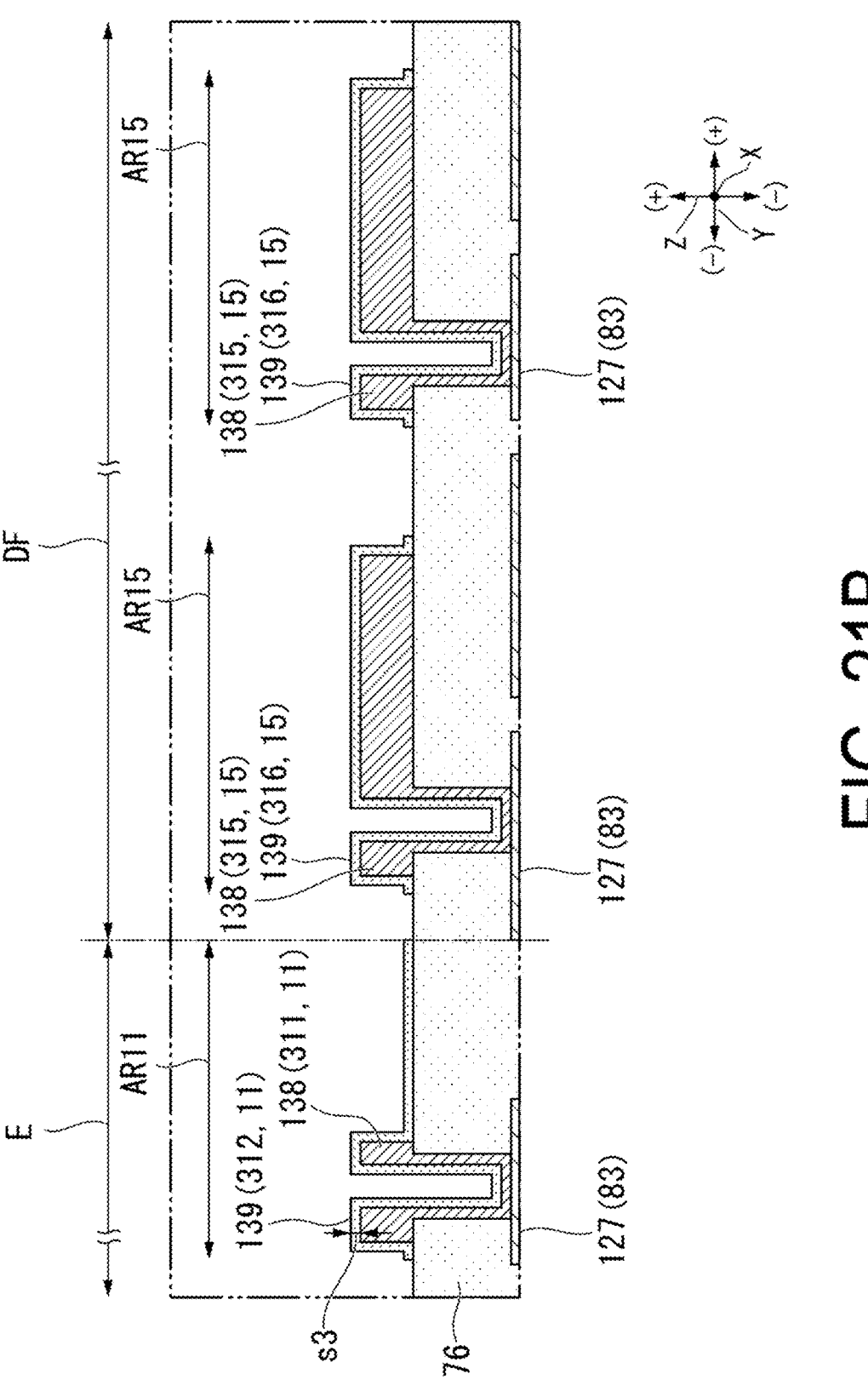
FIG. 21B is a sectional view for describing a manufacturing process of the first substrate of the liquid crystal apparatus of FIG. 1.

FIG. 21A is a plan view illustrating a manufacturing process for an upper part structure of the first substrate 10. FIG. 21B is a sectional view illustrating a manufacturing process for an upper part structure of the first substrate 10, taken along the line C5-C5 illustrated in FIG. 21A. In the structure illustrated in FIGS. 20A and 20B, a ninth conductive layer 139 composed of ITO with higher oxygen content than the eighth conductive layer 138 is formed on all components. The thickness s3 of ninth conductive layer 139 is smaller than the thickness s1 of the eighth conductive layer 138, and is substantially the same as the thickness s2.

Subsequently, through patterning of the ninth conductive layer 139 as illustrated in FIGS. 21A and 21B, the second pixel electrode layer 312 covering the first pixel electrode layer 311 and the sixth interlayer insulating layer 76 in each opening region AR11 is formed, and the second dummy pixel electrode layer 316 covering the first dummy pixel electrode layer 315 in each opening region AR15 is formed.

Figure 22A:
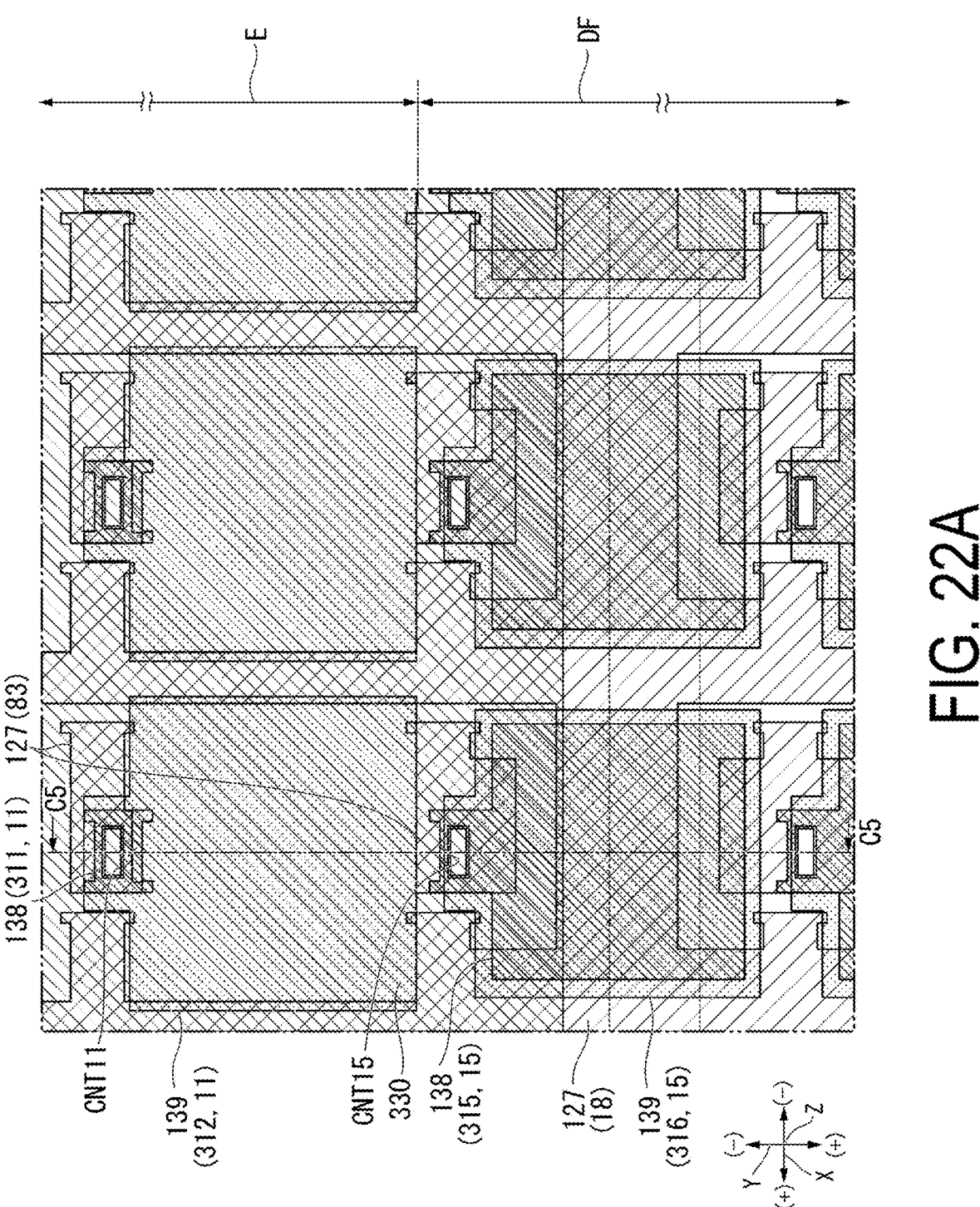
FIG. 22A is a plan view for describing a manufacturing process of the first substrate of the liquid crystal apparatus of FIG. 1.
Figure 22B:
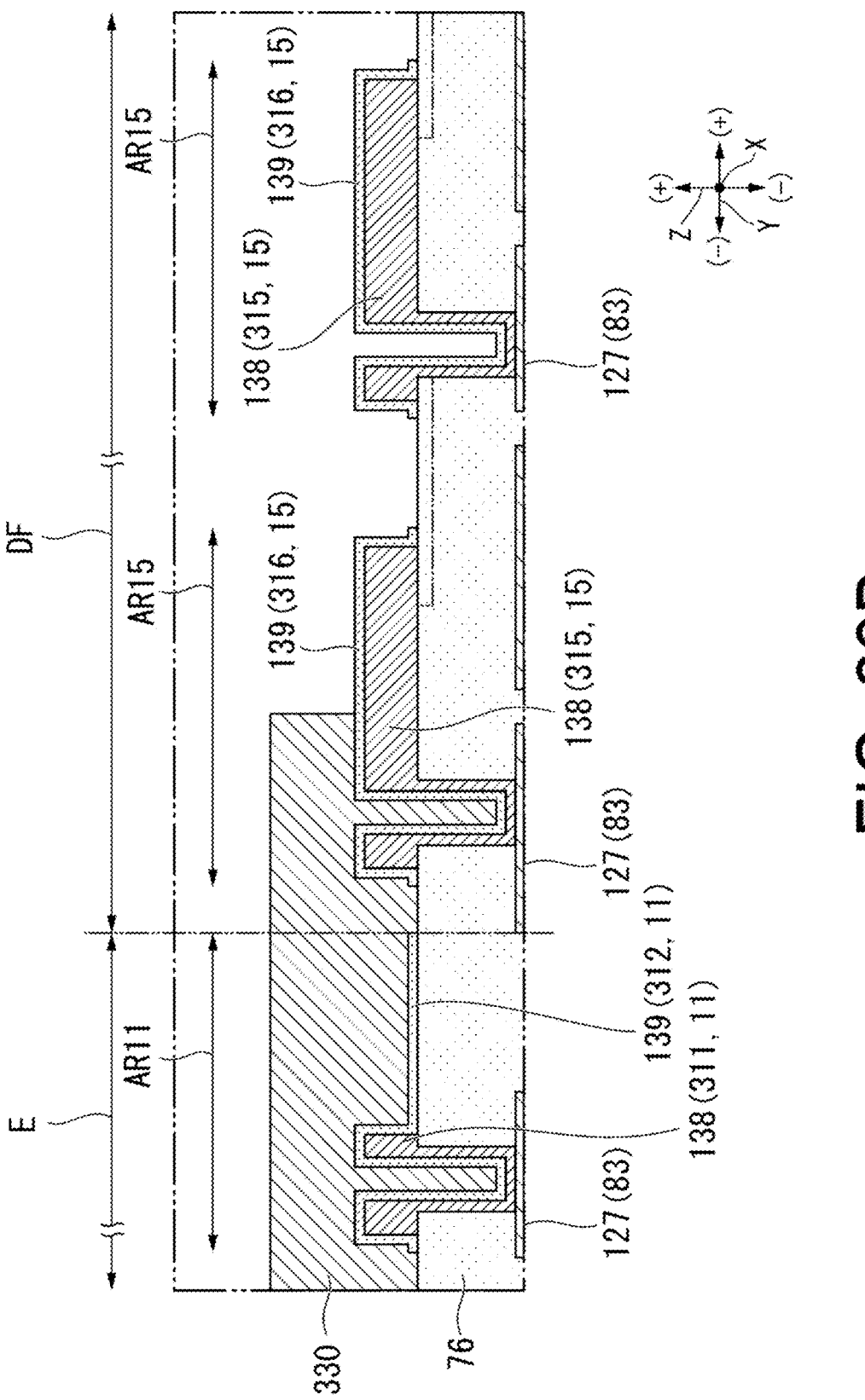
FIG. 22B is a sectional view for describing a manufacturing process of the first substrate of the liquid crystal apparatus of FIG. 1.

FIG. 22A is a plan view illustrating a manufacturing process for an upper part structure of the first substrate 10. FIG. 22B is a sectional view illustrating a manufacturing process for an upper part structure of the first substrate 10, taken along the line C5-C5 illustrated in FIG. 22A. In the structure illustrated in FIGS. 21A and 21B, in plan view, a resist 330 is formed to cover the entirety of the display region E, and the part from the boundary between the display region E and the dummy pixel region DF to the region overlapping the third relaying electrode 83 in the XY plane in the opening region AR15 located closest to the display region E and provided to surround the display region E among the plurality of opening regions AR15 in the dummy pixel region DF. The resist 330 is resistant to the chemical liquid used in the next step.

Figure 23:
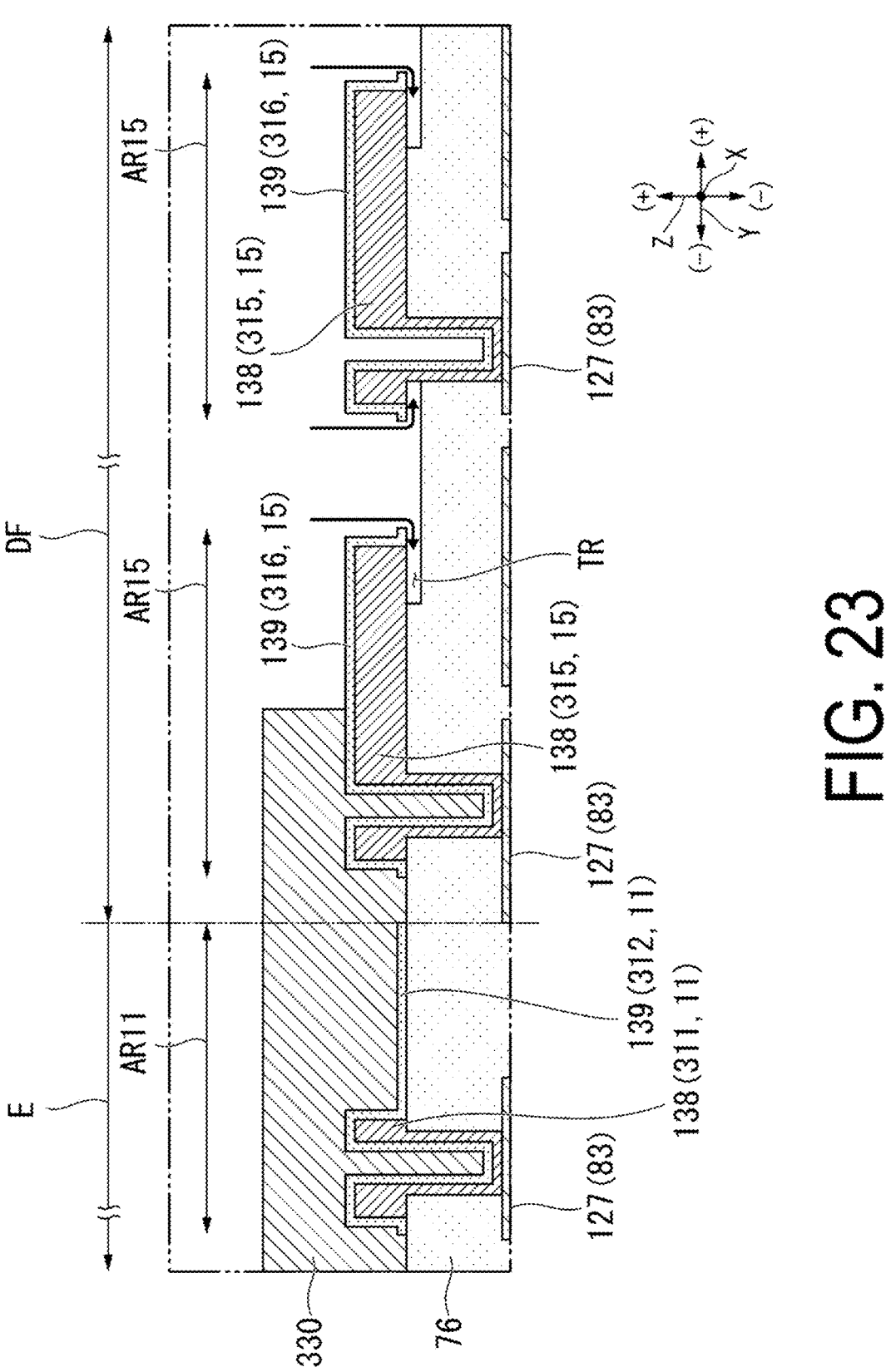
FIG. 23 is a sectional view for describing a manufacturing process of the first substrate of the liquid crystal apparatus of FIG. 1.

FIG. 23 is a sectional view illustrating a manufacturing process for an upper part structure of the first substrate 10, taken along the line C5-C5 illustrated in FIG. 22A. As illustrated in FIG. 23, in the structure illustrated in FIGS. 22A and 22B, the space TR illustrated in FIG. 23 is formed by removing the sixth interlayer insulating layer 76 in the region surrounded by the chain double-dashed line in FIG. 22B through wet etching using chemical liquid that acts on the sixth interlayer insulating layer 76 but to which the resist 330 is resistant. More specifically, through wet etching, the chemical liquid penetrates as indicated by the arrow, and naturally diffuses to the upper end portion of the sixth interlayer insulating layer 76 from the gap between the opening regions AR15 adjacent to each other in the XY plane in the dummy pixel region DF. Through post-processing, a resist 330 is removed, and the upper end portion of the sixth interlayer insulating layer 76 penetrated with the chemical liquid is removed, and thus, the space TR is formed.

Note that the area of the space TR in the XY plane, and the spacing gg between the surface 76*w* of the bottom of the recess of the sixth interlayer insulating layer 76 and the bottom surface 315*b* of the first dummy pixel electrode layer 315 facing the space TR on the +Z direction side are roughly determined based on the time for which the chemical liquid acts on the sixth interlayer insulating layer 76 to be removed as the space TR through the wet etching. Therefore, the acting time of the chemical liquid during the wet etching and the like are adjusted in accordance with the determined area of the space TR in plan view and the spacing gg so as to favorably capture in the space TR the ionic impurities IO diffused toward the display region E from the outside of the dummy pixel region DF in plan view as described above.

The liquid crystal apparatus 100 serving as an electro-optic apparatus is manufactured through the above-described steps.

Electronic Equipment

Figure 24:
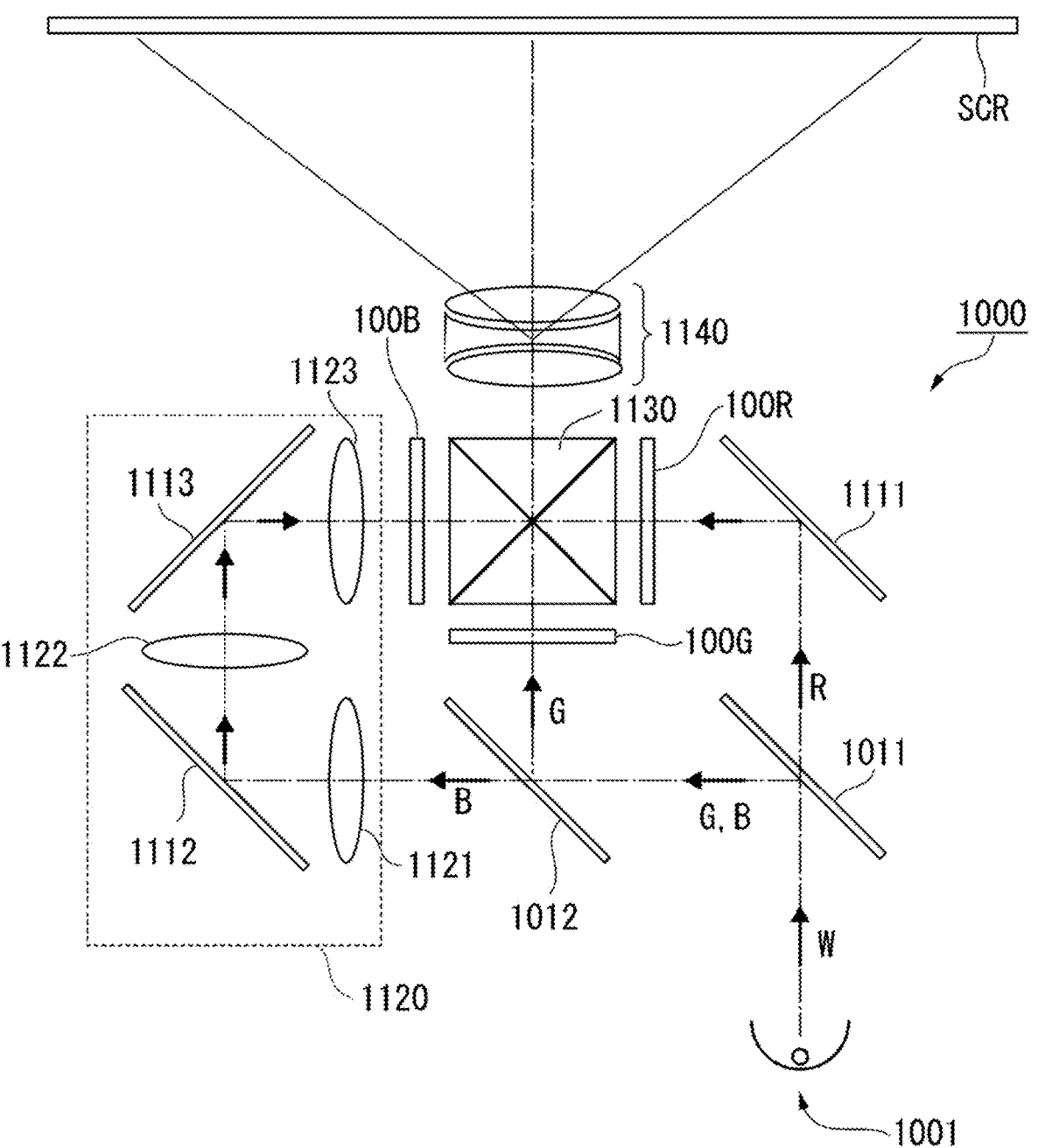
FIG. 24 is a schematic view of electronic equipment of the embodiment of the present disclosure.

In this embodiment, a projector 1000 is described as an example of electronic equipment including the liquid crystal apparatus 100. FIG. 24 is a schematic view of the projector 1000. As illustrated in FIG. 24, the projector 1000 includes a light source apparatus 1001, dichroic mirrors 1011 and 1012, liquid crystal apparatuses 100B, 100G and 100R, reflection mirrors 1111, 1112 and 1113, relay lenses 1121, 1122 and 1123, a cross-dichroic prism 1130, and a projection lens 1140.

The light source apparatus 1001 emits white light W. The light source apparatus 1001 is, for example, a discharge lamp unit, but the light source apparatus 1001 is not limited to a specific light source apparatus. The light source apparatus 1001 may be a light-emitting diode, a laser or the like, or may be an apparatus composed of a combination of a light emitter that emits blue light and a phosphor that converts a part of blue light emitted from the light emitter into yellow light and emits the yellow light.

The white light W2 emitted from the light source apparatus 1001 is separated by the two dichroic mirrors 1011 and 1012 into color light of three colors with wavelength ranges different from each other. The color light of three colors includes red light R, green light G, and blue light B. The dichroic mirror 1011 transmits the red light R and reflects the green light G and the blue light B with shorter wavelength than the red light R. The red light R transmitted through the dichroic mirror 1011 is reflected by reflection mirror 1111 to enter the liquid crystal apparatus 100R. The green light G reflected by the dichroic mirror 1011 is reflected by the dichroic mirror 1012 and then enters the liquid crystal apparatus 100G. The blue light B reflected by the dichroic mirror 1011 is transmitted through the dichroic mirror 1012, and emitted to a relay lens system 1120.

The relay lens system 1120 includes relay lenses 1121, 1122 and 1123, and reflection mirrors 1112 and 1113. The light path of the blue light B from the dichroic mirror 1011 to the liquid crystal apparatus 100B is longer than the light path of the green light G from the dichroic mirror 1011 to the liquid crystal apparatus 100G, and the light path of the red light R from the dichroic mirror 1011 to the liquid crystal apparatus 100R. Therefore, the light flux of the blue light B is likely to be greater than the light fluxes of the green light G and the red light R. The use of the relay lens 1122 suppresses the expansion of the light flux of the blue light B. The blue light B incident on the relay lens system 1120 is reflected by the reflection mirror 1112, and converged near the relay lens 1122 by the relay lens 1121. The blue light B enters the liquid crystal apparatus 100B through the reflection mirror 1113 and the relay lens 1123.

The liquid crystal apparatuses 100R, 100G and 100B are light modulating apparatuses in the projector 1000. The liquid crystal apparatus 100 as the above-described electro-optic apparatus is applied to the liquid crystal apparatuses 100R, 100G and 100B.

Each of the liquid crystal apparatuses 100R, 100G and 100B is electrically coupled to an external control apparatus of the projector 1000. The image signals that specify the gradation levels of the red light R, the green light G and the blue light B are supplied from the external control apparatuses of respective color light, and processed by respective integrated circuits belonging to the liquid crystal apparatuses 100R, 100G and 100B. The liquid crystal apparatuses 100R, 100G and 100B are driven by image signals received from respective integrated circuits. The liquid crystal apparatus 100R modulates the incident red light R. The liquid crystal apparatus 100G modulates the incident green light G. The liquid crystal apparatus 100B modulates the incident blue light B.

The red light R, the green light G and the blue light B modulated by the liquid crystal apparatuses 100R, 100G and 100B impinge on the cross-dichroic prism 1130 from three directions. The cross-dichroic prism 1130 is a color synthesis optical system in the projector 1000, and synthesizes the incident red light R, green light G, and blue light B. In the cross-dichroic prism 1130, the red light R and the blue light B are reflected at 90 degrees with respect to respective incident directions, while the green light G is transmitted through it. As a result, the synthesized red light R, green light G and blue light B are emitted in the same direction. The red light R, the green light G and the blue light B are synthesized as display light for displaying color images, and are emitted toward the projection lens 1140 from the cross-dichroic prism 1130.

The projection lens 1140 is disposed to face the outside of the projector 1000. The display light is emitted in an enlarged manner through the projection lens 1140, and is projected on a screen SCR as a projection object.

Operational Effects

The above-described liquid crystal apparatus 100 of this embodiment includes at least the element substrate 111, the third relaying electrode 83 provided in the display region E, the pixel electrode 11, the third relaying electrode 83 provided in the dummy pixel region DF, the dummy pixel electrode 15, and the sixth interlayer insulating layer 76. The element substrate 111 corresponds to "substrate" of the liquid crystal apparatus 100. The third relaying electrode 83 provided in the display region E corresponds to "first conductive member" of the liquid crystal apparatus 100. The third relaying electrode 83 provided in the dummy pixel region DF corresponds to "second conductive member" of the liquid crystal apparatus 100. The sixth interlayer insulating layer 76 corresponds to "insulating layer" of the liquid crystal apparatus 100. The third relaying electrode 83 provided in the display region E is provided on one side, i.e., the +Z direction side, of the element substrate 111. The pixel electrode 11 is electrically coupled to the third relaying electrode 83 provided in the display region E. The dummy pixel electrode 15 is electrically coupled to the third relaying electrode 83 provided in the dummy pixel region DF. The sixth interlayer insulating layer 76 is disposed between the pixel electrode 11 and the element substrate 111, and between the dummy pixel electrode 15 and the element substrate 111 in the Z axis. The pixel electrode 11 includes a first pixel electrode layer 311 and a second pixel electrode layer 312. The first pixel electrode layer 311 is overlapping the third relaying electrode 83 provided in the display region E in plan view, and electrically coupled to the third relaying electrode 83 provided in the display region E. The second pixel electrode layer 312 overlaps the first pixel electrode layer 311 in plan view, and overlaps the opening region AR11 of the pixel P in plan view. The width, i.e., the thickness s3 of the second pixel electrode layer 312 in the Z axis, which is the thickness direction of the element substrate 111 and the first substrate 10 is smaller than the width, i.e., the maximum thickness s1 of the first pixel electrode layer 311 in the Z axis. The dummy pixel electrode 15 includes a first dummy pixel electrode layer 315 and a second dummy pixel electrode layer 316. The first dummy pixel electrode layer 315 is overlapping the third relaying electrode 83 provided in the dummy pixel region DF in plan view, and electrically coupled to the third relaying electrode 83 provided in the dummy pixel region DF. The second dummy pixel electrode layer 316 overlaps the first dummy pixel electrode layer 315 and in plan view. The width, i.e., the thickness s6 of the second dummy pixel electrode layer 316 in the Z axis, which is the thickness direction of the element substrate 111 and the first substrate 10 is smaller than the width of the first dummy pixel electrode layer 315 in the Z axis. In plan view, the sixth interlayer insulating layer 76 and the first dummy pixel electrode layer 315 and the second dummy pixel electrode layer 316 in the portion not overlapping the third relaying electrode 83 provided in the dummy pixel region DF face each other with a gap therebetween in the Z axis. In plan view, the space TR is formed between the sixth interlayer insulating layer 76, and the first dummy pixel electrode layer 315 and the second dummy pixel electrode layer 316 in the portion not overlapping the third relaying electrode 83 provided in the dummy pixel region DF.

In the liquid crystal apparatus 100 of the embodiment, the first pixel electrode layer 311 is provided only in the region overlapping the third relaying electrode 83 in plan view in the opening region AR11 of the display region E, and thus the contact resistance is favorably ensured. With the second pixel electrode layer 312 provided alone in the entirety of the opening region AR11, the transmittance of the light L at the pixel P in the opening region AR11 is improved. In addition, in the liquid crystal apparatus 100 of the embodiment, the opening region AR15 in the dummy pixel region DF is provided with the first dummy pixel electrode layer 315 and the second dummy pixel electrode layer 316 in the entirety of the opening region AR15 including the region overlapping the third relaying electrode 83 in plan view, and thus a structure different from that of the opening region AR11 of the display region E is formed. In the opening region AR15, in the region on the side opposite to the region overlapping the third relaying electrode 83 in plan view in the XY plane, the space TR is formed between the sixth interlayer insulating layer 76, and the first dummy pixel electrode layer 315 and the second dummy pixel electrode layer 316. Thus, during the manufacturing of the liquid crystal apparatus 100, the ionic impurities IO diffused from the sealing material 6 and the like toward the display region E through the dummy pixel region DF are favorably captured in the space TR. Thus, with the liquid crystal apparatus 100 of the embodiment, the transmittance of the light L can be increased in the display region E, and the occurrence of bright spots and display defects due to the diffusion of the ionic impurities IO can be prevented.

As described above, the liquid crystal apparatus 100 of the embodiment includes at least the element substrate 111, the third relaying electrode 83 provided in the display region E, the pixel electrode 11, the third relaying electrode 83 provided in the dummy pixel region DF, the dummy pixel electrode 15, and the sixth interlayer insulating layer 76. The pixel electrode 11 includes a first pixel electrode layer 311 and a second pixel electrode layer 312. The first pixel electrode layer 311 is overlapping the third relaying electrode 83 provided in the display region E in plan view, and electrically coupled to the third relaying electrode 83 provided in the display region E. The second pixel electrode layer 312 overlaps the first pixel electrode layer 311 in plan view, and overlaps the opening region AR11 of the pixel P in plan view. The width, i.e., the thickness s3 of the second pixel electrode layer 312 in the Z axis, which is the thickness direction of the element substrate 111 and the first substrate 10 is equal to or smaller than ⅓ of the width, i.e., the maximum thickness s1 of the first pixel electrode layer 311 in the Z axis. The dummy pixel electrode 15 includes the first dummy pixel electrode layer 315. The first dummy pixel electrode layer 315 is overlapping the third relaying electrode 83 provided in the dummy pixel region DF in plan view, and electrically coupled to the third relaying electrode 83 provided in the dummy pixel region DF. In plan view, the first dummy pixel electrode layer 315 and the sixth interlayer insulating layer 76 in the portion not overlapping the third relaying electrode 83 provided in the dummy pixel region DF face each other with a gap therebetween in the Z axis. In plan view, the space TR is formed between the sixth interlayer insulating layer 76, and the first dummy pixel electrode layer 315 and the second dummy pixel electrode layer 316 in the portion not overlapping the third relaying electrode 83 provided in the dummy pixel region DF.

In the liquid crystal apparatus 100 of the embodiment, the first pixel electrode layer 311 is provided only in the region overlapping the third relaying electrode 83 in plan view in the opening region AR11 of the display region E, and thus the contact resistance is favorably ensured. With the second pixel electrode layer 312 with the width i.e., the thickness equal to or smaller than ⅓ of the first pixel electrode layer 311 is provided alone in the entirety of the opening region AR11, the transmittance of the light L at the pixel P in the opening region AR11 sufficiently improves. In addition, in the liquid crystal apparatus 100 of the embodiment, the opening region AR15 of the dummy pixel region DF is provided with the first dummy pixel electrode layer 315 in the entirety of the opening region AR15 including the region overlapping the third relaying electrode 83 in plan view, and thus a structure different from that of the opening region AR11 of the display region E is formed. In the opening region AR15, the space TR is formed between the first dummy pixel electrode layer 315 and the sixth interlayer insulating layer 76 in the region on the side opposite to the region overlapping the third relaying electrode 83 in plan view in the XY plane. Thus, during the manufacturing of the liquid crystal apparatus 100, the ionic impurities IO diffused from the sealing material 6 and the like toward the display region E through the dummy pixel region DF are favorably captured in the space TR. Thus, with the liquid crystal apparatus 100 of the embodiment, the transmittance of the light L can be sufficiently increased in the display region E, and the occurrence of bright spots and display defects due to the diffusion of the ionic impurities IO can be prevented.

The liquid crystal apparatus 100 of the embodiment includes the alignment film 12 that overlaps the pixel electrode 11 and the dummy pixel electrode 15 in plan view. In the liquid crystal apparatus 100 of the embodiment, the gap gg, i.e., the height in the Z axis, of the space TR between the sixth interlayer insulating layer 76 and the portion not overlapping the third relaying electrode 83 in plan view in the first dummy pixel electrode layer 315 is greater than the film thickness of the alignment film 12. With the liquid crystal apparatus 100 of the embodiment, the potential difference between the pixel P and the alignment film 12 can be sufficiently ensured.

In the liquid crystal apparatus 100 of the embodiment, the pixel electrode and the dummy pixel electrode have shapes in plan view different from each other. With the liquid crystal apparatus 100 of the embodiment, oscillation of free electrons due to overlap of the pixel electrode 11 and the dummy pixel electrode 15 can be suppressed. Note that in the liquid crystal apparatus 100 of the embodiment, the degree of freedom of the shape in plan view and arrangement of the space TR is increased, and the capturing rate of the ionic impurities IO in the space TR can be improved and adjusted.

In the liquid crystal apparatus 100 of the embodiment, in plan view, the first dummy pixel electrode layer 315 is larger than the first pixel electrode layer 311. With the liquid crystal apparatus 100 of the embodiment, in the opening region AR11 of the display region E, the region provided only with the second pixel electrode layer 312 thinner than the first pixel electrode layer 311 is relatively large in plan view, and thus the transmittance of the light L at the pixel P can be improved. With the liquid crystal apparatus 100 of the embodiment, since the region provided with the first dummy pixel electrode layer 315 is relatively large in plan view in the opening region AR15 in the dummy pixel region DF, the region for forming the space TR can be easily ensured, and the capturing rate of the ionic impurities IO in the space TR can be improved.

In the liquid crystal apparatus 100 of the embodiment, the width, i.e., the thickness s3 of the second pixel electrode layer 312 is equal to or smaller than ⅕ of the thickness s1 of the first pixel electrode layer 311 in the Z axis. In the Z axis, the width, i.e., the thickness s6 of the second dummy pixel electrode layer 316 is equal to or smaller than ⅕ of the thickness s4 of the first dummy pixel electrode layer 315. The Z axis corresponds to "thickness direction" of the element substrate 111 in the liquid crystal apparatus 100. With the liquid crystal apparatus 100 of the embodiment, the width in the Z axis, i.e., the thickness, of most of the pixel electrode 11 in the opening region AR11 of the display region E can be reduced, and thus the transmittance of the light L at the pixel P can be improved. With the liquid crystal apparatus 100 of the embodiment, it is possible to avoid excessive increase of the width in the Z axis, i.e., the thickness of the dummy pixel electrode 15 making up the upper wall of the space TR i.e., the wall part on the +Z direction side, and thus the space TR can be stably maintained.

In the liquid crystal apparatus 100 of the embodiment, in the Z axis, the width, i.e., the thickness s3 of the second pixel electrode layer 312 is equal to or smaller than ⅒ of the thickness s1 of the first pixel electrode layer 311. In the Z axis, the width, i.e., the thickness s6 of the second dummy pixel electrode layer 316 is equal to or smaller than ⅒ of the thickness s4 of the first dummy pixel electrode layer 315. With the liquid crystal apparatus 100 of the embodiment, the transmittance of the light L at the pixel P can be improved, and thus the space TR can be stably maintained as described above.

The projector 1000 of the embodiment includes the above-described liquid crystal apparatus 100 of this embodiment as a light modulating apparatus, and includes the liquid crystal apparatus 100R for the red light R, the liquid crystal apparatus 100G for the green light G, and the liquid crystal apparatus 100B for the blue light B.

In the projector 1000 of the embodiment, the liquid crystal apparatus 100 is used as a light modulating apparatus that modulates and converts color light into image light. With the liquid crystal apparatus 100, the projector 1000 of the embodiment can increase the quantity of color light emitted from the light modulating apparatus, and can prevent the occurrence of display defects.

Although the preferred embodiments of the disclosure have been described in detail above, the disclosure is not limited to the particular embodiments, and various variations and changes are possible within the scope of the gist of the disclosure as described in the claims.

For example, in the above-described embodiment, the liquid crystal apparatus of transmission type is exemplified as the liquid crystal apparatus serving as an electro-optic apparatus, but the liquid crystal apparatus may be a liquid crystal apparatus of reflection type or a liquid crystal apparatus of LCOS (Liquid crystal on silicon) type. In addition, the electro-optic apparatus may be an organic EL apparatus including a layer composed of organic compounds as an electro-optic layer, or an apparatus including an electro-optic layer other than liquid crystal apparatuses and organic EL apparatuses.

For example, in the above-described embodiment, a projector is exemplified as electronic equipment, but the electronic equipment is not limited to a projector. The electronic equipment including the above-described electro-optic apparatus may be a light shaping apparatus, and may be an apparatus other than projectors and light shaping apparatuses that uses image light converted by an electro-optic apparatus.

Overview of Present Disclosure

An overview of the present disclosure is added below.

Supplementary Note 1

An electro-optic apparatus including a substrate, a first conductive member provided on one side of the substrate, a pixel electrode electrically coupled to the first conductive member, a second conductive member provided on one side of the substrate, and disposed on further outside than a display region where the pixel electrode is provided, a dummy pixel electrode electrically coupled to the second conductive member, and an insulating layer disposed between the pixel electrode and the substrate, and between the dummy pixel electrode and the substrate. The pixel electrode includes a first pixel electrode layer overlapping the first conductive member in plan view and electrically coupled to the first conductive member, and a second pixel electrode layer overlapping the first pixel electrode layer in plan view and overlapping an opening region of a pixel in plan view, the second pixel electrode layer having a width in a thickness direction of the substrate smaller than a width of the first pixel electrode layer in the thickness direction of the substrate, the dummy pixel electrode includes a first dummy pixel electrode layer overlapping the second conductive member in plan view, and electrically coupled to the second conductive member, and a second dummy pixel electrode layer overlapping the first dummy pixel electrode layer in plan view, the second dummy pixel electrode layer having a width in the thickness direction of the substrate smaller than a width of the first dummy pixel electrode layer in the thickness direction of the substrate, and in plan view, the insulating layer, and the first dummy pixel electrode layer and the second dummy pixel electrode layer in a portion not overlapping the second conductive member face each other with a gap between the insulating layer, and the first dummy pixel electrode layer and the second dummy pixel electrode layer.

With the configuration of supplementary note 1, with the first pixel electrode layer, the contact resistance can be appropriately ensured, the thickness of the second pixel electrode layer overlapping the opening region can be suppressed, and the light transmittance can be increased in the opening region of the pixel. In addition, with the configuration of supplementary note 1, since the gap is formed between the first dummy pixel electrode layer and the second dummy pixel electrode layer, and the insulating layer, ionic impurities from the region where the dummy pixel electrode is provided to the region where the pixel is provided are captured in the gap, and thus, the occurrence of bright spots and display defects due to the diffusion of ionic impurities can be prevented.

Supplementary Note 2

An electro-optic apparatus including a substrate, a first conductive member provided on one side of the substrate, a pixel electrode electrically coupled to the first conductive member, a second conductive member provided on one side of the substrate, and disposed on further outside than a display region where the pixel electrode is provided, a dummy pixel electrode electrically coupled to the second conductive member, and an insulating layer disposed between the pixel electrode and the substrate, and between the dummy pixel electrode and the substrate. The pixel electrode includes a first pixel electrode layer overlapping the first conductive member in plan view and electrically coupled to the first conductive member, and a second pixel electrode layer overlapping the first pixel electrode layer in plan view and overlapping an opening region of a pixel in plan view, the second pixel electrode layer having a width equal to or smaller than $\frac{1}{5}$ of a width of the first pixel electrode layer in a thickness direction of the substrate, the dummy pixel electrode includes a first dummy pixel electrode layer overlapping the second conductive member in plan view, and electrically coupled to the second conductive member, and in plan view, the insulating layer and the first dummy pixel electrode layer in a portion not overlapping the second conductive member face each other with a gap between the insulating layer and the first dummy pixel electrode layer.

With the configuration of supplementary note 2, with the first pixel electrode layer, the contact resistance can be appropriately ensured, the thickness of the second pixel electrode layer overlapping the opening region can be reduced as much as possible, and the light transmittance can be sufficiently increased in the opening region of the pixel. In addition, with the configuration of supplementary note 2, ionic impurities can be captured in the gap between the first dummy pixel electrode layer and the insulating layer, and thus the occurrence of bright spots and display defects due to the diffusion of ionic impurities can be prevented.

Supplementary Note 3

The electro-optic apparatus according to supplementary note 1 or 2, further including an alignment film overlapping the pixel electrode and the dummy pixel electrode in plan view, in which the gap between the insulating layer and the portion not overlapping the second conductive member in plan view in the first dummy pixel electrode layer is greater than a film thickness of the alignment film.

With the configuration of supplementary note 3, the potential difference between the pixel and the alignment film can be sufficiently ensured.

Supplementary Note 4

The electro-optic apparatus according to any one of supplementary notes 1 to 3, in which the pixel electrode and the dummy pixel electrode have shapes in plan view different from each other.

With the configuration of supplementary note 4, oscillation of free electrons due to the overlap of the pixel electrode and the dummy pixel electrode can be suppressed.

Supplementary Note 5

The electro-optic apparatus according to any one of supplementary notes 1 to 4, in which in plan view, the first dummy pixel electrode layer is larger than the first pixel electrode layer.

With the configuration of supplementary note 5, in plan view, the region for forming the gap between the first dummy pixel electrode layer and the insulating layer can be easily ensured, and the capturing rate of ionic impurities in the gap can be improved.

Supplementary Note 6

The electro-optic apparatus according to supplementary note 1, in which in the thickness direction of the substrate, the width of the second pixel electrode layer is equal to or smaller than $\frac{1}{5}$ of the width of the first pixel electrode layer, and the width of the second dummy pixel electrode layer is equal to or smaller than $\frac{1}{5}$ of the width of the first dummy pixel electrode layer.

With the configuration of supplementary note 6, with the second pixel electrode layer sufficiently thinner than the first pixel electrode layer provided in the opening region of the pixel, the light transmittance in the opening region can be improved. In addition, with the configuration of supplementary note 6, with the second dummy pixel electrode layer sufficiently thinner than the first dummy pixel electrode layer provided over the gap between the first dummy pixel electrode layer and the insulating layer, the gap can be stably maintained without excessively increasing the thickness of the dummy pixel electrode over the gap.

Supplementary Note 7

The electro-optic apparatus according to supplementary note 6, in which in the thickness direction of the substrate, the width of the second pixel electrode layer is equal to or smaller than $\frac{1}{10}$ of the width of the first pixel electrode layer, and the width of the second dummy pixel electrode layer is equal to or smaller than $\frac{1}{10}$ of the width of the first dummy pixel electrode layer.

With the configuration of supplementary note 7, the light transmittance in the opening region can be further improved, and the gap between the first dummy pixel electrode layer and the insulating layer can be stably maintained.

Supplementary Note 8

An electronic equipment including the electro-optic apparatus according to any one of supplementary notes 1 to 7.

With the configuration of supplementary note 8, the quantity of the color light emitted from the light modulating apparatus can be increased, and the occurrence of display defects can be prevented.

What is claimed is:

1. An electro-optic apparatus comprising:
   a substrate;
   a first conductive member provided on one side of the substrate;
   a pixel electrode electrically coupled to the first conductive member;
   a second conductive member provided on the one side of the substrate, and disposed on further outside than a display region where the pixel electrode is provided;
   a dummy pixel electrode electrically coupled to the second conductive member; and
   an insulating layer disposed between the pixel electrode and the substrate, and between the dummy pixel electrode and the substrate, wherein
   the pixel electrode includes:
   a first pixel electrode layer overlapping the first conductive member in plan view and electrically coupled to the first conductive member, and
   a second pixel electrode layer overlapping the first pixel electrode layer in plan view and overlapping an opening region of a pixel in plan view, the second pixel electrode layer having a width in a thickness direction of the substrate smaller than a width of the first pixel electrode layer in the thickness direction of the substrate,
   the dummy pixel electrode includes:
   a first dummy pixel electrode layer overlapping the second conductive member in plan view, and electrically coupled to the second conductive member, and
   a second dummy pixel electrode layer overlapping the first dummy pixel electrode layer in plan view, the second dummy pixel electrode layer having a width in the thickness direction of the substrate smaller than a width of the first dummy pixel electrode layer in the thickness direction of the substrate, and in plan view, the insulating layer, and the first dummy pixel electrode layer and the second dummy pixel electrode layer in a portion not overlapping the second conductive member face each other with a gap between the insulating layer, and the first dummy pixel electrode layer and the second dummy pixel electrode layer.

2. The electro-optic apparatus according to claim 1, further comprising an alignment film overlapping the pixel electrode and the dummy pixel electrode in plan view, wherein the gap between the insulating layer and the portion not overlapping the second conductive member in plan view in the first dummy pixel electrode layer is greater than a film thickness of the alignment film.

3. The electro-optic apparatus according to claim 1, wherein the pixel electrode and the dummy pixel electrode have shapes in plan view different from each other.

4. The electro-optic apparatus according to claim 1, wherein in plan view, the first dummy pixel electrode layer is larger than the first pixel electrode layer.

5. The electro-optic apparatus according to claim 1, wherein in the thickness direction of the substrate, the width of the second pixel electrode layer is equal to or smaller than $\frac{1}{5}$ of the width of the first pixel electrode layer, and the width of the second dummy pixel electrode layer is equal to or smaller than $\frac{1}{5}$ of the width of the first dummy pixel electrode layer.

6. The electro-optic apparatus according to claim 5, wherein in the thickness direction of the substrate, the width of the second pixel electrode layer is equal to or smaller than $\frac{1}{10}$ of the width of the first pixel electrode layer, and the width of the second dummy pixel electrode layer is equal to or smaller than $\frac{1}{10}$ of the width of the first dummy pixel electrode layer.

7. An electronic equipment comprising the electro-optic apparatus according to claim 1.

8. An electro-optic apparatus comprising:

a substrate;

a first conductive member provided on one side of the substrate;

a pixel electrode electrically coupled to the first conductive member;

a second conductive member provided on the one side of the substrate, and disposed on further outside than a display region where the pixel electrode is provided;

a dummy pixel electrode electrically coupled to the second conductive member; and an insulating layer disposed between the pixel electrode and the substrate, and between the dummy pixel electrode and the substrate, wherein the pixel electrode includes:

a first pixel electrode layer overlapping the first conductive member in plan view and electrically coupled to the first conductive member, and a second pixel electrode layer overlapping the first pixel electrode layer in plan view and overlapping an opening region of a pixel in plan view, the second pixel electrode layer having a width equal to or smaller than $\frac{1}{5}$ of a width of the first pixel electrode layer in a thickness direction of the substrate, the dummy pixel electrode includes a first dummy pixel electrode layer overlapping the second conductive member in plan view, and electrically coupled to the second conductive member, and in plan view, the insulating layer and the first dummy pixel electrode layer in a portion not overlapping the second conductive member face each other with a gap between the insulating layer and the first dummy pixel electrode layer.

\* \* \* \* \*